(12) United States Patent
Ramaswamy et al.

(10) Patent No.: US 12,361,740 B2
(45) Date of Patent: *Jul. 15, 2025

(54) DOMAIN-SPECIFIC PROCESSING AND INFORMATION MANAGEMENT USING MACHINE LEARNING AND ARTIFICIAL INTELLIGENCE MODELS

(71) Applicant: 32Health Inc., Brookline, MA (US)

(72) Inventors: Deepak Ramaswamy, Newton, MA (US); Ravindra Kompella, Hyderabad (IN); Shaju Puthussery, Brookline, MA (US)

(73) Assignee: 32Health Inc., Brookline, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/656,440

(22) Filed: May 6, 2024

(65) Prior Publication Data

US 2025/0157242 A1    May 15, 2025

Related U.S. Application Data

(63) Continuation of application No. 18/506,929, filed on Nov. 10, 2023, now Pat. No. 11,978,273.

(51) Int. Cl.
*G06V 30/414*    (2022.01)
*G06N 20/00*    (2019.01)
(Continued)

(52) U.S. Cl.
CPC ........... *G06V 30/414* (2022.01); *G06N 20/00* (2019.01); *G06V 10/22* (2022.01); *G06V 10/82* (2022.01); *G06V 30/147* (2022.01); *G06V 30/191* (2022.01); *G06F 2218/08* (2023.01); *G06T 2207/20081* (2013.01)

(58) Field of Classification Search
CPC ............... G06V 30/147; G06V 30/191; G06V 30/414; G06V 10/22; G06V 10/82; G06F 2218/08; G06T 2207/20081; G06N 20/00
See application file for complete search history.

(56) References Cited

U.S. PATENT DOCUMENTS 10,013,643 B2 *   7/2018  Yellapragada .......... G06F 18/24
11,645,462 B2 *   5/2023  Wilson ................. G06V 30/414
                                              704/9
11,829,406 B1 *  11/2023  Meir Lador ......... G06V 30/418

OTHER PUBLICATIONS

Donut: Document Understanding Transformer without OCR (Year: 2021).*

* cited by examiner

*Primary Examiner* — Daniel G Mariam
(74) *Attorney, Agent, or Firm* — Polsinelli PC

(57) ABSTRACT

Systems and techniques are provided for automatically analyzing and processing domain-specific image artifacts and document images. A process can include obtaining a plurality of document images comprising visual representations of structured text. An OCR-free machine learning model can be trained to automatically extract text data values from different types or classes of document image, based on using a corresponding region of interest (ROI) template corresponding to the structure of the document image type for at least initial rounds of annotations and training. The extracted information included in an inference prediction of the trained OCR-free machine learning model can be reviewed and validated or corrected correspondingly before being written to a database for use by one or more downstream analytical tasks.

29 Claims, 23 Drawing Sheets

(51) Int. Cl.
*G06V 10/22* (2022.01)
*G06V 10/82* (2022.01)
*G06V 30/146* (2022.01)
*G06V 30/19* (2022.01)

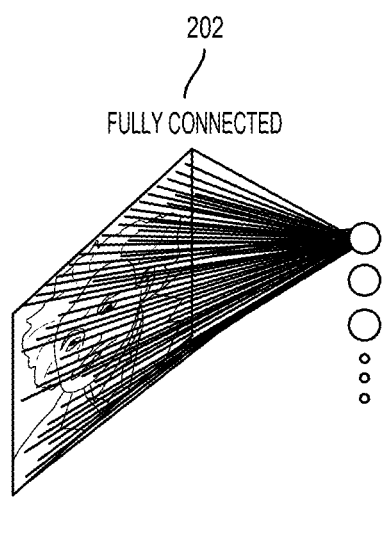 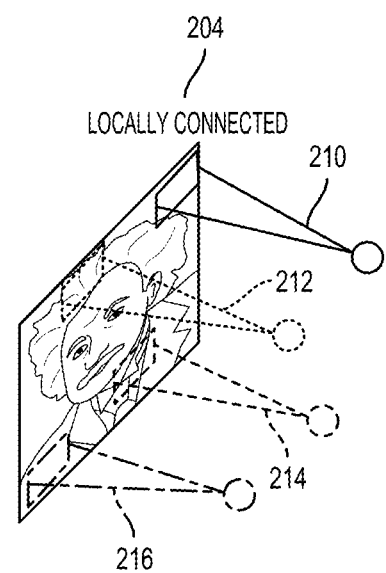
FIG. 2A  FIG. 2B

900

Perio Exam Date

| Buccal/Facial/Buccal | 1 | | | 2 | | | 3 | | | 4 | | | 5 | | | 6 | | |
|---|---|---|---|---|---|---|---|---|---|---|---|---|---|---|---|---|---|---|
| Probing Depth | 4 | 4 | 5 | 5 | 3 | 5 | 5 | 3 | 4 | 4 | 3 | 4 | 4 | 3 | 4 | 5 | 3 | 4 |
| Gingival Margin | | | | | | | | | | | | | | | | | | |
| Clinical Attachment Level | 4 | 4 | 5 | 5 | 3 | 5 | 5 | 3 | 4 | 4 | 3 | 4 | 4 | 3 | 4 | 5 | 3 | 4 |
| Furcation Grade | 0 | | | 0 | | | 0 | | | | | | 0 | | 0 | | | |
| Bleeding on probe | o | o | o | o | o | o | o | o | o | o | o | o | o | o | o | o | o | o |
| Suppuration | | | | | | | | | | | | | | | | | | |

① ② ③ ④ ⑤ ⑥

| Mobility/Bone Loss | | | | | | |
|---|---|---|---|---|---|---|

| Lingual | 1 | | | 2 | | | 3 | | | 4 | | | 5 | | | 6 | | |
|---|---|---|---|---|---|---|---|---|---|---|---|---|---|---|---|---|---|---|
| Probing Depth | 3 | 3 | 11 | 11 | 3 | 5 | 5 | 3 | 5 | 5 | 3 | 5 | 5 | 3 | 5 | 5 | 3 | 4 |
| Gingival Margin | | | | | | | | | | | | | | | | | | |
| Clinical Attachment Level | 3 | 3 | 11 | 11 | 3 | 5 | 5 | 3 | 5 | 5 | 3 | 5 | 5 | 3 | 5 | 5 | 3 | 4 |
| Furcation Grade | 0 | | 0 | 0 | | 0 | 0 | | 0 | | | | 0 | | 0 | | | |
| Bleeding on probe | o | o | o | o | o | o | o | o | o | o | o | o | o | o | o | o | o | o |
| Suppuration | | | | | | | | | | | | | | | | | | |

| Lingual | D L M | | | D L M | | | D L M | | | D L M | | | D L M | | | D L M | | |
|---|---|---|---|---|---|---|---|---|---|---|---|---|---|---|---|---|---|---|
| Probing Depth | 5 | 3 | 7 | 5 | 3 | 5 | 5 | 3 | 6 | 5 | 3 | 5 | 4 | 3 | 4 | 4 | 3 | 4 |
| Gingival Margin | 32 | | | 31 | | | 30 | | | 29 | | | 28 | | | 27 | | |
| Clinical Attachment Level | 5 | 3 | 7 | 5 | 3 | 5 | 5 | 3 | 6 | 5 | 3 | 5 | 4 | 3 | 4 | 4 | 3 | 4 |
| Furcation Grade | 0 | | | 0 | | | 0 | | | | | | | | | | | |
| Bleeding on probe | o | o | o | o | o | o | o | o | o | o | o | o | o | o | o | o | o | o |
| Suppuration | | | | | | | | | | | | | | | | | | |

㉜ ㉛ ㉚ ㉙ ㉘ ㉗

| Mobility/Bone Loss | | | | | | |
|---|---|---|---|---|---|---|

| Buccal/Facial/Buccal | 32 | | | 31 | | | 30 | | | 29 | | | 28 | | | 27 | | |
|---|---|---|---|---|---|---|---|---|---|---|---|---|---|---|---|---|---|---|
| Probing Depth | 5 | 3 | 5 | 5 | 3 | 5 | 5 | 3 | 5 | 4 | 3 | 4 | 4 | 3 | 4 | 4 | 3 | 4 |
| Gingival Margin | | | | | | | | | | | | | | | | | | |
| Clinical Attachment Level | 5 | 3 | 5 | 5 | 3 | 5 | 5 | 3 | 5 | 4 | 3 | 4 | 4 | 3 | 4 | 4 | 3 | 4 |
| Furcation Grade | 0 | | | 0 | | | 0 | | | | | | | | | | | |
| Bleeding on probe | o | o | o | o | o | o | o | o | o | o | o | o | o | o | o | o | o | o |
| Suppuration | | | | | | | | | | | | | | | | | | |

FIG. 9A

| 7 | 8 | 9 | 10 | 11 | 12 | 13 | 14 | 15 | 16 |
|---|---|---|---|---|---|---|---|---|---|
| 4 3 4 | 4 3 5 | 5 3 4 | 4 3 4 | 4 3 4 | 4 3 4 | 5 3 5 | 5 3 5 | 5 3 6 | 5 3 5 |
| 4 3 4 | 4 3 5 | 5 3 4 | 4 3 4 | 4 3 4 | 4 3 4 | 5 3 5 | 5 3 5 | 5 3 6 | 5 3 5 |
|  |  |  |  |  | 0   0 |  | 0 | 0 | 0 |
| o o o | o o o | o o o | o o o | o o o | o o o | o o o | o o o | o o o | o o o |
| ⑦ | ⑧ | ⑨ | ⑩ | ⑪ | ⑫ | ⑬ | ⑭ | ⑮ | ⑯ |

| 7 | 8 | 9 | 10 | 11 | 12 | 13 | 14 | 15 | 16 |
|---|---|---|---|---|---|---|---|---|---|
| 4 3 4 | 3 3 3 | 3 3 3 | 3 3 3 | 3 3 4 | 5 3 4 | 4 3 4 | 5 3 5 | 5 3 5 | 4 3 4 |
| 4 3 4 | 3 3 3 | 3 3 3 | 3 3 3 | 3 3 4 | 5 3 4 | 4 3 4 | 5 3 5 | 5 3 5 | 4 3 4 |
|  |  |  |  |  | 0   0 |  | 0   0 | 0   0 | 0   0 |
| o o o | o o o | o o o | o o o | o o o | o o o | o o o | o o o | o o o | o o o |

| DLM | DLM | MLD | MLD | MLD | MLD | MLD | MLD | MLD | MLD |
|---|---|---|---|---|---|---|---|---|---|
| 4 3 4 | 4 3 4 | 4 3 4 | 4 3 4 | 3 3 4 | 4 4 4 | 4 4 5 | 4 4 5 | 5 6 6 | 6 5 6 |
| 26 | 25 | 24 | 23 | 22 | 21 | 20 | 19 | 18 | 17 |
| 4 3 4 | 4 3 4 | 4 3 4 | 4 3 4 | 3 3 4 | 4 4 4 | 4 4 5 | 4 4 5 | 5 6 6 | 6 5 6 |
|  |  |  |  |  |  |  | 0 | 0 | 0 |
| o o o | o o o | o o o | o o o | o o o | o o o | o o o | o o o | o o o | o o o |
| ㉖ | ㉕ | ㉔ | ㉓ | ㉒ | ㉑ | ⑳ | ⑲ | ⑱ | ⑰ |

| 26 | 25 | 24 | 23 | 22 | 21 | 20 | 19 | 18 | 17 |
|---|---|---|---|---|---|---|---|---|---|
| 4 3 4 | 4 3 4 | 4 3 4 | 4 3 4 | 5 3 5 | 5 3 5 | 5 3 5 | 5 3 5 | 5 3 5 | 6 5 5 |
| 4 3 4 | 4 3 4 | 4 3 4 | 4 3 4 | 5 3 5 | 5 3 5 | 5 3 5 | 5 3 5 | 5 3 5 | 6 5 5 |
|  |  |  |  |  |  |  | 0 | 0 | 0 |
| o o o | o o o | o o o | o o o | o o o | o o o | o o o | o o o | o o o | o o o |

DOMAIN-SPECIFIC PROCESSING AND INFORMATION MANAGEMENT USING MACHINE LEARNING AND ARTIFICIAL INTELLIGENCE MODELS

CROSS REFERENCE TO RELATED APPLICATIONS

This application is a continuation application of U.S. Non-Provisional patent application Ser. No. 18/506,929, filed Nov. 10, 2023, the disclosure of which is herein incorporated in its entirety.

FIELD

The present disclosure generally relates to data and image processing using machine learning (ML) and/or artificial intelligence (AI) models. For example, aspects of the present disclosure are related to systems and techniques for training and deploying ML and/or AI models to perform data processing and information extraction for domain-specific images of text data.

BACKGROUND

Many fields rely upon domain-specific processes for the organization, ingestion, processing, analysis, and/or administration of relevant data and information. Domain-specific processes for the organization and ingestion of relevant data and information may correspond to the use of particular form types or other data structures that have been created or otherwise adopted within the specific domain. For example, healthcare and other medical-related fields (e.g., insurance, various other fields within the provider ecosystem, etc.) are often heavily associated with domain-specific processes for the intake, organization, and processing of data.

In present healthcare and medical-related practices, data is frequently organized using specific form types or form structures that are standardized (or semi-standardized) at various levels of granularity. For example, forms may be standardized at an industry-wide level, a state or regional level, an insurance or benefits network level, a provider network level, etc. The data captured using such forms can represent a combination of information that is not domain-specific (e.g., such as an individual's contact information) and information that is domain-specific (e.g., in the context of healthcare insurance, domain-specific information may be the details provided to support a claim form).

The high prevalence of paperwork or form-based data intake within the various healthcare domains, when combined with the ever increasing number of different structured or semi-structured form types applicable across an entire range of granularity levels, makes it challenging to achieve efficient and streamlined data processing operations. Moreover, the persistent and widespread use of non-Electronic Data Interchange (non-EDI) channels such as fax or email often necessitates reliance upon costly, cumbersome, and error-prone manual review and correlation processes for ingesting and analyzing relevant data. There is a need for automated solutions for the extraction of structured (and/or semi-structured) text information across the various potential input modalities, including the extraction of structured or semi-structured text information from image artifacts in various forms, attachments, etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for processing textual and/or image data using one or more machine learning networks. According to at least one illustrative example, a method is provided for training an Optical Character Recognition-free (OCR-free) machine learning network, the method including: obtaining a plurality of document images, each document image comprising a visual representation of structured text information; obtaining a region of interest (ROI) template corresponding to a structured text data type determined for each document image, wherein the ROI template includes a plurality of pre-defined ROI bounding boxes each indicative of a relative location of a labeled text field within the document image; automatically extracting text data values from each document image based on using an Optical Character Recognition (OCR) engine to process a respective portion of the document image located within each pre-defined ROI bounding box included in the ROI template, wherein the OCR engine generates extracted text data values each associated with a corresponding labeled text field within the document image; generating annotation metadata for each document image, wherein the annotation metadata organizes the extracted text data values for each document image using a structured schema indicative of relationships between categories and subcategories of the labeled text fields within the document image; and training an OCR-free machine learning network using a training dataset comprising the plurality of document images and the annotation metadata generated for each document image.

In some aspects, the structured scheme is indicative of at least one of hierarchical relationships or spatial relationships between categories and subcategories of the labeled text fields within the document image.

In some aspects, training the OCR-free machine learning network yields a trained OCR-free machine learning network, wherein the trained OCR-free machine learning network: receives an input document image and generates an output of structured text data extracted from the input document image; and automatically formats the output of structured text data using the structured schema corresponding to a type of the input document image.

In some aspects, the trained OCR-free machine learning network automatically uses the corresponding structured schema for the type of the input document image without receiving an additional input indicative of the type of the input document image or indicative of the corresponding structured schema.

In some aspects, the trained OCR-free machine learning network implements an OCR-free machine learning model that generates the output of structured text data without performing OCR.

In some aspects, the OCR-free machine learning model is a document understanding transformer (Donut) machine learning model.

In some aspects, the OCR-free machine learning model is implemented based on a transformer architecture and includes a vision encoder transformer sub-network and a text decoder transformer sub-network.

In some aspects, the vision encoder transformer sub-network receives an input document image representing textual information and generates a plurality of image features corresponding to the input document image; and the text decoder transformer sub-network uses the plurality of image features to generate a predicted structured text data corresponding to the visual textual information of the input document image, and wherein the text decoder transformer sub-network predicts key-value pairs and/or a classification corresponding to the predicted structured text data.

In some aspects, predicting the key-value pairs and/or classification corresponding to the predicted structured text data comprises structuring the predicted structured text data using one of the annotation metadata structured schemas seen during training.

In some aspects, the plurality of document images are obtained from a plurality of different sources, each source associated with the same information domain or same lexicon of domain-specific terminology.

In some aspects, the information domain is a medical insurance domain.

In some aspects, the medical insurance domain comprises one or more of a dental insurance domain, a vision insurance domain, a hearing domain, or a healthcare domain; and the structured text data types determined for document images are selected from one or more of a periodontal chart, a dental claim form, an American Dental Association (ADA) dental claim form, or a vision claim form.

In some aspects, a first subset of the document images corresponds to industry-wide or standardized insurance claim forms; and a second subset of the document images corresponds to client-specific insurance claim forms.

In some aspects, the OCR-free machine learning network is pre-trained using the first subset of document images to yield a baseline trained OCR-free machine learning network; and the baseline trained OCR-free machine learning network is fine-tuned or re-trained using the second subset of document images to yield a client-adapted trained OCR-free machine learning network.

In some aspects, a first subset of the plurality of document images are obtained from external sources within the same information domain, and wherein a second subset of the plurality of document images are obtained from client-specific databases.

In some aspects, the method further includes: augmenting the plurality of document images to further include a set of synthesized document images automatically generated based on changing one or more visual parameters of the structured text information represented in a document image; wherein the one or more visual parameters include a font or handwriting style of the structured text information, or a font size of the structured text information.

In some aspects, the method further includes performing one or more pre-processing operations to anonymize or mask Protected Health Information (PHI) within the structured text information of one or more document images of the plurality of document images.

In some aspects, the PHI or other selected information within the structured text information is anonymized or masked using one or more pre-processing machine learning models trained to de-identify PHI, and wherein the one or more pre-processing machine learning models are separate from the OCR-free machine learning network.

In some aspects, the ROI template is included in a plurality of different ROI templates, each ROI template corresponding to a different document type or different organization of structural information within an image artifact.

In some aspects, each ROI template is indicative of configured ROI bounding box information uniquely corresponding to an identified type of structured text document represented in a document image included in the plurality of document images.

In some aspects, each ROI template is indicative of configured ROI bounding box information uniquely corresponding to an identified type of insurance claim form structured text document represented in a document image included in the plurality of document images.

In some aspects, the method further includes processing the generated annotation metadata for each document image using a metadata validation engine, wherein the metadata validation engine is configured to cross-reference one or more fields within the generated annotation metadata with original artifacts associated with the underlying document image.

In some aspects, the metadata validation engine cross-references the one or more fields within the generated annotation metadata with original artifacts comprising expected format information of text values of the one or more fields.

In some aspects, the original artifacts include one or more of: a threshold value or upper and lower thresholds of a range associated with a numerical text value field; an expected data structure associated with a text value field; or a required schema structure or a required alignment for the structured schema corresponding to the document image type.

In some aspects, the method further includes: generating the annotation metadata to include automatically applied corrections for text data values or fields that were rejected by the metadata validation engine cross-referencing.

In some aspects, generating the annotation metadata for each document image is based on providing each document image to an annotation engine that includes an annotation graphical user interface (GUI) for receiving one or more user inputs indicative of annotation information.

In some aspects, the annotation engine includes a respective annotation GUI for each different document type of a plurality of document types represented in the plurality of document images; and each respective annotation GUI corresponds to one or more ROI templates of a plurality of available ROI templates.

In some aspects, the respective annotation GUI is configured to: receive one or more user inputs indicative of a fitting adjustment of an ROI template relative to a document image included in the plurality of document images, wherein the fitting adjustment aligns the pre-defined ROI bounding boxes of the ROI template with the labeled text field locations within the document image.

In some aspects, the respective annotation GUI is further configured to: apply the fitting-adjusted ROI template to the document image to capture corresponding ROI positions for text extraction within the labeled text field locations of the document image; determine one or more matching document images included in the plurality of document images, the one or more matching document images identified as having the same document type; and apply the fitting-adjusted ROI template to each of the one or more matching document images to capture corresponding ROI positions for the matching document image.

In some aspects, automatically extracting the text data values using the OCR engine includes: using the OCR engine to perform OCR of the respective portion of image data included in the document image and within the fitting adjustment-aligned ROI bounding boxes; providing the extracted text data values for each of the ROI bounding boxes for display on the respective annotation GUI for the document type of the document image; receiving one or more user inputs to the respective annotation GUI, the one or more user inputs indicative of a correction or identified error within the OCR engine extracted text data values; and generating error-corrected extracted text data values by updating the OCR engine extracted text data values based on the user inputs indicative of the corrections or identified errors.

In some aspects, the error-corrected extracted text data values are generated without receiving an additional user input comprising a manual entry of a replacement key-value pair for the identified error.

In some aspects, the respective annotation GUI is further configured to: receive information associated with an incorrect prediction during inference time of the trained OCR-free machine learning network, the information including the input document image and incorrect prediction generated during inference time; display, using the respective annotation GUI, the input document image and corresponding extracted text data values incorrectly predicted during inference time; and generate an active learning training data pair comprising the input document image and corresponding error-corrected text data values based on receiving one or more user inputs to the respective annotation GUI indicative of the error-corrected text data values.

In some aspects, the method further includes receiving, from the trained OCR-free machine learning network, information indicative of a selection of most informative document image samples included in an unlabeled dataset of document image samples.

In some aspects, the selection of most informative document image samples corresponds to document image samples for which the trained OCR-free machine learning network generates a predicted output of structured text data having a lowest confidence value.

In some aspects, the method further includes fine-tuning one or more parameters of the trained OCR-free machine learning network based on a dataset comprising a plurality of the active learning training data pairs.

In some aspects, each image of the plurality of images corresponds to one or more of a text document, structured text, or textual information.

In some aspects, the plurality of images comprises a plurality of images each corresponding to a medical document, medical form, insurance claim document, or insurance claim form.

In another illustrative example, an apparatus is provided for training an OCR-free machine learning network. The apparatus includes at least one memory and at least one processor coupled to the at least one memory and configured to: obtain a plurality of document images, each document image comprising a visual representation of structured text information; obtain a region of interest (ROI) template corresponding to a structured text data type determined for each document image, wherein the ROI template includes a plurality of pre-defined ROI bounding boxes each indicative of a relative location of a labeled text field within the document image; automatically extract text data values from each document image based on using an Optical Character Recognition (OCR) engine to process a respective portion of the document image located within each pre-defined ROI bounding box included in the ROI template, wherein the OCR engine generates extracted text data values each associated with a corresponding labeled text field within the document image; generate annotation metadata for each document image, wherein the annotation metadata organizes the extracted text data values for each document image using a structured schema indicative of relationships between categories and subcategories of the labeled text fields within the document image; and train an OCR-free machine learning network using a training dataset comprising the plurality of document images and the annotation metadata generated for each document image.

In another illustrative example, a non-transitory computer-readable storage medium comprising instructions stored thereon which, when executed by at least one processor, causes the at least one processor to: obtain a plurality of document images, each document image comprising a visual representation of structured text information; obtain a region of interest (ROI) template corresponding to a structured text data type determined for each document image, wherein the ROI template includes a plurality of pre-defined ROI bounding boxes each indicative of a relative location of a labeled text field within the document image; automatically extract text data values from each document image based on using an Optical Character Recognition (OCR) engine to process a respective portion of the document image located within each pre-defined ROI bounding box included in the ROI template, wherein the OCR engine generates extracted text data values each associated with a corresponding labeled text field within the document image; generate annotation metadata for each document image, wherein the annotation metadata organizes the extracted text data values for each document image using a structured schema indicative of relationships between categories and subcategories of the labeled text fields within the document image; and train an OCR-free machine learning network using a training dataset comprising the plurality of document images and the annotation metadata generated for each document image.

In another illustrative example, an apparatus is provided for training an OCR-free machine learning network. The apparatus includes: means for obtaining a plurality of document images, each document image comprising a visual representation of structured text information; means for obtaining a region of interest (ROI) template corresponding to a structured text data type determined for each document image, wherein the ROI template includes a plurality of pre-defined ROI bounding boxes each indicative of a relative location of a labeled text field within the document image; means for automatically extracting text data values from each document image based on using an Optical Character Recognition (OCR) engine to process a respective portion of the document image located within each pre-defined ROI bounding box included in the ROI template, wherein the OCR engine generates extracted text data values each associated with a corresponding labeled text field within the document image; means for generating annotation metadata for each document image, wherein the annotation metadata organizes the extracted text data values for each document image using a structured schema indicative of relationships between categories and subcategories of the labeled text fields within the document image; and means for training an OCR-free machine learning network using a training dataset comprising the plurality of document images and the annotation metadata generated for each document image.

According to at least one illustrative example, a method is provided for domain-adaptation for training a machine learning network based on extractive question answering (QA), the method including: training an information extraction machine learning (ML) network to yield a domain-adapted ML network, the training using a domain-specific training dataset including a plurality of training data inputs corresponding to one or more of a domain or a lexicon of domain-specific terminology; performing a first fine-tuning training of the domain-adapted ML network to yield a domain-adapted general QA ML network, the first fine-tuning using a first question answering (QA) dataset comprising a first plurality of question-answer training pairs, wherein the first plurality of question-answer training pairs do not correspond to the lexicon of domain-specific terminology; and performing a second fine-tuning training of the domain-adapted general QA ML network to yield a fine-tuned domain-adapted general QA ML network, the second fine-tuning using a second QA dataset comprising a second plurality of question-answer pairs generated based on a corpus of text narratives utilizing the lexicon of domain-specific terminology.

In some aspects, the second QA dataset includes at least: a first subset of question-answer pairs corresponding to a first classification of a plurality of classifications determined for the corpus of text narratives; and a second subset of question-answer pairs corresponding to a second classification of the plurality of classifications determined for the corpus of text narratives.

In some aspects, the second QA dataset includes a respective subset of question-answer pairs corresponding to each classification of the plurality of classifications determined for the corpus of text narratives.

In some aspects, the second QA dataset organizes the respective subsets of question-answer pairs using a hierarchical structure based on the plurality of classifications In some aspects, the domain is a medical or clinical domain; and the lexicon of domain-specific terminology is a lexicon of medical or clinical terminology.

In some aspects, the domain is a dental domain; and the lexicon of domain-specific terminology is a lexicon of dental terminology.

In some aspects, the corpus of text narratives is a corpus of clinical narratives corresponding to dental insurance claim documents.

In some aspects, the method further includes: obtaining a plurality of dental insurance claim documents; classifying each dental insurance claim document into at least one classification of a plurality of classifications represented within the plurality of dental insurance claim documents; and generating a subset of question-answer pairs for each respective classification of the plurality of classifications, wherein each subset of question-answer pairs is generated using a corresponding subset of the plurality of dental insurance claim documents having the respective classification.

In some aspects, the plurality of classifications correspond to types of dental procedures represented in one or more of the corpus of clinical narratives or the dental insurance claim documents.

In some aspects, the plurality of classifications comprises a plurality of dental procedure classifications indicative of a type of dental procedure represented in a dental insurance claim document.

In some aspects, each subset of question-answer pairs generated for each respective dental procedure classification is organized using a hierarchical structure based on relationships between individual questions included in the subset of question-answer pairs.

In some aspects, the hierarchical structure is a decision tree.

In some aspects, higher levels of the decision tree include question-answer pairs of the subset that correspond to general questions; and lower levels of the decision tree include question-answer pairs of the subset that correspond to subsequent or contextual questions, wherein each subsequent or contextual question is a child node of the decision tree and is associated with a parent node corresponding to a general question.

In some aspects, the second plurality of question-answer pairs includes one or more of: a first subset of question-answer pairs generated using dental insurance claim documents associated with a crown procedures classification; a second subset of question-answer pairs generated using dental insurance claim documents associated with an orthodontics procedure classification; a third subset of question-answer pairs generated using dental insurance claim documents associated with a root canals procedure classification; or a fourth subset of question-answer pairs generated using dental insurance claim documents associated with a scaling and root planning procedure classification.

In some aspects, each respective question-answer pair of the second plurality of question-answer pairs of the second QA dataset comprises: a pre-determined training question, the pre-determined training question included in at least one classification of a plurality of classifications of the corpus of text narratives; and a training answer representing an answer to the pre-determined training question, wherein the training answer is extracted from a text narrative included in the corpus of text narratives.

In some aspects, a pre-determined training question is associated with a plurality of different training answers each representing an answer to the pre-determined training question; and each respective one of the plurality of different training answers is extracted or obtainable from a different one of the text narratives included in the corpus of text narratives.

In some aspects, each training answer comprises a portion of text information extracted from the text narrative.

In some aspects, each training answer is identifiable from a portion of text information extracted from the text narrative.

In some aspects, each question-answer pair of the second plurality of question-answer pairs comprises: a text narrative of the corpus of text narratives, wherein the text narrative comprises a context of the question-answer pair; a question corresponding to the text narrative, wherein the question is answerable based on the text narrative context; and a corresponding answer for the question, wherein the corresponding answer is extracted from the text of the text narrative context.

In some aspects, the context of the question-answer pair further includes a set of allowable answer options for the question corresponding to the text narrative.

In some aspects, the set of allowable answer options includes a first answer option indicative of an affirmative answer and a second answer option indicative of a negative answer.

In some aspects, the set of allowable answer options includes a plurality of answer options each indicative of a respective phrase or information, wherein at least a portion of the set of allowable answer options are not indicative of an affirmative or negative answer.

In some aspects, the first QA dataset is a general QA dataset comprising a plurality of general question-answer training pairs, and wherein the plurality of general question-answer training pairs do not correspond to the lexicon of domain-specific terminology.

In some aspects, the second QA dataset is a domain-specific QA dataset comprising a plurality of domain-specific question-answer training pairs, and wherein the plurality of domain-specific question-answer training pairs correspond to the lexicon of domain-specific terminology.

In some aspects, training the information extraction ML network using the domain-specific training dataset comprises performing domain adaptation over one or more of the domain or the lexicon of domain-specific terminology.

In some aspects, training the information extraction ML network comprises performing domain adaptation for information extraction using the lexicon of domain-specific terminology.

In some aspects, the method further includes obtaining a plurality of text data documents, wherein each respective text data document includes text information utilizing at least a portion of the lexicon of domain-specific terminology; and generating the plurality of training data inputs based on applying one or more data pre-processing operations to the plurality of text data documents.

In some aspects, performing the one or more data pre-processing operations includes: tokenizing the respective text information of each text data document to generate corresponding tokenized text data; and dividing the corresponding tokenized text data into one or more token chunks, wherein a number of tokens in each token chunk is determined based on one or more input parameters of the information extraction ML network.

In some aspects, the information extraction ML network is a transformer model.

In some aspects, the information extraction ML network implements a masked language model.

In another illustrative example, an apparatus is provided for domain-adaptation for training a machine learning network based on extractive question answering (QA). The apparatus includes at least one memory and at least one processor coupled to the at least one memory and configured to: train an information extraction machine learning (ML) network to yield a domain-adapted ML network, the training using a domain-specific training dataset including a plurality of training data inputs corresponding to one or more of a domain or a lexicon of domain-specific terminology; perform a first fine-tuning training of the domain-adapted ML network to yield a domain-adapted general QA ML network, the first fine-tuning using a first question answering (QA) dataset comprising a first plurality of question-answer training pairs, wherein the first plurality of question-answer training pairs do not correspond to the lexicon of domain-specific terminology; and perform a second fine-tuning training of the domain-adapted general QA ML network to yield a fine-tuned domain-adapted general QA ML network, the second fine-tuning using a second QA dataset comprising a second plurality of question-answer pairs generated based on a corpus of text narratives utilizing the lexicon of domain-specific terminology.

In another illustrative example, a non-transitory computer-readable storage medium comprising instructions stored thereon which, when executed by at least one processor, causes the at least one processor to: train an information extraction machine learning (ML) network to yield a domain-adapted ML network, the training using a domain-specific training dataset including a plurality of training data inputs corresponding to one or more of a domain or a lexicon of domain-specific terminology; perform a first fine-tuning training of the domain-adapted ML network to yield a domain-adapted general QA ML network, the first fine-tuning using a first question answering (QA) dataset comprising a first plurality of question-answer training pairs, wherein the first plurality of question-answer training pairs do not correspond to the lexicon of domain-specific terminology; and perform a second fine-tuning training of the domain-adapted general QA ML network to yield a fine-tuned domain-adapted general QA ML network, the second fine-tuning using a second QA dataset comprising a second plurality of question-answer pairs generated based on a corpus of text narratives utilizing the lexicon of domain-specific terminology.

In another illustrative example, an apparatus is provided for domain-adaptation for training a machine learning network based on extractive question answering (QA). The apparatus includes: means for training an information extraction machine learning (ML) network to yield a domain-adapted ML network, the training using a domain-specific training dataset including a plurality of training data inputs corresponding to one or more of a domain or a lexicon of domain-specific terminology; means for performing a first fine-tuning training of the domain-adapted ML network to yield a domain-adapted general QA ML network, the first fine-tuning using a first question answering (QA) dataset comprising a first plurality of question-answer training pairs, wherein the first plurality of question-answer training pairs do not correspond to the lexicon of domain-specific terminology; and means for performing a second fine-tuning training of the domain-adapted general QA ML network to yield a fine-tuned domain-adapted general QA ML network, the second fine-tuning using a second QA dataset comprising a second plurality of question-answer pairs generated based on a corpus of text narratives utilizing the lexicon of domain-specific terminology.

Aspects generally include a method, apparatus, system, computer program product, non-transitory computer-readable medium, user device, user equipment, wireless communication device, and/or processing system as substantially described with reference to and as illustrated by the drawings and specification.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 2A illustrates an example of a fully connected neural network, in accordance with some examples;

FIG. 2B illustrates an example of a locally connected neural network, in accordance with some examples;

FIG. 9A is a diagram illustrating an example graphical user interface (GUI) corresponding to a template adjustment and creation mode for the annotation engine of FIG. 8, in accordance with some examples;

DETAILED DESCRIPTION

Figure 1:
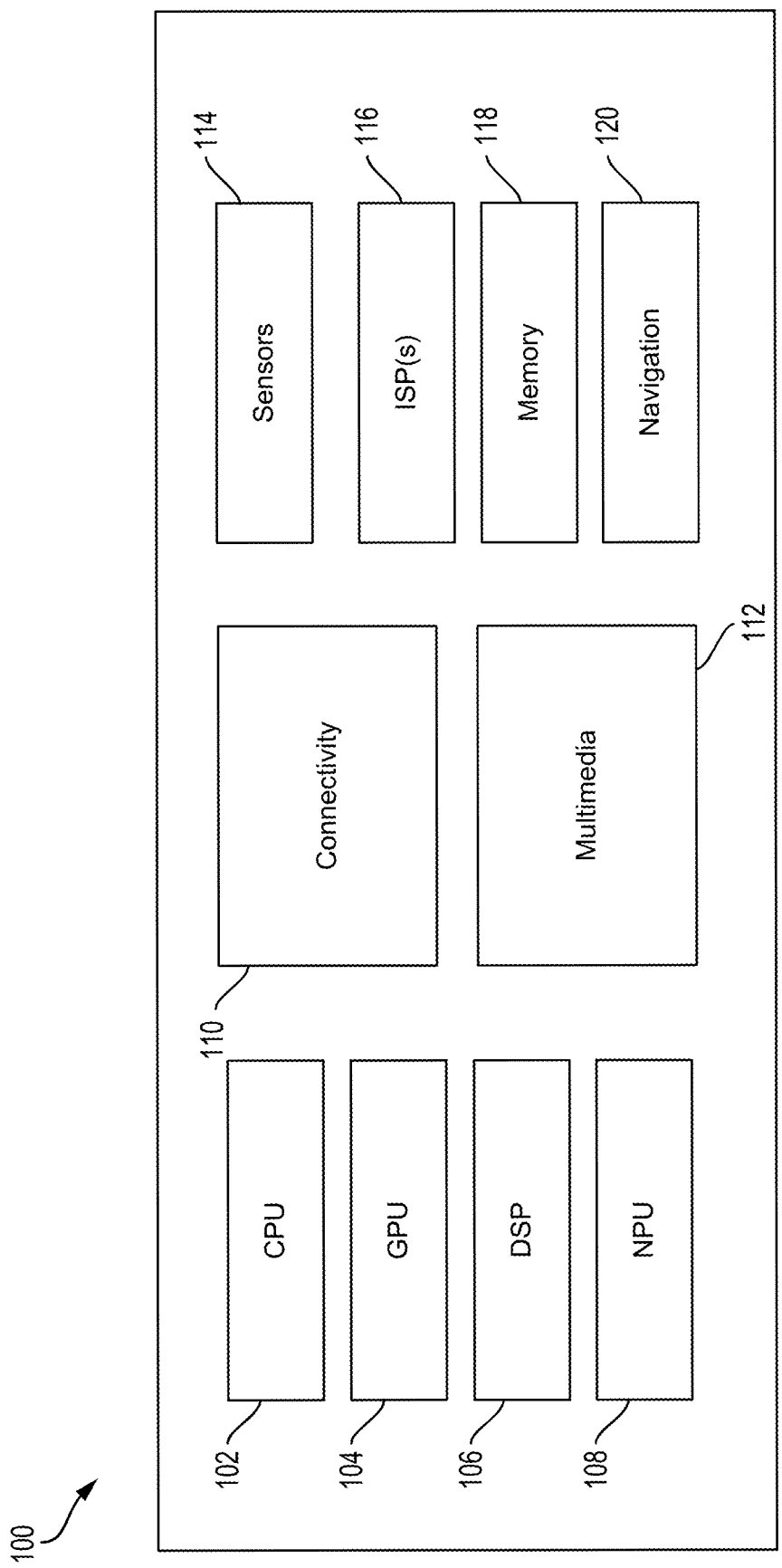
FIG. 1 illustrates an example implementation of a system-on-a-chip (SoC), in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

As noted previously, many fields rely upon particular form types and/or other data structures for the organization and ingestion of relevant data and other information. For instance, the particular form types and data structures may be referred to as "domain-specific," on the basis that they are used, at least in part, for the intake and organization of domain-specific information that is solicited by the form. In the context of healthcare and other medical-related fields such as insurance or other entities within the provider ecosystem, data is frequently organized using specific form types or form structures that are standardized (or semi-standardized) at various levels of granularity.

For example, data may be organized using a form that is standardized across a network of hospitals or provider offices, may be organized using a form that is standardized across a professional membership organization (e.g., such as the American Dental Association (ADA), etc.), may be organized using a form that is semi-standardized or unofficially adopted across a majority of providers (e.g., various embodiments of periodontal charts used by dental providers, etc.).

The intake of structured or semi-structured data through the use of forms or other specified data structures poses various challenges that can make it difficult or impossible to fully automate data ingestion or data processing operations. For instance, the relatively domain-specific (and at least occasionally provider-specific) nature of many forms and data structures within healthcare-related fields (e.g., domains) often necessitates the use of time-consuming and error-prone manual processes for the review and correlation of relevant data and other information provided on the aforementioned forms and data structures. Further still, the intermingled use of Electronic Data Interchange (EDI) channels, with consistent electronic representations of predictably formatted data, and non-EDI channels such as fax or email, with inconsistent image-based representations of handwritten or printed text information, presents still further challenges and complications to the automation of data ingestion and processing.

Accordingly, systems, apparatuses, processes (also referred to as methods), and computer-readable media (collectively referred to as "systems and techniques") are described herein for machine-learning (ML) and/or artificial intelligence (AI)-based model training and subsequent data processing operations thereof. In some aspects, the systems and techniques can be used to perform various data ingestion and/or data processing operations for domain-specific structured or semi-structured data, including data that is represented as image artifacts of handwritten or printed text (e.g., as is commonly found in scans and other images of forms that have been populated with the relevant or solicited information).

The systems and techniques described herein can be applied to various information domains without limitation, and it is contemplated that the particular information domain to be utilized may be specified or otherwise selected and/or configured by a user, administrator, etc. In one illustrative example, the specified or configured domain may be a healthcare or healthcare related/healthcare adjacent domain, although it is noted that the ensuing description makes reference to such domains for purposes of illustration and example, and such description is not intended to be limiting with respect to the scope of the disclosure supplied herein. In some examples, healthcare domains may include, but are not limited to, one or more of a dental domain, a vision or ophthalmology domain, a general healthcare or medical services domain, etc. In some examples, healthcare-related or healthcare-adjacent domains may include, but are not limited to, one or more of a dental insurance or benefits network domain, a vision insurance or benefits network domain, a general healthcare/medical insurance or benefits network domain, a general insurance or benefits network domain, etc.

In one illustrative example, the systems and techniques described herein can be used to automate various data review processes that are previously or currently performed manually. For instance, in the context of an insurance claim adjudication process, the systems and techniques can be configured to utilize one or more machine learning (ML) and/or artificial intelligence (AI) models to perform automated review and/or adjudication of insurance claim submissions. In some aspects, a system architecture can be deployed using multiple different ML and/or AI models (e.g., collectively referred to herein as either "ML models," "AI models," and/or "ML/AI models"—the phrase "ML models" can refer to ML models only, AI models only, or any combination of ML and AI models; while similarly, the phrase "AI models" can refer to AI models only, ML models only, or any combination of ML and AI models).

In some embodiments, the various ML/AI models included in the system architecture can be trained utilizing one or more domain-specific training datasets, utilizing one or more domain-specific training processes or techniques, etc. In some aspects, the various ML/AI models included in the system architecture may be fine-tuned and/or subjected to continuous learning that also utilizes domain-specific processes, techniques, training datasets, etc.

In one illustrative example, the systems and techniques can implement one or more Optical Character Recognition (OCR)-free ML/AI models that are configured to perform automated extraction, review, processing, and/or post-processing, etc., of claim related image artifacts such as faxed or emailed attachments accompanying an insurance claim form. In some aspects, the one or more OCR-free models can be implemented as visual document understanding models. For instance, an OCR-free VDU ML model can be implemented using a document understanding transformer (Donut) model architecture. In some aspects, the systems and techniques can implement OCR-free machine learning using a pix2struct model.

In some embodiments, the OCR-free ML models (e.g., Donut, pix2struct, etc.) can be used to automatically extract structural information from image artifacts obtained in various forms, attachments, etc., associated with a claim form and/or claim submission process (e.g., periodontal charts (also referred to as perio charts), American Dental Association (ADA) forms, insurance provider and/or benefit network-specific claims forms, etc.). Based on using the trained OCR-free ML models to extract the structured text information from the various image artifacts (e.g., each image artifact comprising an image, such as a scan, digital photo, etc., of text data populated onto a form or other structured document), the systems and techniques may additionally apply one or more post-processing rules to correlate and/or analyze the extracted data. Notably, the systems and techniques can use the trained OCR-free ML models, the extracted text obtained from the image artifacts, and the subsequent post-processing rules and analysis to automate the claims review and adjudication process, reduce processing and adjudication time, and reduce the need for manual intervention, among various other benefits and improvements offered by aspects of the present disclosure.

In some aspects, the one or more trained OCR-free ML models can be utilized for extracting structured text data from various types of input images, image artifacts, etc. In some embodiments, one or more additional ML/AI models can be configured for use in extracting text data from certain types of input images. For instance, the one or more trained OCR-free ML models may be utilized for extracting text data from images of claim forms and other types of inputs that utilize a structured, semi-structured, predictable, semi-predictable, etc., format that localizes certain text fields or pieces of information in pre-determined locations on the page. Other types of text data inputs may be relatively (or completely) free-form and/or may be narrative in their structure and composition. For instance, clinical narratives prepared or written by medical professionals and other providers may include relevant information within the context of a written narrative in paragraph and/or sentence form. In one illustrative example, clinical narrative information may comprise medical reports or findings, radiology reports, treatment summaries, diagnosis descriptions or documentation, and various other clinical narratives that may be associated with or included in the submission of an insurance claim, etc.

In some embodiments, specialized ML/AI models can be trained and deployed to perform text and relevant data/information extraction from clinical narratives and image artifacts thereof (e.g., scans, images, photos, etc., of clinical narrative text). In some aspects, one or more natural language processing (NLP) and question-answer (QA) machine learning transformer models can be utilized to improve the efficiency and accuracy of clinical narrative processing and/or one or more downstream tasks reliant upon or utilizing the processing clinical narrative information. For instance, in one illustrative example, the efficiency and accuracy of dental insurance claims processing can be improved based on leveraging NLP and QA transformer models, as will be described in greater depth herein. In some aspects, one or more NLP and/or QA transformer ML models can be configured (e.g., trained and deployed) to systematically extract relevant information from the text data of clinical narratives contained in the image artifacts associated with or submitted in conjunction with a dental insurance claim. For instance, the extracted information from the clinical narratives may be analyzed, correlated, etc., with additional information or documentation submitted in the same insurance claims submission package, such as submitted attachments that may include, but are not limited to, X-ray images or data, perio charts, ADA claim form data, etc.

Various aspects of the present disclosure will be described with respect to the figures.

FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In some implementations, the NPU is implemented in the CPU 102, DSP 106, and/or GPU 104. The SOC 100 may also include one or more sensors 114, image signal processors (ISPs) 116, and/or storage 120.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected.

SOC 100 and/or components thereof may be configured to perform image processing using machine learning techniques according to aspects of the present disclosure discussed herein. For example, SOC 100 and/or components thereof may be configured to perform disparity estimation refinement for pairs of images (e.g., stereo image pairs, each including a left image and a right image). SOC 100 can be part of a computing device or multiple computing devices. In some examples, SOC 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, an XR device (e.g., a head-mounted display, etc.), a smart wearable device (e.g., a smart watch, smart glasses, etc.), a laptop or notebook computer, a tablet computer, a set-top box, a television, a display device, a system-on-chip (SoC), a digital media player, a gaming console, a video streaming device, a server, a drone, a computer in a car, an Internet-of-Things (IoT) device, or any other suitable electronic device(s).

In some implementations, the CPU 102, the GPU 104, the DSP 106, the NPU 108, the connectivity block 110, the multimedia processor 112, the one or more sensors 114, the ISPs 116, the memory block 118 and/or the storage 120 can be part of the same computing device. For example, in some cases, the CPU 102, the GPU 104, the DSP 106, the NPU 108, the connectivity block 110, the multimedia processor 112, the one or more sensors 114, the ISPs 116, the memory block 118 and/or the storage 120 can be integrated into a smartphone, laptop, tablet computer, smart wearable device, video gaming system, server, and/or any other computing device. In other implementations, the CPU 102, the GPU 104, the DSP 106, the NPU 108, the connectivity block 110, the multimedia processor 112, the one or more sensors 114, the ISPs 116, the memory block 118 and/or the storage 120 can be part of two or more separate computing devices.

Machine learning (ML) can be considered a subset of artificial intelligence (AI). ML systems can include algorithms and statistical models that computer systems can use to perform various tasks by relying on patterns and inference, without the use of explicit instructions. An example of a ML system is a neural network (also referred to as an artificial neural network), which may include an interconnected group of artificial neurons (e.g., neuron models). Neural networks may be used for various applications and/or devices, such as image and/or video coding, image analysis and/or computer vision applications, Internet Protocol (IP) cameras, Internet of Things (IoT) devices, autonomous vehicles, service robots, among others.

Individual nodes in a neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as a feature map or an activation map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multi-layer perceptron (MLP) neural networks, transformer neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding this output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

Deep learning (DL) is an example of a machine learning technique and can be considered a subset of ML. Many DL approaches are based on a neural network, such as an RNN or a CNN, and utilize multiple layers. The use of multiple layers in deep neural networks can permit progressively higher-level features to be extracted from a given input of raw data. For example, the output of a first layer of artificial neurons becomes an input to a second layer of artificial neurons, the output of a second layer of artificial neurons becomes an input to a third layer of artificial neurons, and so on. Layers that are located between the input and output of the overall deep neural network are often referred to as hidden layers. The hidden layers learn (e.g., are trained) to transform an intermediate input from a preceding layer into a slightly more abstract and composite representation that can be provided to a subsequent layer, until a final or desired representation is obtained as the final output of the deep neural network.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases. Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

The connections between layers of a neural network may be fully connected or locally connected. FIG. 2A illustrates an example of a fully connected neural network 202. In a fully connected neural network 202, a neuron in a first hidden layer may communicate its output to every neuron in a second hidden layer, so that each neuron in the second layer will receive input from every neuron in the first layer. FIG. 2B illustrates an example of a locally connected neural network 204. In a locally connected neural network 204, a neuron in a first hidden layer may be connected to a limited number of neurons in a second hidden layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

As mentioned previously, systems and techniques are described herein for machine-learning based ML/AI model training operations and subsequent data processing operations thereof. In some aspects, the systems and techniques can be used to perform various data ingestion and/or data processing operations for domain-specific structured or semi-structured data, including data that is represented as image artifacts of handwritten or printed text (e.g., as is commonly found in scans and other images of forms that have been populated with the relevant or solicited information).

The systems and techniques described herein can be applied to various information domains without limitation, and it is contemplated that the particular information domain to be utilized may be specified or otherwise selected and/or configured by a user, administrator, etc. In one illustrative example, the specified or configured domain may be a healthcare or healthcare related/healthcare adjacent domain, although it is noted that the ensuing description makes reference to such domains for purposes of illustration and example, and such description is not intended to be limiting with respect to the scope of the disclosure supplied herein. In some examples, healthcare domains may include, but are not limited to, one or more of a dental domain, a vision or ophthalmology domain, a general healthcare or medical services domain, etc. In some examples, healthcare-related or healthcare-adjacent domains may include, but are not limited to, one or more of a dental insurance or benefits network domain, a vision insurance or benefits network domain, a general healthcare/medical insurance or benefits network domain, a general insurance or benefits network domain, etc.

In some embodiments, aspects of the present disclosure can be used to automate manual data review processes that are currently performed across various different fields, domains, industries, etc. For instance, in the context of an insurance claim adjudication process, the systems and techniques described herein can utilize one or more ML and/or AI models (also referred to as ML networks or AI networks, respectively) to perform automated review and/or adjudication of insurance claim submissions. In some aspects, a corresponding architecture of a computing system for performing ML and/or AI-based data processing operations can include one or more (or multiple) different ML and/or AI models. In some embodiments, the various ML/AI models included in the system architecture can be trained utilizing one or more domain-specific training datasets, utilizing one or more domain-specific training processes or techniques, etc. In some aspects, the various ML/AI models included in the system architecture may be fine-tuned and/or subjected to continuous learning that also utilizes domain-specific processes, techniques, training datasets, etc.

Figure 3:
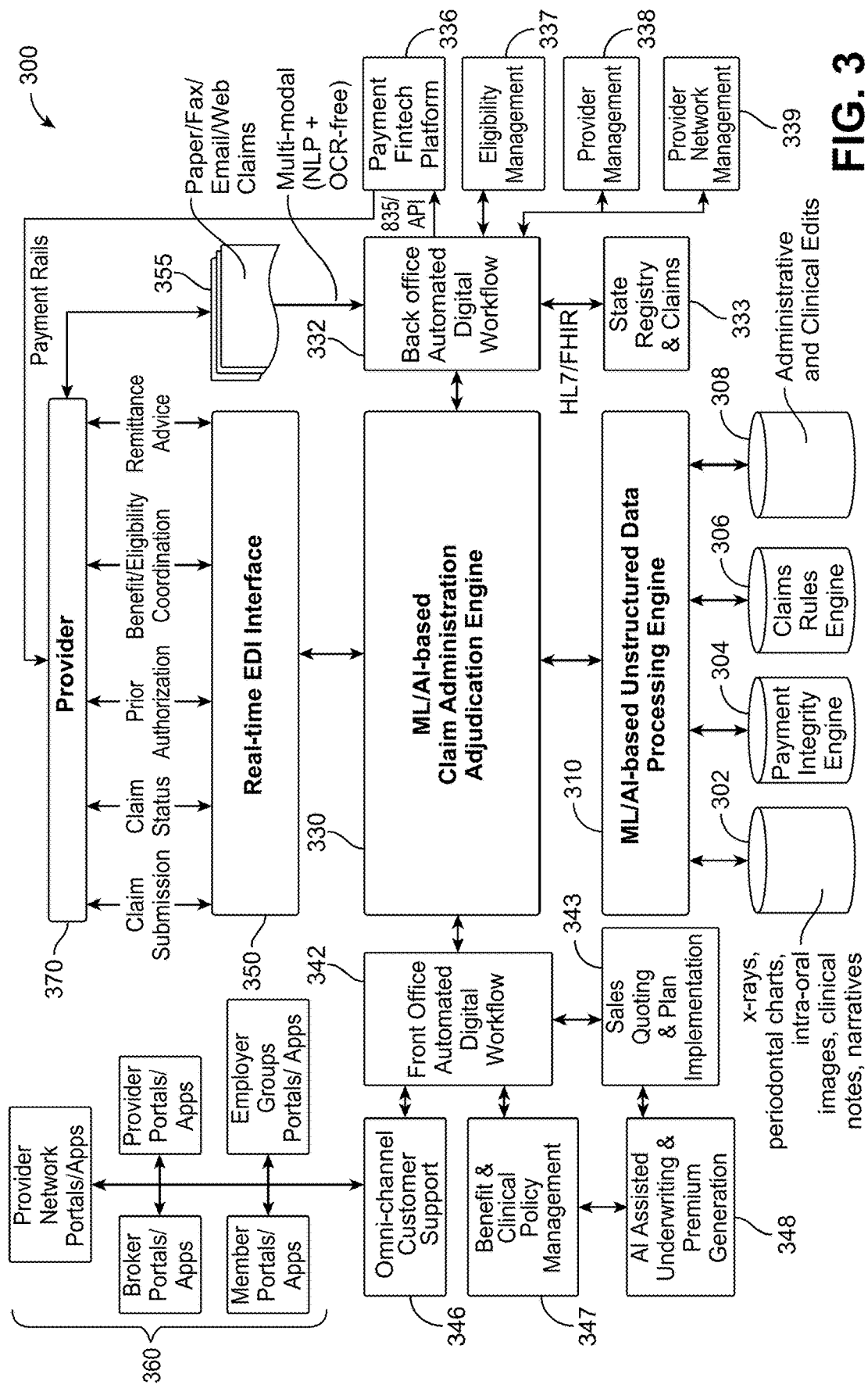
FIG. 3 is a diagram illustrating an example of a computing system architecture that can be used to implement machine-learning (ML) and/or artificial intelligence (AI)-based claim adjudication, management, processing, and/or verification, in accordance with some examples.

For instance, FIG. 3 is a diagram illustrating an example of a computing system architecture 300 that can be used to implement ML and/or AI-based claim adjudication, management, processing, and/or verification operations, in accordance with some examples. As illustrated, in the example context of claims processing and adjudication within the medical or healthcare domain(s), the architecture 300 can include an ML/AI-based claim administration and adjudication engine 330 that is configured to interact with and/or communicate with various other modules, engines, sub-modules, sub-engines, etc., of the architecture 300. In the context of the present disclosure, the ML/AI-based claim administration and adjudication engine 330 may interchangeably be referred to as the "ML/AI engine," "ML/AI claims engine," "claims engine," etc. In some embodiments, the ML/AI claims engine 330 can be implemented using one or more natural language processing (NLP) techniques, as will be described in greater depth below.

As depicted in FIG. 3, the claims engine 330 can be associated with an ML/AI-based unstructured data processing engine 310 and a real-time Electronic Data Interchange (EDI) interface 350. In some aspects, the ML/AI-based unstructured data processing engine 310 can be separate from the claims engine 330. In other examples, the ML/AI-based unstructured data processing engine 310 can be included within, implemented by, etc., the claims engine 330. As utilized herein, the ML/AI-based unstructured data processing engine 310 may also be referred to interchangeably as the "ML/AI data processing engine," "ML data processing engine," "data processing engine," etc.

In one illustrative example, the ML data processing engine 310 can be configured to process and/or perform text extraction for various sources of unstructured data. For instance, the unstructured data may comprise images, image artifacts, etc. that include, depict, or otherwise represent an underlying textual information. In some aspects, the image or image artifact data of textual information may be the same as or similar to the paper forms, faxes, emails, web claims submissions, etc., included in the input images 355 of FIG. 3.

In some examples, the ML data processing engine 310 may additionally process information obtain from one or more additional data sources. For instance, as illustrated in FIG. 3, the ML data processing engine 310 can communicate with and/or be coupled to one or more medical information databases 302. The medical information database(s) 302 may also be referred to as a claims document/file database 302. The database(s) 302 can include information such as x-ray images or data, periodontal charts, intra-oral images, clinical notes, clinical narrative, etc. In some aspects, the composition and mix of individual data or files contained in the database(s) 302 may depend at least in part on the particular domain for which the system architecture 300 is configured (e.g., trained) to perform data ingestion, analysis, and/or text extraction from document images.

The ML data process engine 310 may additionally communicate with and/or be coupled to one or more payment integrity engine databases 304, one or more claims rules engine databases 306, and/or one or more administrative and clinical edits databases 308.

As will be described in greater depth below, the ML/AI-based claims engine 330 may include or be implemented using one or more ML models, one or more AI models, or a combination thereof. Similarly, the ML/AI-based data processing engine 310 can include or be implemented using one or more ML models, one or more AI models, or a combination thereof. For instance, in some embodiments, the architecture 300 can be used to implement an ML or AI-based data processing platform for streamlining and optimizing various aspects of a healthcare insurance and provider ecosystem (e.g., associated with the example insurance claims process or domain that is referred to for the purposes of illustrative example in the present disclosure).

In some aspects, the ML/AI claims engine 330, the ML/AI unstructured data processing engine 310 (or both), can implement appropriate model architectures, NLP processing techniques, etc., in order to integrate multiple components, entities, and data flows within the context of the healthcare insurance and provider ecosystem domain in which the architecture 300 is configured (e.g., trained) for operation and deployment.

For instance, the ML claims engine 330 and ML data processing engine 310 can be used to integrate information associated with a provider entity or provider network 370 (e.g., such as claim submissions or related information thereof, claim status information, prior authorization or related information thereof, benefit and/or eligibility coordinate information, remittance advice or related information thereof, etc.). As depicted in FIG. 3, the ML claims engine 330 may communicate with the provider network 370 via the real-time EDI interface 350 to obtain one or more inputs corresponding to the provider information and image artifacts noted above. In some embodiments, the provider information and image artifacts received by ML claims engine 330 from the provider network 370 may be processed directly by the ML claims engine 330. In another example, the provider information and image artifacts received by ML claims engine 330 from the provider network 370 can be processed by the ML unstructured data processing engine 310, and the results of the processing can be communicated from the ML data processing engine 310 to the ML claims engine 330.

In another example, the architecture 300 can be used to integrate any information that may be obtained via or using one or more real-time EDI interfaces (e.g., such as the real-time EDI interface 350 of FIG. 3, etc.). For instance, the provider 370 can provide the ML claims engine 330 (via real-time EDI interface 350) with one or more image inputs 355 that correspond to paper copies, faxed documents, emailed documents, web-originated claims submissions, etc. of textual data. The one or more image inputs 355 may also be referred to as image artifacts or image artifacts of text data. A given image artifact included in the image inputs 355 can correspond to one (or more) of the various types of provider network 370 inputs that can be provided to the ML claims engine 330. For instance, one or more image artifacts of the input images 355 can correspond to claim submission information, claim status information, prior authorization information, benefit or eligibility coordination information, remittance advice information, etc.

In some embodiments, the architecture 300 can be used to further integrate information associated with, corresponding to, and/or generated during one or more (or all) of claims processing, claims adjudication, underwriting, customer support, and/or provider network management. For instance, the ML claims engine 330 can be integrated into a single, cohesive digital and/or cloud-based platform that can be configured to provide single pane of glass insight into and management of the various processes described above and represented in the context of FIG. 3 or various other figures described herein.

In some aspects, the ML claims engine 330 can be integrated with and communicate with a back office automated digital workflow engine 332 (also referred to as a "back office engine" or "back office integration"). As illustrated in FIG. 3, the back office integration 332 can be associated with a state registry and claims information 333, which may be an external or remote database maintained by a government entity (e.g., the state government corresponding to one or more locations in which the architecture 300 or components thereof are operable).

The back office integration 332 may additionally connect the ML claims engine 330 to one or more payment or fintech platforms 336. The payment platform(s) 336 can be associated with the provider network 370, and for instance may be used by the provider 370 to collect payments and record the corresponding transaction information or logs thereof (e.g., based on the payment rails interconnection shown in FIG. 3 between the provider 370 and the payment platform 336).

The back office integration 332 can additionally provide communication between the ML claims engine 330 and one or more (or all) of an eligibility management engine/service 337, a provider management engine/service 338, and/or a provider network management service 339. In some embodiments, the provider management service 338 can be used to provide one or more management functionalities to the provider 370, while the provider network management service 339 can be used to provide management functionalities relating to the participation of provider 370 in a particular provider network, insurance or benefits network, etc. In some embodiments, the back office integration 332 (e.g., back office automated digital workflow) can be associated with a back office workflow of the provider 370. Further aspects and details corresponding to the back office automated digital workflow 332 of FIG. 3 and its integration with the ML claims engine 330 will be described with reference to the examples of FIGS. 13-15.

Similarly, the front office integration 342 (e.g., front office automated digital workflow) may be associated with a front office workflow of the same provider 370. As illustrated in FIG. 3, the front office automated digital workflow integration 342 can provide access or communications between the ML claims engine 330 and one or more (or all) of a sales quoting and plan implementation service 343, an omnichannel customer support service 346, a benefit and clinical policy management service 347, and/or an ML/AI-assisted underwriting and premium generation engine 348.

In one illustrative example, the system architecture 300 can be used to implement seamless connectivity to various portals associated with other entities associated with or within the healthcare and healthcare-related domain(s) for which the system architecture 300 is trained and/or configured. For instance, a plurality of portal connectors 360 can be associated with the system architecture 300, and in some embodiments, can communicate with the AI claims engine or various other components with the system architecture 300 via an interface with the omni-channel customer support engine/services 346 of FIG. 3.

In some aspects, the plurality of portal connectors 360 can correspond to third-party portals and/or applications. For instance, the plurality of portal connectors 360 can include one or more provider network portals and/or applications; one or more provider portals and/or applications; one or more employer group portals and/or applications; one or more member portals and/or applications; one or more broker portals and/or applications; etc.

Overview

To facilitate the presentation of the various aspects, integrations, embodiments, etc. that are contemplated within the scope of the present disclosure and/or in the context of the example system architecture 300 of FIG. 3, the remainder of the disclosure is organized as described below.

Figure 4:
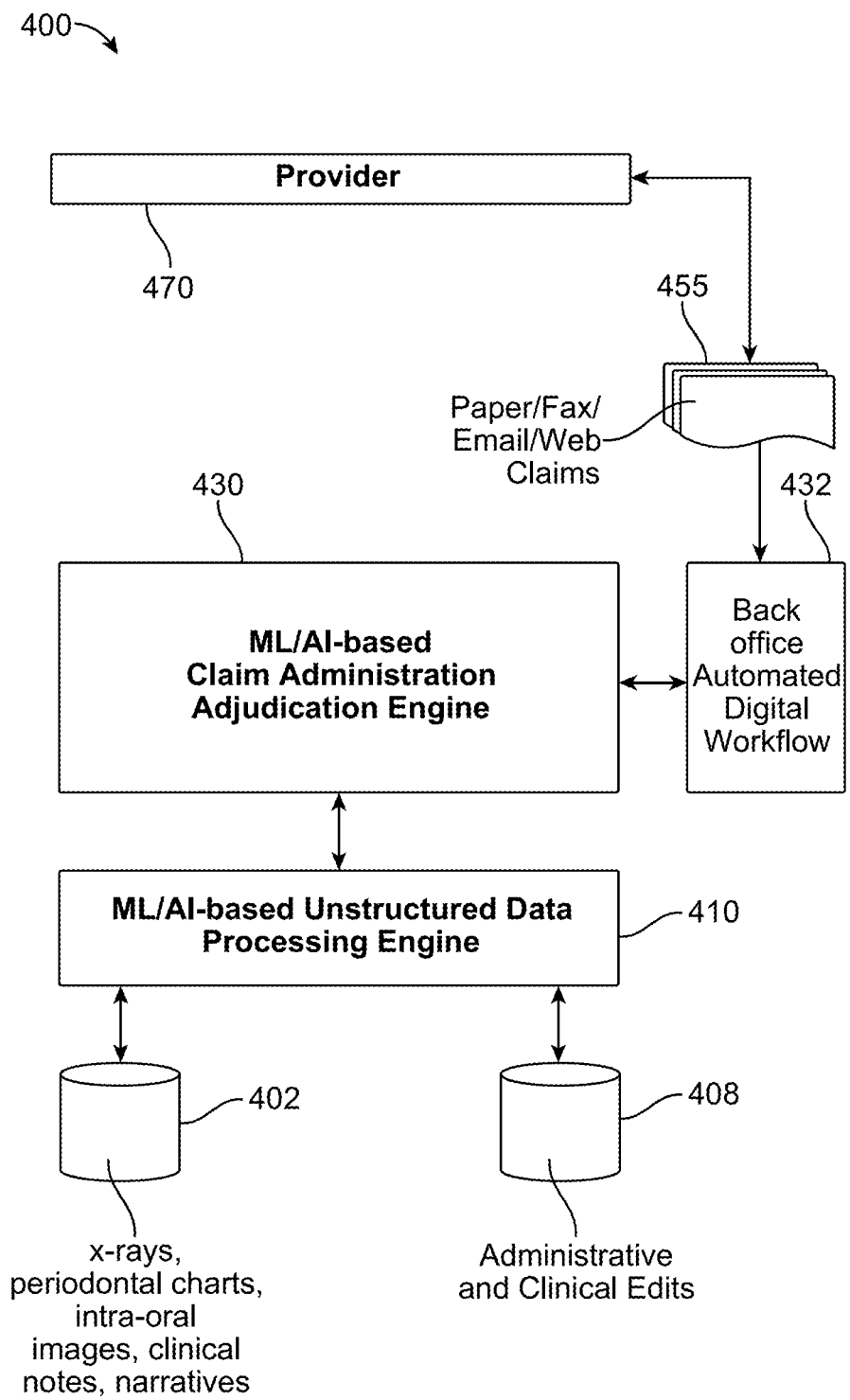
FIG. 4 is a diagram illustrating an example sub-view of the architecture of FIG. 3, corresponding to an implementation of Optical Character Recognition-free (OCR-free) extraction of information from textual and/or image data, in accordance with some examples.
Figure 13:
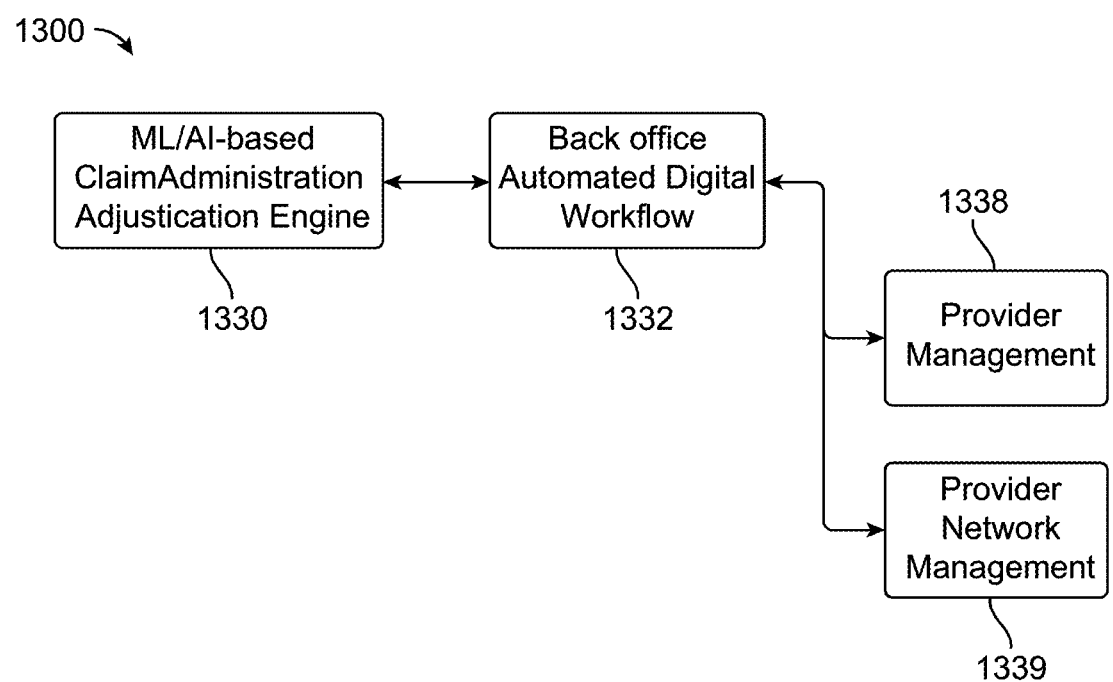
FIG. 13 is a diagram illustrating an example sub-view of the architecture of FIG. 3, corresponding to an implementation of automatic provider credentialing using one or more ML/AI models, in accordance with some examples.

The overall system architecture 300 of FIG. 3 is broken down into different sub-portions (e.g., referred to as sub-views of the architecture 300) with corresponding functionalities that are described with respect to the architecture sub-views presented in FIGS. 4 and 13. Further details, aspects, and implementations corresponding to one or more components included within system architecture 300 of FIG. 3 and/or within one or more of the system architecture sub-views of FIGS. 4 and 13 are further described with respect to corresponding ones of the remaining figures. For instance, the disclosure is organized as follows:

1. OCR-free extraction of text data from document images (corresponding to the ML/AI data processing engine 310 of FIG. 3; the architecture sub-view 400 of FIG. 4; and the details of FIG. 5-FIG. 11B)
2. Domain-adaptation training of ML/AI models to extract clinical narrative information using extractive QA (corresponding to the ML/AI data processing engine 310 of FIG. 3; and the extractive QA domain-adaptation system workflow 1200 of FIG. 12)
3. Automated provider credentialing using ML/AI models (corresponding to the ML/AI claim engine 330 of FIG. 3; the architecture sub-view 1300 of FIG. 13; and the details of FIG. 14 and FIG. 15)

The disclosure turns now to a discussion of the respective items identified above, which are described in turn below. It is noted that description may be made with reference to a particular component within a particular figure and having a one or more corresponding, like, or similar components found in additional figures of the present disclosure. It is understood that description made with reference to a particular reference numeral or component of a particular figure may be applied equally to the additional reference numerals, like components, similar components, etc. that are found in the remaining figures of the present disclosure. For instance, the discussion below identifies various possible correspondences of certain components presented in/across multiple figures, wherein description made with reference to a given one of a set of identified corresponding components can be applied equally to any one of the set.

For example, description made with reference to any given one of the ML claims engine 330 of FIG. 3, the ML claims engine 430 of FIG. 4, or the ML claims engine 1330 of FIG. 13 may be applied equally to any and all of the identified corresponding example ML claims engines 330, 430, 1330.

With the above identified principles in mind, the disclosure turns first to the discussion of OCR-free extraction of text data from document images and/or image artifacts.

1. OCR-Free Extraction of Text Data from Document Images

Systems and techniques for implementing one or more AI and/or ML models configured to perform OCR-free extraction of text data from document images (e.g., such as the image artifacts 355 of FIG. 3 and/or the image artifacts 455 of FIG. 4, associated with a claim submission) are described in further detail with respect to FIG. 4-FIG. 11B. In one illustrative example, the systems and techniques can implement one or more OCR-free ML/AI models that are configured to perform automated extraction, review, processing, and/or post-processing, etc., of claim related image artifacts such as faxed or emailed attachments accompanying an insurance claim form (e.g., the image artifacts/document images 355 of FIG. 3, the image artifacts/document images 455 of FIG. 4, etc.). In some aspects, the one or more OCR-free models can be implemented as visual document understanding models. For instance, an OCR-free VDU ML model can be implemented using a document understanding transformer (Donut) model architecture. In some aspects, the systems and techniques can implement OCR-free machine learning using a pix2struct model.

In some embodiments, the OCR-free ML models (e.g., Donut, pix2struct, etc.) can be used to automatically extract structural information from image artifacts obtained in various forms, attachments, etc., associated with a claim form and/or claim submission process (e.g., periodontal charts (also referred to as perio charts), American Dental Association (ADA) forms, insurance provider and/or benefit network-specific claims forms, etc.), as will be described in greater detail below. Based on using the trained OCR-free ML models to extract the structured text information from the various image artifacts 355/455 (e.g., each image artifact comprising an image, such as a scan, digital photo, etc., of text data populated onto a form or other structured document), the systems and techniques may additionally apply one or more post-processing rules to correlate and/or analyze the extracted data. Examples of post-processing workflows are described with reference to the example perio chart post-processing workflow 1100 of FIG. 11A and the example dental chart post-processing workflow 1150 of FIG. 11B.

Notably, the systems and techniques can use the trained OCR-free ML models, the extracted text obtained from the image artifacts, and the subsequent post-processing rules and analysis to automate the claims review and adjudication process, reduce processing and adjudication time, and reduce the need for manual intervention, among various other benefits and improvements offered by aspects of the present disclosure.

In particular, FIG. 4 is a diagram illustrating an example system architecture sub-view 400 corresponding to the architecture 300 of FIG. 3. In one illustrative example, the architecture sub-view 400 of FIG. 4 corresponds to an implementation of one or more ML and/or AI models trained and configured to perform OCR-free extraction of information from textual and/or image data. The architecture sub-view 400 of FIG. 4 may utilize an ML claims engine 430 that is the same as or similar to the ML claims engine 330 of FIG. 3; an ML unstructured data processing engine 410 that is the same as or similar to the ML unstructured data processing engine 310 of FIG. 3; a back office automated digital workflow 432 that is the same as or similar to the back office automated digital workflow 332 of FIG. 3; a provider entity or network 470 that is the same as or similar to the provider entity or network 370 of FIG. 3; claims document/file database 402 that is the same as or similar to claims document/file database 302 of FIG. 3; administrative and clinical edit database 408 that is the same as or similar to administrative and clinical edit database 308 of FIG. 3; etc.

Figure 5:
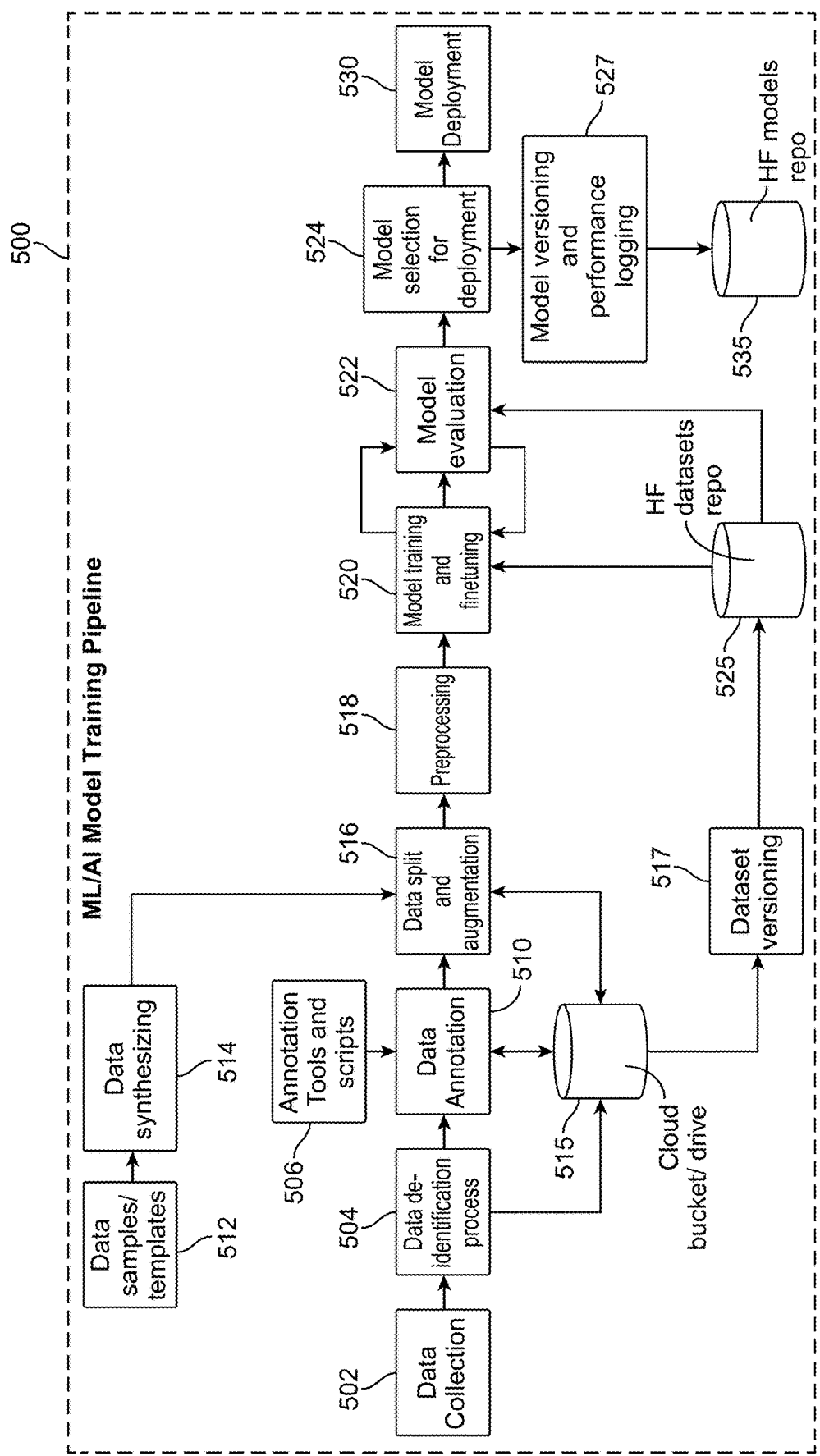
FIG. 5 is a diagram illustrating an example ML/AI model training pipeline for OCR-free extraction of information, in accordance with some examples.

FIG. 5 is a diagram illustrating an example ML/AI model training pipeline 500 that can be used to train one or more ML/AI models to perform OCR-free extraction of information. The ML/AI model training pipeline 500 of FIG. 5 can be used to deploy one or more trained ML/AI models 530, which can be used to implement the ML/AI-based unstructured data processing engine 310 of FIG. 3; the ML/AI-based unstructured data processing engine 410 of FIG. 4; etc. In some embodiments, the deployed ML/AI models 530 trained using the model training pipeline 500 of FIG. 5 can be deployed to perform OCR-free extraction of text information from document images using the ML/AI operation (e.g., inference) pipeline 630 of FIG. 6.

As illustrated, the ML/AI model training pipeline 500 of FIG. 5 can utilize as input data obtained using a data collection engine/service 502. In general, it is contemplated that the data collection engine 502 can be used to collect various forms of data or other relevant information that can be used to train one or more ML/AI models associated with the systems and techniques described herein. In some embodiments, the data collection service 502 can be configured to collect data for training one or more ML or AI models in the context of key-value extraction from images. For instance, the data collection service 502 can be configured to obtain initial training examples from a client being onboarded to the system 300 of FIG. 3 (e.g., can obtain initial training examples from the client database snapshot information 612 associated with the onboarding process 610 of FIG. 6, comprising the historical data 614 processed for generating the ML/AI model training data). The data collection service 502 of FIG. 5 can additionally, or alternatively, be configured to obtain initial training examples from various external sources (e.g., sources separate or independent from the client being onboarded at the onboarding process 610 of FIG. 6A). For instance, in some embodiments, the data collection service 502 can obtain input data from one or more of the medical information database(s) 402 of FIG. 4/302 of FIG. 3, the image artifacts or document images 355 of FIG. 3/455 of FIG. 4, etc.

Figure 6A:
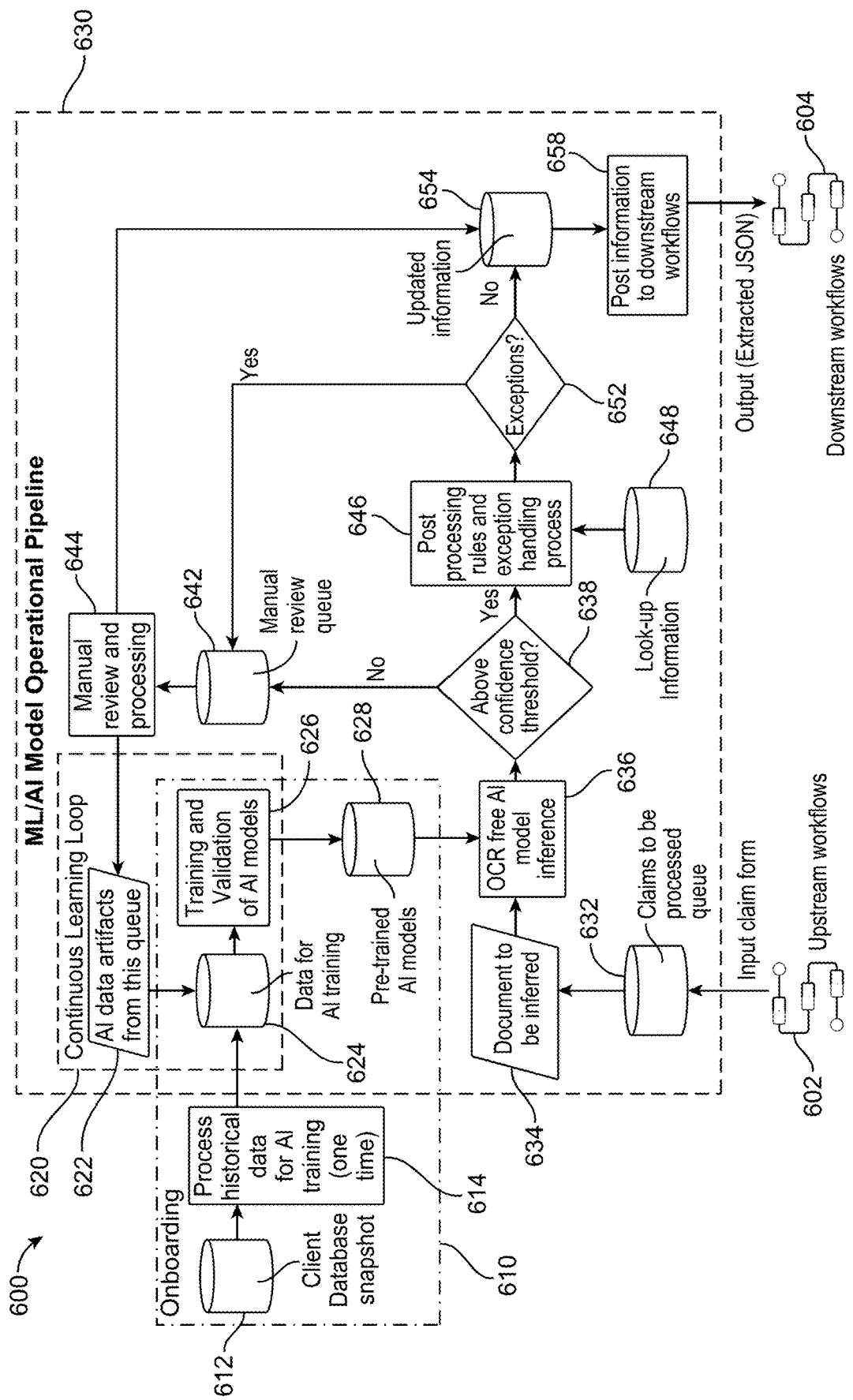
FIG. 6A is a diagram illustrating an example ML/AI model inference workflow including continuous model improvement based on continuous learning, in accordance with some examples.

As noted above, in some aspects, the data collection service 502 can be associated with the onboarding process 610 and/or the client database snapshot information 612, both of which are depicted in FIG. 6A. In some cases, the client database snapshot information 612 can correspond to some (or all) of the information included in the medical information database(s) 302 of FIG. 3/402 of FIG. 4. In some examples, the client database snapshot information 612 is the same as the medical information database(s) 302 of FIG. 3/402 of FIG. 4.

The ML/AI model training pipeline 500 of FIG. 5 can include a data de-identification service 504, which can be applied to the data obtained using the data collection service 502. For instance, the data de-identification service 504 can be used to implement privacy-preserving data collection. In some embodiments, the privacy-preserving data collection can be implemented for Patient/Protected Health Information (PHI) within the input data collected by the data collection service 502. In one illustrative example, data de-identification service 504 can be used to mask, remove, anonymize, or otherwise de-identify PHI that is included within the collected data from the data collection service 502. In some aspects, the data de-identification service 504 can generate as output de-identified or anonymized data to ensure that the collected charts, claims form data, etc., complies with various privacy regulations and/or ethical guidelines, etc. governing the particular type of collected data or PHI. In some embodiments, the use of data de-identification service 504 can be seen to safeguard sensitive patient information while still providing a sufficiently large and rich dataset to perform AI/ML model training for the system architecture 300 of FIG. 3. In one illustrative example, the data de-identification service 504 can be implemented using one or more de-identification or PHI anonymization ML/AI models, which can be trained (e.g., pre-trained) to mask patient health information, protected health information, personally identifiable information, etc. within the collected data from data collection service 502. Notably, the one or more de-identification or PHI anonymization ML/AI models can be leveraged to mask or otherwise remove the patient health information from the collected data prior to the data being further processed for downstream systems and uses. In some aspects, the data de-identification service 504 can output redacted (e.g., de-identified, anonymized, etc.) training data for storage in one or more cloud buckets/drives 515.

In some embodiments, the data de-identification service 504 of FIG. 5 can be included in and/or implemented in the historical data processing block 614 included in the onboarding service 610 of FIG. 6A. In some examples, the data de-identification service 504 included in the ML/AI model training pipeline 500 of FIG. 5 can be the same as or similar to the data de-identification service 674 included in the ML/AI model training pipeline 670 of FIG. 6B. For instance, the data de-identification service 674 depicted in FIG. 6B can receive as input client database snapshot information 672 (e.g., which can be the same as or similar to the client database snapshot information 612 of FIG. 6A) and may utilize one or more ML/AI models that are trained or pre-trained to mask the patient health information before the data is provided to subsequent downstream processing steps or downstream processing blocks.

Figure 6B:
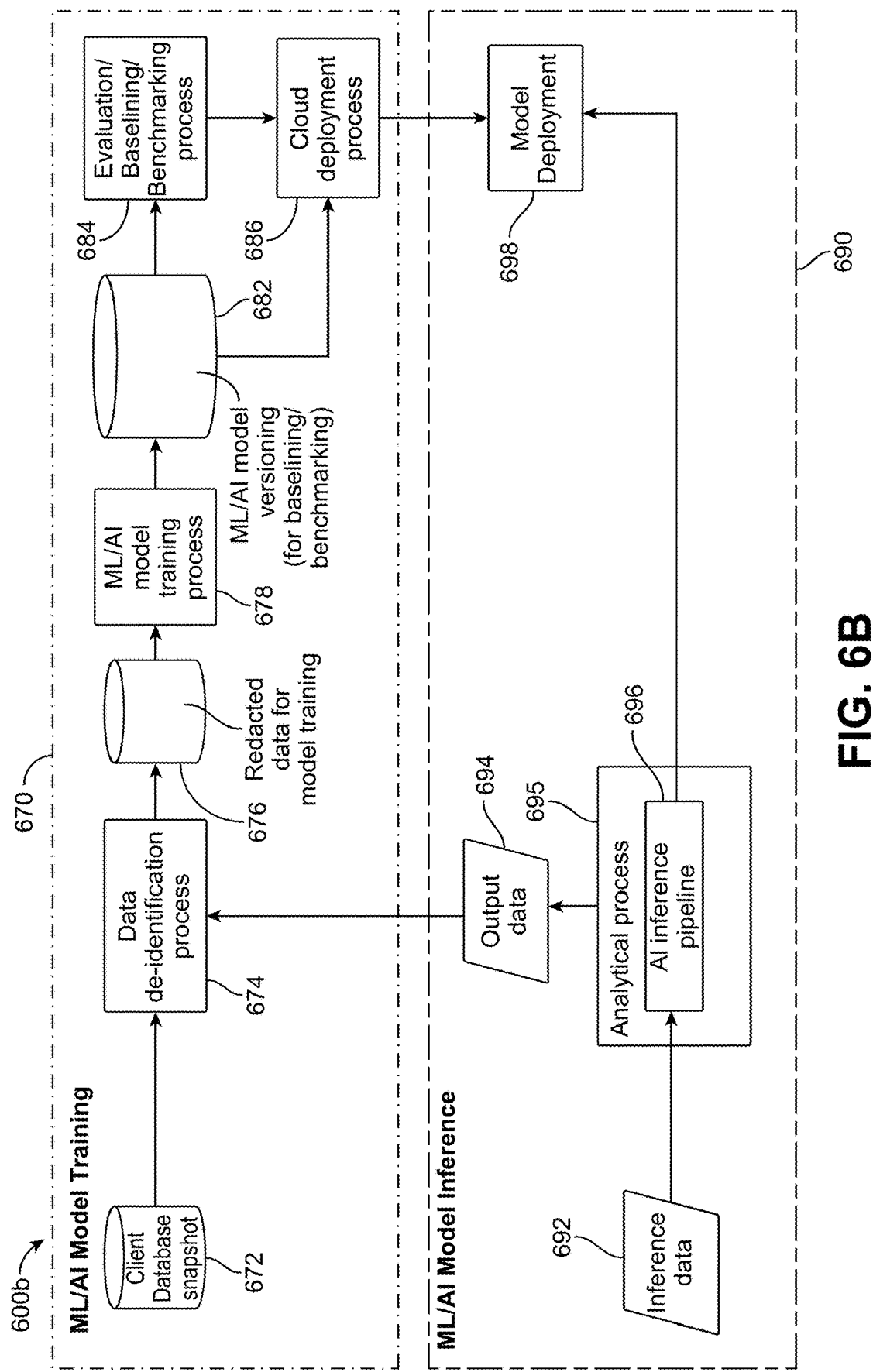
FIG. 6B is a diagram illustrating an example ML/AI model training workflow corresponding to the inference workflow of FIG. 6A, in accordance with some examples.

For instance, the data de-identification service 674 of FIG. 6B can generate as output the redacted training data 676, which may be the same as or similar to the de-identified/anonymized training data generated as output by the data de-identification service 504 of FIG. 5 (e.g., the same as or similar to the de-identified/anonymized training data stored in the cloud bucket/drive 515 of FIG. 5). In some aspects, the redacted training data stored in cloud bucket/drive 515 of FIG. 5 can be the same as or similar to the ML/AI model training data 624 of FIG. 6A, the redacted ML/AI model training data 676 of FIG. 6B, etc.

The ML/AI model training pipeline 500 of FIG. 5 can further obtain one or more data samples or input templates 512, which can be provided to a data synthesis engine 514 configured to synthesize new and diverse templates and varieties of images containing a wide range of data. For instance, the data synthesis engine 514 can generate synthesized (e.g., not present or seen in the training data collected by the data collection service 502) training data examples that are similar, but not identical, to any particular training data example that has been collected. In some embodiments, the synthesized samples and templates generated by the data synthesis engine 514 can be used to augment the training data set. For instance, the data synthesis engine 514 can output a plurality of synthesized training samples and templates to a data split and augmentation service 516 that is included within the ML/AI model training pipeline 500 of FIG. 5.

In some aspects, the synthesized training data from the data synthesis engine 514 can be used by the data split and augmentation service 516 to generate augmented training data to ensure comprehensive data coverage for training the one or more ML/AI models. For instance, the augmented training data generated by the data split and augmentation service 516 can allow the ML/AI models to be trained on a more diverse and representative dataset for the particular task(s) and/or configured information domain(s) of interest. The augmented training data can additionally be seen to drive the resulting trained ML/AI models' ability to generalize and adapt to various image styles, templates, and/or scenarios, resulting in a more robust model deployment. In some embodiments, the data synthesis engine 514 can perform data synthesis (e.g., generate the synthesized and/or augmented templates, training data images, etc.) using one or more scripts that are written to synthesize data that is filled into the templates 512 with desired fonts, font sizes, etc. In one illustrative example, synthesizing data can include generating the corresponding annotation metadata for each instance of synthesized data. For example, the data synthesis engine 512 may automatically generate corresponding annotation metadata for its output of synthesized training data. In another example, the annotation tools and scripts 506 may include one or more of the scripts written to synthesize the data that is filled into the templates 512, in which case the annotation tools and scripts 506 can additionally be configured to automatically generate the corresponding annotation metadata for the synthesized training data.

In some embodiments, the data split and augmentation engine 516 can perform data augmentation operations to account for various potential challenges that a trained ML/AI model may encounter during the inference phase (e.g., such as an inference phase associated with the ML/AI operation pipeline 630 of FIG. 6A, etc.). For instance, the data split and augmentation engine 516 can be configured to apply one or more appropriate data augmentations to some (or all) of the training data images collected earlier in the process associated with the model training pipeline 500 of FIG. 5. In some cases, the data augmentation operations 516 can be applied prior to annotation 510, after annotation 510, or a combination thereof.

In one illustrative example, the data augmentation engine 516 can apply one or more data augmentation techniques to the training data document images or image artifacts. The data augmentation techniques can be employed to further enhance the diversity and robustness of the resulting training dataset. In some aspects, the data augmentation techniques associated with data augmentation engine 516 can include one or more of generating synthetic document image artifacts (e.g., synthetic document images of perio charts or various structured or semi-structured claims forms with different handwriting styles, fonts, font sizes, etc.), varying the layout and design of the charts represented in the document image artifacts, and/or introducing noise or artifacts to mimic real-world conditions of non-ideal scans or reproductions of underlying documents by the document images. In some embodiments, the data augmentations applied by data augmentation engine 516 are configured to simulate different scenarios and conditions that the trained ML/AI models could encounter. In some examples, respective minimum and/or maximum parameter values for each of the data augmentations can be determined empirically from actual training data.

In some examples, the data augmentation engine 516 can perform rotation augmentations. Rotation augmentation can address potential paper skews that may occur during the scanning process, thereby ensuring the trained ML or AI model's ability to handle misaligned or tilted images that may be encountered as input during inference. The rotation augmentation in some embodiments is performed over a rotation range of between −5 to +5 degrees, as identified from the min and max limits of actual/observed data samples.

In another example, the data augmentation engine 516 can perform scanning augmentations. Scanning augmentation can simulate the appearance of scanned images, and can be used to prepare the trained ML/AI models to effectively process and interpret images that have undergone the scanning process, accounting for artifacts or distortions/image quality degradations introduced by the scanner. In some examples, the values of density chosen for the scanning augmentation can include one or more (or all) of the density values 60, 80, 90, 100, 120, 130, 150, 180, 200 (e.g., as identified from actual/observed data samples).

In another example, the data augmentation engine 516 can perform resize augmentations. Resize augmentation can be implemented based on varying the sizes of images in the dataset, thereby training the ML/AI models to adapt and work effectively with document images, image artifacts, or various other image inputs of different dimensions. The resize augmentation can be performed over a range of between 50% of the actual image size to 100% of the actual image size (e.g., full size), for instance as may be identified from the min and max limits of actual/observed data samples.

In another example, the data augmentation engine 516 can perform contrast and brightness augmentation(s). Contrast and brightness augmentation(s) can be implemented to adjust the contrast and brightness of the document images/image artifacts to simulate variations in lighting conditions and image quality. This technique can ensure that the trained ML/AI model can effectively process and extract information from input images with suboptimal lighting or contrast levels. The min and max values for contrast and brightness augmentation can be derived from actual/observed data samples.

In still another example, the data augmentation engine 516 can perform text font type and font size augmentation, wherein the synthesized data is augmented to use different font types and font sizes. The font size used for the synthesis/augmentation can be between 18 point size to 28 point size, or various other font point size ranges, as may be identified from the min and max limits of actual/observed data samples. Different font styles may also be obtained from the actual/observed data samples.

As noted above, the ML/AI model training pipeline 500 of FIG. 5 may include a data annotation engine 510 and one or more annotation tools/scripts 506 associated with the data annotation engine 510. In one illustrative example, the data annotation engine 510 can be the same as or similar to the annotation engine 800 depicted in FIG. 8.

Conventional and existing methods of annotating perio chart images typically involve manual key-value pair annotation performed by a human reviewer. The conventional manual approach to annotating key-value pairs is time-consuming and labor-intensive. To overcome these limitations associated with performing manual annotation, the data annotation engine 510/800 can be implemented as a customized annotation tool that corresponds to the tasks and information domains configured for the data processing operations of the system 300 of FIG. 3. In particular, the data annotation engine 510/800 can be seen to streamline the training data annotation process by automating the extraction of key-value pairs from perio chart images and/or other input training data received as input by the data annotation engine 510/800. In some aspects, the data annotation engine 510/800 can implement a custom annotation tool for one or more types or modalities of input data. For instance, the data annotation engine 510/800 can implement a custom annotation tool for perio charts, which can be designed to reduce the manual effort required to perform data annotation, based at least in part on the data annotation engine 510 automatically extracting key-value pairs from perio chart images. The annotation engine 510 can include a corresponding annotation tool 506 (e.g., the same as or similar to the annotation tool 840 of FIG. 8), which may comprise a user-adjustable template, an OCR script, a review interface, and an export functionality.

Figure 8:
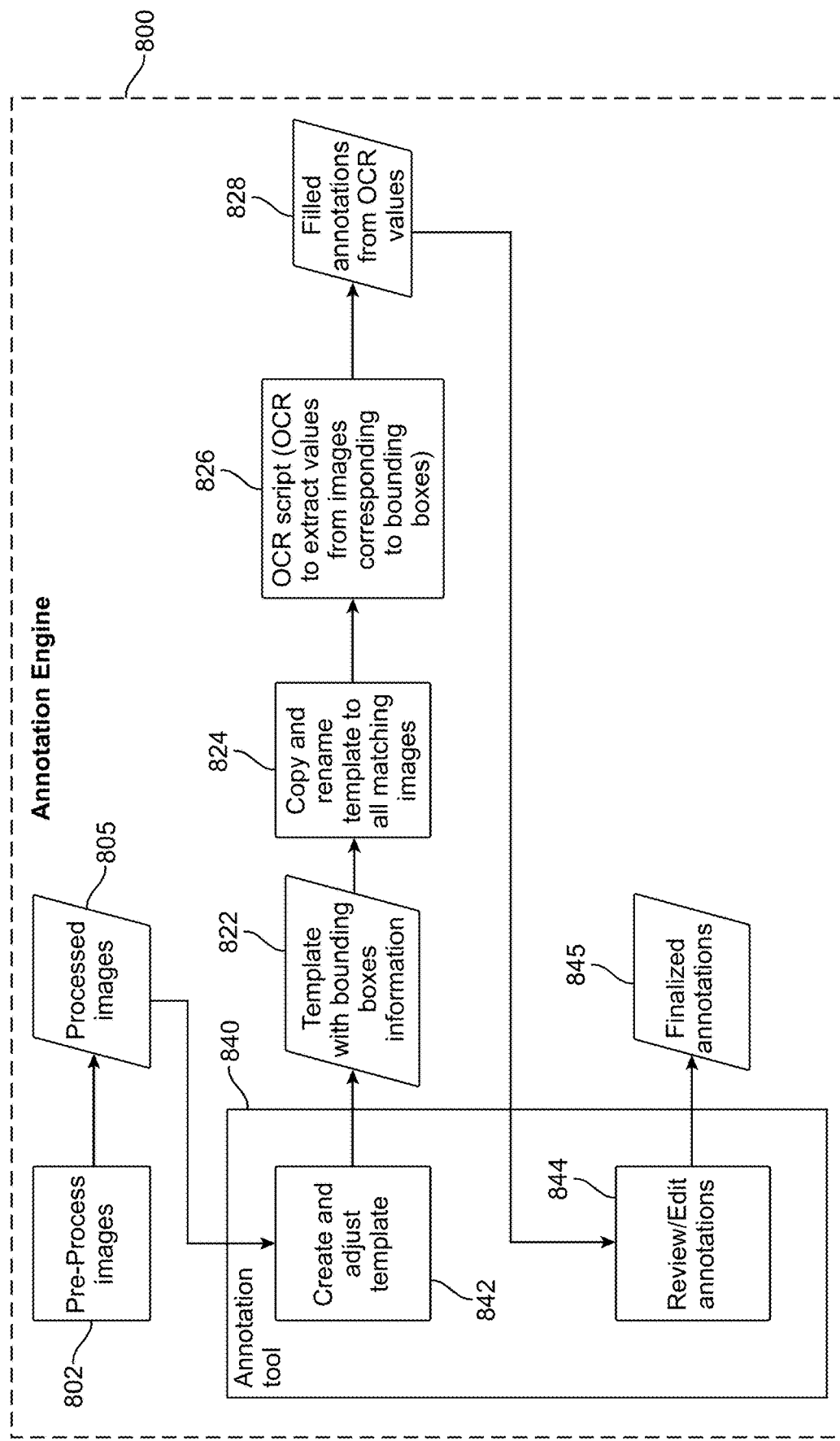
FIG. 8 is a diagram illustrating an example architecture for an annotation engine, in accordance with some examples.

The disclosure turns next to a discussion of FIG. 8 and the annotation engine 800, which can be the same as or similar to the data annotation engine 510 of FIG. 5. In particular, FIG. 8 is a diagram illustrating an example architecture for an annotation engine 800, which can be included in or otherwise associated with the ML data processing engine 310 of FIG. 3; the ML data processing engine 410 of FIG. 4; etc. In one illustrative example, the annotation engine 800 of FIG. 8 can be used to perform data annotation to generate training data for training one or more ML/AI models used to implement the system architecture 300 of FIG. 3. For instance, the annotation engine 800 of FIG. 8 may be the same as or similar to the data annotation engine 510 of FIG. 5. In some aspects, the annotation engine 800 of FIG. 8 may be used to generate annotated training data corresponding to one or more of the ML/AI model training pipeline 500 of FIG. 5; the ML/AI model operational pipeline 630 of FIG. 6A; the ML/AI model training pipeline 670 of FIG. 6B; etc.

In some examples, the annotation engine 800 of FIG. 8 can generate one or more finalized annotations 845 corresponding to or otherwise included in annotated training data. For instance, the annotations 845 can be the same as or similar to annotation information or annotated data stored in the ML/AI model training database 624 of FIG. 6A; may be the same as or similar to annotation information or annotated data stored in the redacted data for ML/AI model training 676 of FIG. 6B; etc. In some embodiments, the annotation engine 800 of FIG. 8 can be associated with one or more of the annotation tools and scripts 506 depicted in the ML/AI model training pipeline 500 of FIG. 5. In some aspects, the annotation engine 800 can include a pre-processing engine or pre-processing stage 802 that may be the same as or similar to the preprocessing engine 700 of FIG. 7. For example, the processed images 805 (e.g., pre-processed images 805) can be the same as or similar to the processed output data 732 generated by the preprocessing engine 700 of FIG. 7.

In some cases, the annotation engine 800 of FIG. 8 can include and/or can be used to implement an annotation tool 840 that is the same as or similar to the annotation tools and scripts 506 of FIG. 5. The annotation tool 840 can be used to provide one or more graphical user interfaces (GUIs) to perform a hybrid manual-automated process for generating annotated training data or finalized annotations 845. For instance, the annotation tool 840 can be used to create and adjust templates at 842 and can be used to review and edit automatically generated annotations at 844.

In some embodiments, a first annotation tool 840 GUI is associated with the creation and adjustment of templates at block 842. For instance, the template creation and adjustment GUI associated with the first annotation tool 840 and block 842 can be the same as or similar to the example GUI 900 of FIG. 9.

In particular, FIG. 9A illustrates an example annotation GUI 900 corresponding to a template adjustment and creation mode for the annotation engine 840 of FIG. 8. As illustrated, the example annotation GUI 900 comprises a template corresponding to an example perio chart. The example annotation GUI 900 of FIG. 9 can present an annotation template that is the same as or similar to the annotation template 822 of FIG. 8. For example, the annotation template can include bounding box information or region of interest (ROI) information overlaid onto particular locations or positions of the template. Each bounding box or ROI within the template 822/900 can correspond to a text field or identified text/numerical information that is expected to be present in the underlying document type (e.g., in this example, a perio chart) for the template 822. For instance, the perio chart annotation template depicted in the example annotation GUI 900 of FIG. 9 includes a plurality of bounding boxes/ROIs that are provided at the corresponding locations of text information that is of interest for extraction from an input perio chart.

In some aspects, the example GUI 900 can depict an annotation template (e.g., the same as or similar to annotation template 822) that comprises a user-adjustable template for fitting regions of interest (ROI) text into corresponding bounding boxes. In one illustrative example, a user (e.g., a user of the GUI 900) can align the annotation template 822 with an input perio chart image (e.g., a periodontal chart image included in the training data provided as input to the data annotation engine 510/800). After aligning the annotation template with the input image of the same corresponding document type as the annotation template, the annotation tool 840 can capture the ROI positions for text extraction.

At block 824 of FIG. 8, the annotation engine 800 can copy the annotation template 822 to all of the input training data images that are identified as a match to the particular annotation template 822. The identified matching images for an annotation template can be identified based on the underlying document type, format, structured format, etc. In some examples, the copied files associated with block 824 can be renamed according to the corresponding image file names.

At block 826, the annotation engine 800 can implement an OCR script that is configured to process the perio chart image (e.g., a pre-processed image 805 provided as input to the annotation tool 840) using the predefined ROI bounding boxes of the annotation template 822 corresponding to the periodontal chart image/document image type. In particular, the OCR script utilized at block 826 of annotation engine 800 can be used to extract the textual values (e.g., textual content, textual data, textual information, etc.) from the perio chart image within each of the annotation ROI regions indicated by the annotation template 822.

At block 828, the annotation engine 800 can be configured to automatically populate the annotation template 822 with filled annotations determined from the OCR textual values extracted at block 826. For instance, the annotation engine 800 can use the OCR-extracted textual values from block 826 to automatically populate the annotation template displayed in the first annotation GUI 900 of FIG. 9A.

The annotation tool 840 can utilize a second GUI to enable the user to perform review and/or editing of the automatically generated annotations determined at block 826 and populated to the template at block 828. For instance, block 844 within annotation tool 840 can correspond to the output of an annotation review interface (e.g., GUI), wherein the annotation review interface/GUI comprises the annotation template of GUI 900 updated to reflect the template fields as populated with the OCR-extracted annotation information determined at block 826 of FIG. 8.

Figure 9B:
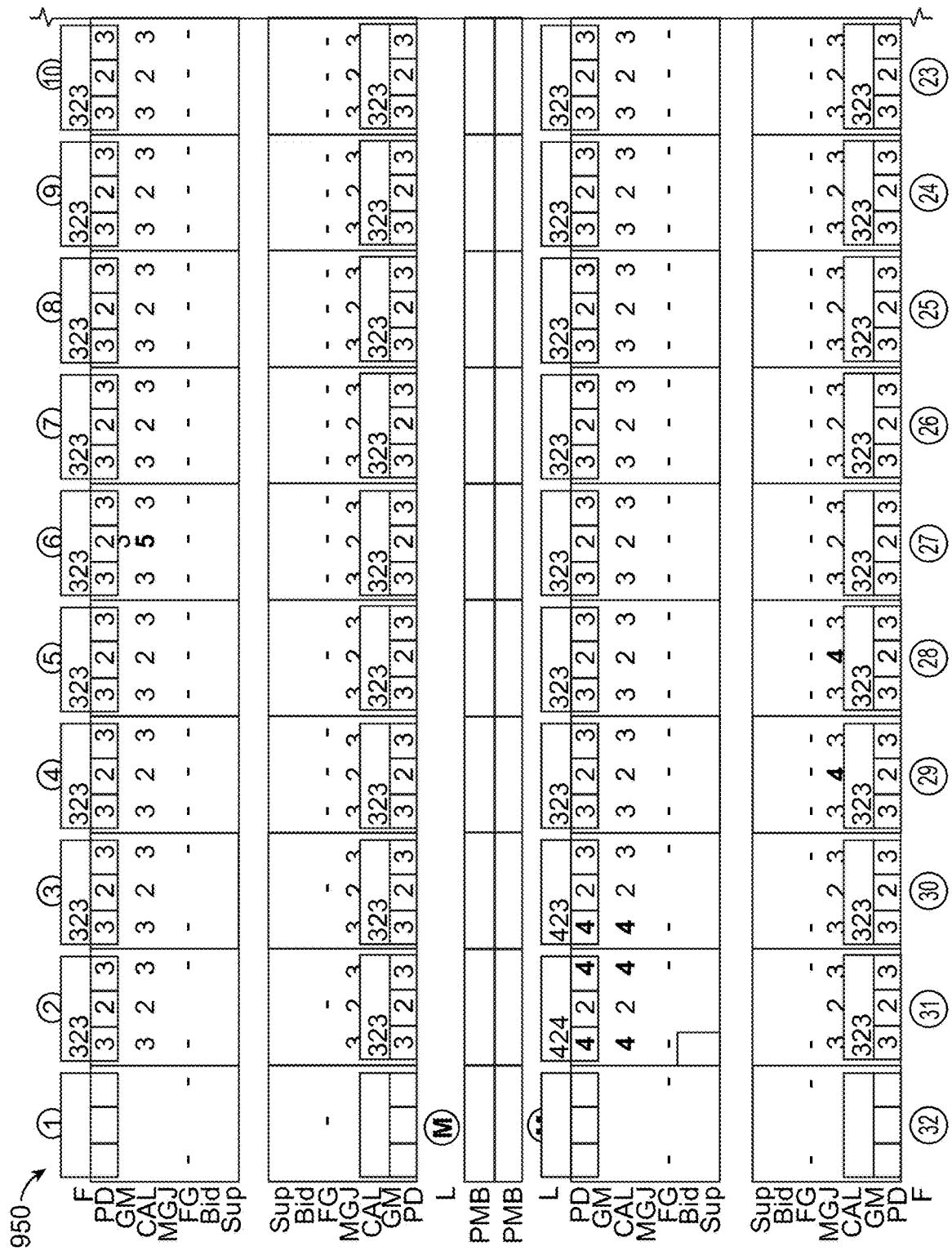
FIG. 9B is a diagram illustrating an example GUI corresponding to OCR-extracted values populated for review within the example GUI of FIG. 9A, in accordance with some examples.

In one illustrative example, the annotation reviewing and editing GUI associated with the annotation tool 840 and block 844 can be the same as or similar to the example GUI 950 of FIG. 9B. In particular, FIG. 9B illustrates an example annotation GUI 950 corresponding to the review and/or editing of OCR-extracted annotation values at block 844 of the annotation engine 800 of FIG. 8. For instance, the example annotation GUI 950 can be used to display to a user (and to receive corresponding user input associated with) the one or more OCR-extracted annotation values 828 that are automatically generated and populated for review within the example GUI 900 of FIG. 9A, in accordance with some examples.

In some aspects, the review interface/GUI 844 of FIG. 8 and/or the review interface/GUI 950 of FIG. 9B can be configured to allow a user to inspect and correct the extracted values determined by the annotation engine 800 and the OCR script. Based on providing one or more corrections to the review interface/GUI 844/950, the user can ensure that accurate data annotation information is generated and output by the annotation engine 800 (e.g., output as the finalized annotations 845 shown in FIG. 8). In particular, the annotation review interface/GUI 844 of FIGS. 8 and/or 9450 of FIG. 9B can enable the efficient error correction of annotation information, without requiring the manual entry of key-value pairs to generate the finalized annotations information 845.

In some aspects, the data annotation engine 510 and/or the annotation engine 800 of FIG. 8 can be configured to generate finalized annotation data (e.g., the finalized annotations 845 of FIG. 8, etc.) using an export functionality that finalizes and downloads the annotation file (e.g., annotation metadata) generated for the processed perio chart image or other training data input image provided to the data annotation engine 510/800. In some aspects, the exported annotation metadata can be output from the data annotation engine 510 of FIG. 5 and stored in the cloud bucket/drive 515 of FIG. 5 (e.g., the finalized annotations 845 of FIG. 8 may be output to and stored in the cloud bucket/drive 515 of FIG. 5). Notably, the annotation engine 510 of FIG. 5 and/or the annotation engine 800 of FIG. 8 can be configured to provide a repeatable process for automatically generating and reviewing/validating annotation metadata for a plurality of training data document image inputs, allowing users to repeatedly execute the annotation engine steps described above to obtain corresponding annotation metadata for a plurality of input document images (e.g., as long as the underlying template remains unchanged).

In one illustrative example, the systems and techniques described herein can implement one or more structured schema for metadata organization (e.g., annotation metadata organization). For instance, the structured schema can be implemented by the annotation engine 510 of FIG. 5 and/or the annotation engine 800 of FIG. 8. In some aspects, the structured metadata schema can be used to further enhance the performance of corresponding ML/AI models that utilize the structured metadata schema during training or inference. For instance, a structured metadata schema can be designed to effectively organize the annotated data (e.g., key-value pairs) generated or otherwise determined by the annotation engine 510/800. The organization of the structured metadata schema can be based on a corresponding format of the training data that will be shown to a pre-trained ML or AI model. For instance, the structured metadata scheme for a particular document image type can mimic the format of the training data (and annotation metadata) that are shown to an ML or AI model that is trained to process the particular document image type.

In some embodiments, the structured metadata schema can be designed to preserve one or more (or both) of the hierarchical relationships and/or the spatial relationships between text categories and subcategories within a particular document image type. Accordingly, the hierarchical and/or spatial relationship information conveyed by the structured metadata schema can be seen to facilitate a typical left-to-right, top-to-bottom readable structure. In some aspects, the strategic organization encoded by the structured metadata schema can improve the overall performance and accuracy of the resulting ML/AI models that are trained using the structured metadata schema, for instance such as when the trained ML/AI models are working with artifacts such as perio charts, claim form document images, etc.

Presented below is an example of a structured metadata schema that can be used as a target schema for perio chart data extraction and/or processing using a trained ML or AI model, according to aspects of the present disclosure:

target_schema=
{
"g1": {"B1": " ", "B2": " ", "B3": " ", "B4": " ", "B5": " ", "B6": " ", "B7": " ", "B8": " ", "B9": " ", "B10": " ", "B11": " ", "B12": " ", "B13": " ", "B14": " ", "B15": " ", "B16": " "},
"g2": {"L1": " ", "L2": " ", "L3": " ", "L4": " ", "L5": " ", "L6": " ", "L7": " ", "L8": " ", "L9": " ", "L10": " ", "L11": " ", "L12": " ", "L13": " ", "L14": " ", "L15": " ", "L16": " "},
"g3": {"L32": " ", "L31": " ", "L30": " ", "L29": " ", "L28": " ", "L27": " ", "L26": " ", "L25": " ", "L24": " ", "L23": " ", "L22": " ", "L21": " ", "L20": " ", "L19": " ", "L18": " ", "L17": " "}
"g4": {"B32": " ", "B31": " ", "B30": " ", "B29": " ", "B28": " ", "B27": " ", "B26": " ", "B25": " ", "B24": " ", "B23": " ", "B22": " ", "B21": " ", "B20": " ", "B19": " ", "B18": " ", "B17": " "}
}

In another example, presented below is an example of a structured metadata schema that can be used as a target schema for ADA claims form data extraction and/or processing using a trained ML or AI model, according to aspects of the present disclosure:

target_schema=
{
'header': [{'box1': "}, {'box2': "}, ],
'dental_info': {'box3': "},
'other': [{'box4': "}, {'box5': "}, {'box6': "}, {'box7': "}, {'box8': "}, {'box9': "}, {'box10': "}, {'box11': "}, ],
'sub_info': [{'box12': "}, {'box13': "}, {'box14': "}, {'box15': "}, {'box16': "}, {'box17': "}, ],
'patient': [{'box18': "}, {'box20': "}, {'box21': "}, {'box22': "}, {'box23': "}, ],
'ros': [
  {'row1': [{'box24': "}, {'box25': "}, {'box26': "}, {'box27': "}, {'box28': "}, {'box29': "}, {'box29a': "}, {'box29b': "}, {'box30': "}, {'box31': "}, ], },
  {'row2': [{'box24': "}, {'box25': "}, {'box26': "}, {'box27': "}, {'box28': "}, {'box29': "}, {'box29a': "}, {'box29b': "}, {'box30': "}, {'box31': "}, ], }, -till 'row10'
],
'missing': [
  {'1': "}, {'2': "}, {'3': "}, {'4': "}, {'5': "}, {'6': "}, {'7': "}, {'8': "}, {'9': "}, {'10': "}, {'11': "}, {'12': "}, {'13': "}, {'14': "}, {'15': "}, {'16': "}, {'32': "}, {'31': "}, {'30': "}, {'29': "}, {'28': "}, {'27': "}, {'26': "}, {'25': "}, {'24': "}, {'23': "}, {'22': "}, {'21': "}, {'20': "}, {'19': "}, {'18': "}, {'17': "},
],
'ros_summary': [
  {'box34_1': "}, {'box34_2': "}, {'box31a_1': "}, {'box31a_2': "}, {'box32': "}, {'box35': " "},
],
'ancillary': [
  {'box38': "}, {'box39': "}, {'box40': "}, {'box41': "}, {'box42': "}, {'box43': "}, {'box44': "},
],

```
'billing': [
    {'box48': "}, {'box49': "}, {'box50': "}, {'box51': "},
        {'box52': "}, {'box52a': "},
],
'treating': [
    {'box53': "}, {'box54': "}, {'box55': "}, {'box56': "},
        {'box56a': "}, {'box57': "}, {'box58': "},
],
}
```

In some embodiments, the annotation engine 510 of FIG. 5 and/or the annotation engine 800 of FIG. 8 can be used to implement semi-supervised annotation. For instance, one or more pre-trained ML or AI models can be used to suggest key-value pair annotations based on training of the model that is previously performed using a smaller, manually annotated dataset of input images of the same or similar type and content, etc. In some aspects, the semi-supervised annotation ML or AI models can be used to augment or replace the OCR extraction implemented at block 826 of the annotation engine 800 of FIG. 8. Notably, the semi-supervised annotation approach can reduce the effort, time, complexity, etc., required for or otherwise associated with the manual annotation of at least a portion of the training data input document images 805. Additionally, semi-supervised annotation implemented by the annotation engine 510/800 can maintain high-quality metadata for subsequent or downstream training purposes (e.g., training of the one or more ML or AI models according to aspects of the present disclosure). In some embodiments, generated annotations or annotation metadata output by a semi-supervised annotation ML/AI model can be reviewed and corrected by a human annotator to further improve the efficiency of the process, e.g., in a manner the same as or similar to the human review and correction described above with respect to block 844 of FIG. 8 and the review GUI 950 of FIG. 9B.

In some embodiments, the annotation engine 510/800 can implement automated metadata validation. For example, the review/edit annotations block 844 included within the annotation tool 840 of annotation engine 800 of FIG. 8 can be configured to perform automated metadata validation of the OCR-extracted (or semi-supervised learning output) annotation information determined at block 828. In one illustrative example, the automated metadata validation can be performed based on cross-reference the generated annotation metadata with one or more original artifacts of the underlying document image. For instance, the generated annotation metadata can be cross-referenced with known properties, limits, value ranges, value types, expected text or numerical values per field, etc., that is known in advance for the particular document image type for which the annotation metadata was generated. In some aspects, the automated metadata validation can be used to identify one or more potential discrepancies in the key-value pairs of the generated annotation metadata 828. In some embodiments, the automated metadata validation can further perform automatic correction of some (or all) of the automatically identified potential key-value pair discrepancies. In some examples, the automated metadata validation may flag some (or all) of the identified potential key-value pair discrepancies for manual review by a human annotator or reviewer, thereby ensuring the highest possible quality of annotation metadata in the finalized annotations 845 for training the downstream ML/AI models described herein.

In some embodiments, the annotation engine 510/800 can be configured to implement or otherwise integrate an active learning approach for improving the annotation process continually over time. For instance, after the finalized annotations 845 are used to perform training of one or more ML/AI models, the initial trained ML/AI model(s) can be configured to iteratively select the most informative samples from the unlabeled dataset for human annotators to review and label. In some aspects, the most informative samples are selected for human annotation in order to ensure the greatest possibly accuracy for these samples, based on the predicted information-carrying potential associated with the most informative samples for further training of the ML/AI models. In some cases, the active learning approach of manually labeling the subset of samples that are automatically identified (e.g., by annotation engine 510, 800, etc.) as the most informative for training can be seen to improve the performance of the resulting trained ML/AI models. Moreover, the trained ML/AI model performance can be improved more rapidly based on the active learning approach being configured to more rapidly focus the model's learning on the most uncertain and/or challenging samples of the training data set (e.g., those unlabeled samples identified as the most informative and sent to manual annotation by a human reviewer).

Figure 7:
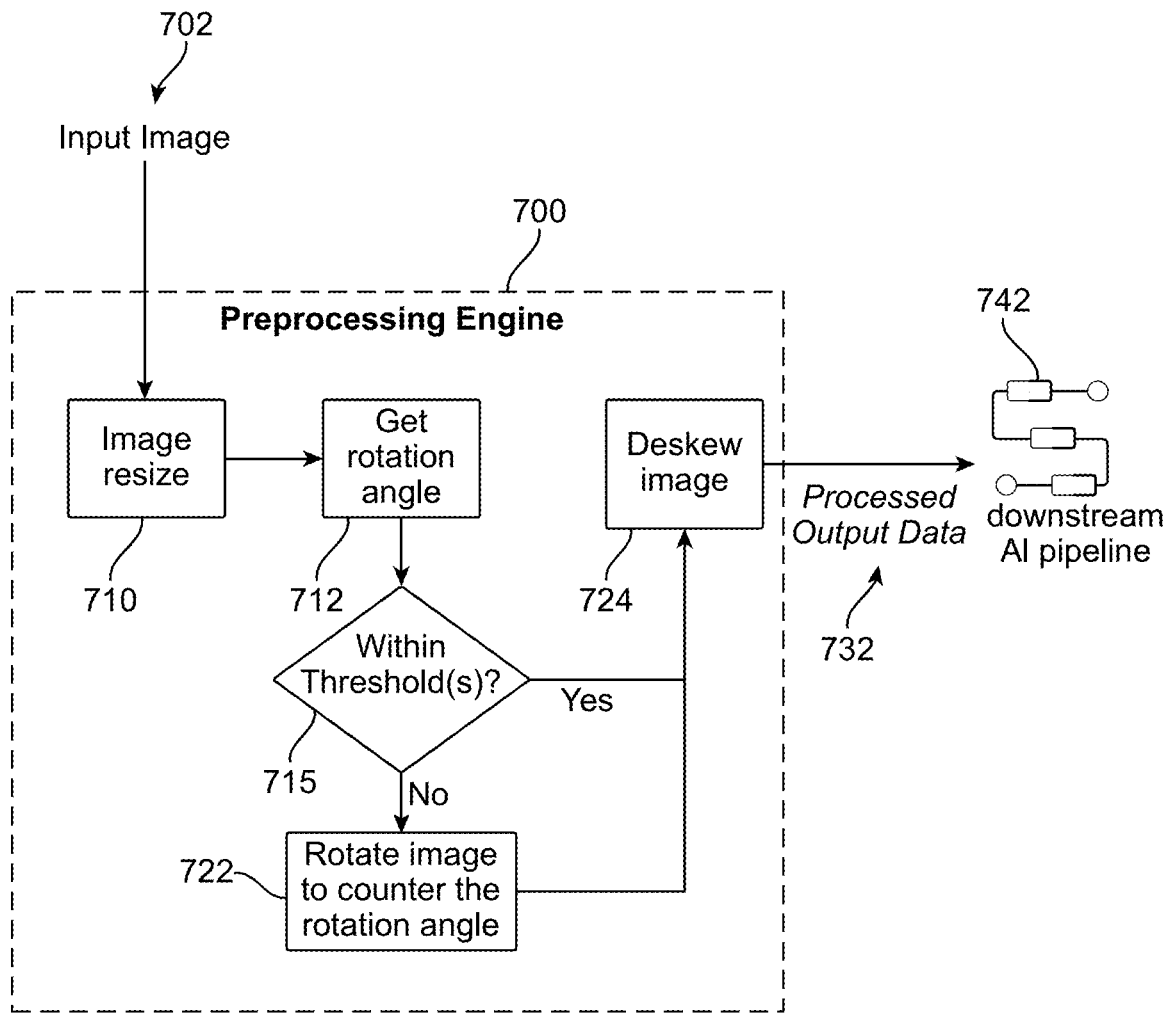
FIG. 7 is a diagram illustrating an example architecture for a preprocessing engine, in accordance with some examples.

In some embodiments, one or more (or all) of the data augmentation operations described previously above (e.g., with respect to the data augmentation engine 516 of FIG. 5) can be implemented by a preprocessing engine 518 also included in the ML/AI model training pipeline 500 of FIG. 5 (which may be the same as or similar to the preprocessing engine 700 of FIG. 7). In particular, FIG. 7 is a diagram illustrating an example architecture for a preprocessing engine 700, which can be included in or associated with the ML data processing engine 310 of FIG. 3; the ML data processing engine 410 of FIG. 4; etc.

In some examples, the preprocessing engine 700 of FIG. 7 can be used to perform preprocessing operations for the image artifacts (e.g., document images) 355 of FIG. 3; the image artifacts (e.g., document images) 455 of FIG. 4; etc. In some cases, the preprocessing engine 700 of FIG. 7 can be used to implement one or more of the data synthesis operations 514, the data de-identification process 504, the data annotation process 510, the data split and augmentation operations 516, and/or the pre-processing operations 518 included within the ML/AI model training pipeline 500 of FIG. 5.

In some embodiments, the preprocessing engine 700 of FIG. 7 can be used to implement preprocessing operations that are configured to simulate the types of errata that may be observed or present in the input images seen by the trained ML/AI model during inference. For instance, during inference, input images may occasionally be scanned erratically, resulting in rotated images. These rotations can occur in several ways, each of which may be simulated by the preprocessing engine 700 for an input image 702. For example, an image may be horizontally rotated, which can cause the text within the scanned image (e.g., the document text depicted in the scan) to appear skewed, and may read either bottom-to-top or top-to-bottom. An image may be rotated to be upside down in some cases. In other examples, scanned images may exhibit minor misalignments, skews, etc.

Accordingly, the trained ML/AI model's prediction accuracy may be adversely affected (e.g., may decrease in response to receiving input images comprising an erratically scanned document). In one illustrative example, the systems and techniques described herein can address this accuracy challenge based on using the preprocessing engine 518 of FIG. 5 and/or the preprocessing engine 700 of FIG. 7 to perform preprocessing for the input image 702. At block 710, the input image 702 can be resized. At block 712, the rotation angle can be determined (e.g., "get rotation angle"). In some aspects, the preprocessing engine 700 identifies the angle of rotation at block 712, and subsequently rotates the image (e.g., resized image 710, corresponding to input image 702) counter to the identified/detected rotation angle 712, with the counter rotation performed at block 722. In some aspects, the preprocessing engine 700 may perform the counter rotation of block 722 based on comparing the rotation angle 712 to one or more pre-determined or configured threshold values indicative of a rotation angle limit. Based on a determination that the rotation angle 712 is not within the configured threshold(s) (e.g., the rotation angle 712 is greater than the configured rotation angle limit 715), the preprocessing engine can proceed to performing the counter rotation 722 based on the rotation angle 712. In some embodiments, the counter rotation 722 based on the identified/detected rotation angle 712 can achieve a proper alignment of the output processed image 732, which can then be provided to one or more components of a downstream ML/AI processing pipeline 742. For instance, the processed output data 732 of FIG. 7 can be provided as input to the model training and finetuning 520 of the ML/AI model training pipeline 500 of FIG. 5.

In some embodiments, the preprocessing engine 700 can include a deskew function 724, which can be used to apply one or more deskewing operations prior to outputting the processed output data 732 to the downstream ML/AI pipeline 742. For instance, the deskew function 724 can apply a deskew library to correct any remaining minor skews after the counter rotation of the image at 722. In some cases, the deskew 724 may be applied to both output paths of the threshold check 715 (e.g., deskew 724 can be applied regardless of whether the image is above or below the threshold(s) 715.

As noted previously, the output of the preprocessing engine 518 can be training data that has been de-identified of PHI (e.g., using de-identification process 504), has been annotated (e.g., using annotation engine 510 and/or annotation tools and scripts 506), has been augmented as needed or desired (e.g., using data augmentation engine 516), and has been pre-processed (e.g., using pre-processing engine 518).

As illustrated, the ML/AI model training and finetuning engine 520 can use the annotated and pre-processed training data generated by pre-processing engine 518 (e.g., the processed output data 732 of FIG. 7) to perform training and/or finetuning operations for one or multiple ML/AI models. As described previously, in at least some embodiments the systems and techniques described herein can be used to train and/or finetune OCR-free and visual document understanding (VDU) ML/AI models to perform text extraction from document images.

For instance, the ML/AI model training and finetuning engine 520 can be used to train one or more document understanding transformer (Donut) models, one or more pix2struct models, etc. In general, OCR-free machine learning models can be used to perform document processing tasks, such as text extraction, based on the model being designed to understand and analyze an input document without first converting the text into machine-encoded text (e.g., as would be done in a conventional, OCR-based processing workflow). In other words, conventional OCR-based techniques function based on first extracting text directly from images and applying one or more subsequent processing steps to the extracted text to generate an output based on the text. By contrast, OCR-free models are able work directly on the image data without the use of an intermediate machine-readable text extraction—for instance, OCR-free models can generate a processed output based on text within the image, based on the OCR-free model receiving the image as input.

OCR-free machine learning models can be implemented using various architectures and/or combinations of multiple architectures, models, etc. In some examples, OCR-free models may be based on various transformer architectures and models. OCR-free models can additionally be associated with implementations that utilize pre-trained transformer-based language models for various NLP tasks. Examples of large, pre-trained transformer-based language models may include, but are not limited to, BERT (Bidirectional Encoder Representations from Transformers), GPT (Generative Pre-trained Transformer), etc.

In one illustrative example, the systems and techniques can perform model training and finetuning 520 for a pre-trained, transformer-based Donut model. In some aspects, the Donut model is selected for its ability to directly extract desired key-value pairs from images. The pre-trained Donut model can be trained using one or more previously generated training datasets that are stored in a datasets repository 525. The previously generated training datasets may be generated as described above with respect to the various upstream components of the ML/AI model training pipeline 500.

Notably, the OCR-free characteristics and functionality of the Donut model can eliminate the conventional need for multi-step processed to extract and analyze textual information from document images. Accordingly, the model training 520 can be performed to enable the Donut model (or various other OCR-free ML/AI models) to implement an end-to-end extraction of the relevant textual information and related data from input document images, image artifacts, etc. The Donut model is configured to model a direct mapping from a raw input image to the desired output without OCR. In some aspects, the Donut model can be implemented based at least in part on vision transformers (ViTs). As noted above, a baseline or backbone utilized by the systems and techniques described herein can be based on a pre-trained Donut model that is further trained and finetuned on the dataset(s) repository 525 using the model training and finetuning engine 520. In the initial pre-training phase, the Donut model is trained to learn how to read text from document image inputs (e.g., by predicting the next words of a sequence by conditioning jointly on the image and previous text contents). The pre-training can be performed using a set of document images and corresponding ground-truth text annotations indicative of the textual content within each document image. Synthetic data (e.g., the same as or similar to the synthetic data generated using the data synthesizing engine 514 and/or the data split and augmentation engine 516) can be utilized to implement domain and language flexibility as needed, based on performing additional pre-training with corresponding synthetic data generated for the additional domain(s), language(s), etc., of interest. In a subsequent fine-tuning stage (e.g., performed after the pre-training stage described above), the Donut model can be trained to understand the whole document according to a particular downstream task that is to be performed by the trained Donut model.

In particular, the Donut model may be implemented as an end-to-end (e.g., self-contained) visual document understanding (VDU) model, comprising a vision-based transformer encoder coupled to a text-based transformer decoder. For instance, a Donut model can include transformer-based visual encoder that extracts features from a given document image input, and a transformer-based textual decoder that maps the derived features into a sequence of subword tokens to construct a desired structured format output (e.g., JSON, etc.). In one illustrative example, the model training and finetuning engine 520 can train and/or finetune the pre-trained Donut model textual decoder to map derived features from the visual encoder into a structured format output given as the structured metadata schema previously described above (e.g., the structured metadata schema format corresponding to a particular document image type, such as a perio chart, ADA claims form, etc.). In some aspects, the pre-trained Donut model can be used to implement transfer learning, based on implementing the learn to read phase for finetuning training of the Donut model over the domain-specific information corresponding to the inference task being performed (e.g., text extraction from ADA documents, perio charts, insurance claim forms, etc.). In some embodiments, training and/or finetuning of the Donut model can include removing any non-English tokens and corresponding embeddings from a pre-trained Donut base model. Removing non-English tokens and embeddings can reduce the size of the Donut model, can improve the inference speed or performance, and/or can increase the inference accuracy of the resultant Donut model (e.g., as non-English words are not included in the desired output space of possible words that can be recognized and extracted from the ADA forms, perio charts, insurance claims forms, etc., which are expected to be filled out in English only).

As illustrated in the ML/AI model training pipeline 500 of FIG. 5, the model training and finetuning 520 can be iteratively combined with a model evaluation stage 522, prior to the subsequent or eventual model selection for deployment 524. In one illustrative example, the model training and finetuning 520 and model evaluation stage 522 of FIG. 5 can be the same as or similar to the continuous learning loop 620 of FIG. 6A and/or can be the same as or similar to the ML/AI model training process 678 implemented in the ML/AI model training pipeline 670 of FIG. 6B.

The model selection for deployment 524 can be performed based on metrics and other data measured or otherwise determined during the model evaluation stage 522 of the training process. One or more trained OCR-free models (e.g., Donut, pix2struct, etc.) can be selected for deployment and passed to a model versioning and performance logging engine 527, prior to the model being stored in a repository of trained models 535. The model repository 535 (and/or datasets repository 525) may be cloud-based, for instance associated with the cloud bucket/drive 515. In some aspects, the model repository 525 of FIG. 5 can be the same as or similar to the repository of pre-trained ML/AI models 628 of FIG. 6A (e.g., and the model training and finetuning 520 and model evaluation 522 of FIG. 5 can be the same as or similar to the ML/AI model training and validation stage 626 of FIG. 6A and the continuous learning loop 620).

Similarly, the ML/AI model evaluation 522 of FIG. 5 and/or the ML/AI model training and validation stage 626 of FIG. 6A may be the same as or similar to the ML/AI model versioning 682 of the ML/AI model training pipeline 670 of FIG. 6B and/or the evaluation/baselining/benchmarking process 684 also included in FIG. 6B. FIG. 6B is a diagram illustrating an example ML/AI model training pipeline 670 and associated workflow 600b. The ML/AI model training pipeline 670 of FIG. 6B can be used to perform an ML/AI model training process 678 that can be used to train one or more (or all) of the various ML and AI models described herein. For instance, the deployed ML/AI models 698 of FIG. 6A may be the same as or similar to the deployed ML/AI models 530 of FIG. 5, etc. In some embodiments, the ML/AI model training pipeline 670 of FIG. 6B can be included in or associated with the ML/AI model training pipeline 500 of FIG. 5, or vice versa.

In some embodiments, the model selection for deployment stage 524 of FIG. 5 can be used to select one or more trained ML/AI models that are suitable for deployment to begin performing inference on live customer or user data. Model deployment can comprise running the selected trained model in the cloud, based on retrieving or accessing the trained model stored within the cloud-based model repository 535 for instance. As illustrated, a selected model from the model selection stage 524 can be deployed at the model deployment stage 530 (e.g., which may also refer to the one or more selected ML/AI models for deployment themselves, i.e., selected or deployed ML and AI models 530, as used herein).

In some aspects, model deployment 530 of FIG. 5 can correspond to the deployment of a trained ML/AI model from the pre-trained model database 628 of FIG. 6A to the OCR-free model inference stage 636, also shown in FIG. 6A. In some examples, the model deployment 530 of FIG. 5 can additionally, or alternatively, correspond to the deployment of a trained ML/AI model from the trained model database 682 of FIG. 6B in the cloud deployment process 686, also of FIG. 6B. In some aspects, cloud deployment process 686 may refer to the storage of a trained OCR-free ML/AI model in a cloud repository where the trained model is then made available to one or more users for performing inference on live data. For instance, a trained model can be deployed to the cloud repository in the cloud deployment process 686 of FIG. 6B, but is not actually used to perform inference until the model deployment to inference stage 698, also of FIG. 6B (e.g., wherein the model deployment to inference stage 698 is included in the ML/AI model inference pipeline 690 of FIG. 6B).

Continuous learning and/or evaluation of model performance can be performed after an initial training stage, and for instance can be performed based on the periodic monitoring and evaluation of production data generated using one or more of the trained ML/AI models described herein. For instance, additional model performance evaluation and analysis may be performed on production data comprising inference predictions or other inference outputs generated using a trained ML/AI model that receives as input live/ production data for analysis (e.g., for inference).

In some examples, the evaluation of model performance on production data can be based on implementing one or more (or both) of a text drift model and an image drift model, each of which are described in turn below.

In some embodiments, a text drift model can be implemented as an automated scheduled job that is configured to periodically monitor production data outputs (e.g., inference outputs, inference predictions, etc.) associated with a trained ML/AI model. In the context of a trained OCR-free ML/AI model used to extract text information from a particular type of form or known text document structure (e.g., ADA form, insurance claims form, perio chart, etc.), a text drift model can be used to compare the text present in the inference output corresponding to a particular form type to the benchmarked training data corresponding to the same particular form type. In one illustrative example, a text drift model can be used to periodically monitor production data generated as the inference outputs of a trained OCR-free ML/AI model trained to extract text information from ADA forms, wherein the text drift model compares the inference outputs for ADA forms to the benchmarked training data for ADA forms.

For instance, in a training stage associated with implementing the text drift model, the text is extracted from the ADA predictions and one or more pre-trained sentence transformer models can be used to embed the textual data into numerical vectors. The embedded textual data can then be reduced using Principal Component Analysis (PCA) into numerical vectors with a manageable or desired dimensionality (e.g., PCA can be used to reduce the dimensionality of the numerical vector embeddings of the textual data extracted from the ADA predictions). In some embodiments, the training stage for the text drift model and/or the one or more pre-trained sentence transformer models can be implemented in the model evaluation stage 522 of FIG. 5 and/or the model performance logging stage 527 of FIG. 5. In some cases, the text drift model can be implemented in the continuous learning loop 620 of FIG. 6 and/or in the training and validation of AI model stage 626 of FIG. 6.

Inference using the text drift model can be performed based on utilizing as input a batch of randomly sampled images in a given time interval (e.g., randomly sampled images of ADA forms that are also provided as input to the trained OCR-free ML/AI model being evaluated using the text drift model). The randomly sampled images used for the text drift model inference can be obtained from the same pipeline as the input images provided to the trained OCR-free ML/AI model for inference. For example, the text drift model can perform inference using a batch of randomly sampled images in a given time interval that are the same as or similar to the inference input document image 634 shown in FIG. 6 as being obtained from the claims to be processed queue 632 and/or upstream workflows 602, etc.

Inference using the trained text drift model can further include obtaining the corresponding text embeddings for the batch of randomly sampled ADA images, using the same pre-trained sentence transformer model(s) that were described above as being used during the training stage of the text drift model. Based on the text embeddings for the randomly sampled batch of ADA images, a Wasserstein distance can be computed. In particular, the Wasserstein distance can be calculated between the text embeddings generated using the pre-trained sentence transformer models and the text embeddings generated as the production data/inference output by the trained OCR-free ML/AI model 636 of FIG. 6.

The Wasserstein distance is a metric that represents or quantifies the difference between two probability distributions. Accordingly, the Wasserstein distance can be computed between the training and testing embeddings to determine if a significant drift in the textual data has occurred. The Wasserstein distance information determined by the text drift model can be compared to one or more pre-determined or configured thresholds. If the Wasserstein distance is above the one or more configured thresholds, the text drift model can generate an alert that text drift is occurring or has likely occurred for the model being analyzed. For instance, if the text extracted on the production images recurrently drifts away from the training set, this drift (e.g., as indicated by the Wasserstein distance from the text drift model) may indicate that the benchmark dataset should be updated or refined, to ensure that the trained model remains relevant and accurate for text extraction for ADA predictions (or other particular form used in the inference pipeline of the trained model).

In another illustrative example, the systems and techniques can additionally, or alternatively, include one or more image drift models configured to monitor and alert on potential divergences between training images and production images over time. For instance, an image drift model can be implemented based on a training stage and an inference stage, which are described in turn below. The image drift model can identify when the production images received as input for analysis by the trained ML/AI models begin to drift or differ from the types of images that were seen during training of the ML/AI models, which can be an indication that re-training should be performed to ensure that the ML/AI models are relevant and accurate for the type of image data that is commonly being seen in the production image input pipeline or flow.

In a training stage of the image drift model, the image drift model can be configured to utilize the capabilities of the Contrastive Language-Image Pre-training (CLIP) model, which transforms a set of training images into numerical vectors that encapsulate the essence (e.g., characterizing features or aspects, etc.) of each respective image in the set of training images. In some embodiments, to further compact or compress these high-dimensional vectors, while still retaining the core characteristics of the high-dimensional vectors, PCA can be performed to reduce the vector dimensionality, in a manner the same as or similar to the PCA-based dimensionality reduction described above for the text drift model.

The training set (after PCA dimensionality reduction) can be analyzed. For example, the training set's mean and standard deviation can be determined from these compacted vectors (e.g., the reduced dimensionality vectors after PCA), and can be used to form a baseline against which future images (e.g., production images being analyzed during the inference stage of the image drift model) will be assessed. In some embodiments, both the PCA model and the reduced embeddings determined for the set of training images can be saved and stored for future use by the image drift model.

In the inference stage of the image drift model, production images can first undergo the same transformation process as described above for the training stage—each production image can be converted into corresponding embeddings using the CLIP model, and is then dimensionally-reduced using the PCA model derived from the training data set. Subsequently, image drift detection can be performed using the Wasserstein distance, which is computed by the image drift mode in a manner the same as or similar to that described above for the text drift model (e.g., again based on using the Wasserstein distance to quantify the disparity between two distributions, here the training image embeddings and the production image embeddings). The Wasserstein distance, as calculated between the PCA-reduced embeddings of the training data and the PCA-reduced embeddings of the test (e.g., production) data, is used as a drift indicator for the image drift model. For example, a value of the Wasserstein distance greater than a pre-determined or configured threshold can be indicative of a drift in the image data, thus triggering a corresponding alert that image drift is detected. If the production images recurrently drift away from the training set images, this can be used as a signal to update or refine the benchmark training dataset images to ensure that the model remains relevant and accurate to the type and content of images that are commonly being seen during the production data process of providing images for inference to the trained ML/AI models described herein.

In some embodiments, the systems and techniques can utilize Donut models, pix2struct models, and various other OCR-free ML or AI models to obtain enhanced accuracy and performance compared to other conventional implementations, such as OCR-based processing techniques. By utilizing Donut or other OCR-free ML/AI models, the systems and techniques can be used to effectively process and analyze artifacts such as claim forms, charts, and other related image artifacts and document images, thereby delivering reliable and accurate results for further downstream tasks and use cases.

In one illustrative example, the systems and techniques can utilize a multi-model ensemble to perform inference on the input document images or image artifacts of the claims submission process described in the current examples. For instance, the ML/AI model operation pipeline 630 of FIG. 6A and/or the ML/AI model inference 690 of FIG. 6B can implement a multi-model ensemble (and/or may implement single models as well). In particular, in some aspects, the multi-model ensemble (or single model(s)) can be implemented at the OCR-free model inference stage 636 of the ML/AI model operational pipeline 630 of FIG. 6A, and/or may be implemented at the analytical process 695 and inference pipeline 696 of FIG. 6B.

In some aspects, the use of a multi-model ensemble can improve the overall accuracy and reliability of key-value pair extraction during OCR-free model inference stage 636 and/or during the analytical process 695/inference pipeline 696. For instance, the multi-model ensemble approach can combine the predictions (e.g., inference outputs) of various trained models described above, which can assist in mitigation of individual model weaknesses to produce more consistent results. The multiple trained models for the multi-model ensemble approach can be obtained from the model repository 535 of FIG. 5, the pre-trained model database 628 of FIG. 6A, the model database 682 of FIG. 6B, etc. The multiple models of the multi-model ensemble approach may each use a different architecture, or may include multiple instances of models that use the same baseline architecture but are trained/fine-tuned differently, separately, etc.

In one illustrative example, the multi-model ensemble approach can be employed to cross-verify critical field values based on comparing the output predictions from different models of the ensemble, when given the same input data. For instance, for a given document to be inferred 634 (e.g., shown in FIG. 6A), the OCR-free model inference stage 636 can implement multi-model ensemble-based cross-verification based on comparing an inference prediction for document 634 as determined by a Donut-based model with a corresponding inference prediction for the same document 634 as determined by a DocumentAI-based model, etc. The comparison of model inference outputs for the same document to be inferred 634, and the cross-verification thereof, can be used to ensure a higher level of confidence in the extracted key-value pairs that are ultimately determined by the ML/AI model operation pipeline 630 (e.g., the extracted key-value pairs that are written to the database of updated information 654 and/or the extracted key-value pairs that are posted as information to downstream workflows 604 in the output stage 658, each of which is shown in FIG. 6A).

In some embodiments, the output stage 658 is where extracted information/inference predictions, etc., is posted to one or more downstream workflows 604. In some embodiments, the output stage 658 can include or otherwise be associated with a sentiment analysis engine that analyzes the extracted text of the inference prediction 636 to determine whether one or more particular sentiments are expressed or indicated anywhere in the input document image 634. For instance, the sentiment analysis engine can be used to detect any instance of an 'emergency,' 'critical,' 'high-priority,' etc., sentiment indicative of a need for urgent or expedited processing (e.g., rush processing) of the underlying or corresponding claim for the given inference prediction of extracted text.

In one illustrative example, the sentiment analysis engine can be included in the output stage 658 or can be included as a separate processing stage that is performed prior to the output stage 658 (e.g., such as the upstream processing stages for confidence detection 638, postprocessing 646, exception handling 652, etc., each shown as separate processing stages that are performed prior to the output stage 658 of FIG. 6A). In some embodiments, the sentiment analysis engine can be configured to determine sentiment information for the extracted text in the inference prediction 636 generated for each document image input 634. The sentiment information determined by the sentiment analysis engine can be used to generate a ranking for posting the processed claims (e.g., from the claims to be processed queue 632) to the downstream workflows 604. In some embodiments, the sentiment analysis engine can be implemented using a separate and/or corresponding one or more machine learning models (e.g., sentiment analysis ML models).

In some aspects, a first sentiment analysis model can be used to identify or predict sentiment information directly from the extracted text information (e.g., directly from the OCR free model inference prediction 636). A second sentiment analysis model can be used to identify or predict sentiment information visually, for instance from one or more visual cues contained within the input document image 634 used for the OCR-free model inference prediction 636. The first sentiment analysis model (e.g., text-based sentiment analysis model) and the second sentiment analysis model (e.g., image-based sentiment analysis model) can be combined in an overall sentiment detection engine, which may be configured as a sentiment of emergency detection engine. As mentioned previously, the sentiment of emergency detection engine can be used to determine whether a given input to the inference processing pipeline is associated with or indicative of an emergency claims processing instance, and the emergency (or non-emergency) sentiment information determined by the sentiment detection engine can be used for ranking in the posting of processed claims and document images to the downstream workflows 604.

In particular, FIG. 6A is a diagram illustrating an example ML/AI model operational pipeline 630, which may be associated with an ML/AI model inference workflow 600a corresponding to the one or more deployed ML/AI models 530 of FIG. 5; may be associated with an ML/AI model inference workflow corresponding to one or more deployed ML/AI models associated with the ML claims engine 330 and/or the ML data processing engine 310 of FIG. 3; and/or may be associated with an ML/AI model inference workflow corresponding to one or more deployed ML/AI models associated with the ML claims engine 430 and/or the ML data processing engine 410 of FIG. 4; etc.

One or more upstream workflows 602 can feed a claims to be processed queue 632 with input data (e.g., document images, image artifacts, etc.) and associated metadata of claims submissions or other claims-based processing tasks that are to be performed using the OCR-free model inference stage 636. The claims to be processed queue 632 can contain information obtained from a client database, the same as or similar to the client database associated with the client database snapshot information 612 shown in the onboarding stage 610 of FIG. 6A. The claims to be processed queue 632 can also be fed from one or more of the cloud bucket/drive 515 or datasets repository 525 of FIG. 5; from the medical information database 402 of FIG. 4/302 of FIG. 3; from the administrative and clinical edit database 408 of FIG. 4/308 of FIG. 3; from the document images set 455 of FIG. 4/355 of FIG. 3; etc.

In one illustrative example, the systems and techniques can implement continuous learning and a model updating processing in conjunction with the OCR-free model inference stage 636. For instance, the one or more trained ML/AI OCR-free models used in the inference stage 636 can be updated based on continuous learning performed during inference, and/or can be updated as new data becomes available, as the underlying dataset changes, etc. The continuous learning approach can be seen to ensure that the trained ML/AI OCR-free models remain up-to-date and maintain optimal performance in view of evolving data and requirements that may be associated with the larger context in which the ML/AI model operational pipeline 630 is implemented.

In some aspects, continuous learning and model updating can be performed using a human-in-the-loop review. For instance, as shown in FIG. 6A, each prediction or inference output from the OCR-free model inference stage 636 can be automatically evaluated against one or more confidence thresholds 638, which can be configured or pre-determined values. If the model prediction is not above the confidence threshold 638 (e.g., shown as the 'No' branch from decision point 638 in FIG. 6A), the model prediction can be sent to a manual review queue 642.

If the model prediction is above the confidence threshold 638 (e.g., shown as the 'Yes' branch from decision point 638 in FIG. 6A), the model prediction can proceed to a post-processing module 646 (which will be described below with respect to FIGS. 10A and 10B) which can perform various self-contained checks and analyses of the model prediction and/or can perform various checks and analyses of the model prediction against look-up information 648. In general, the post-processing module 646 can be associated with a check for one or more exceptions 652 that may be present in or otherwise triggered by the model prediction. If an exception 652 is triggered or discovered in the prediction, the process flow can also be configured to send the model prediction to the manual review queue 642.

Accordingly, the manual review queue 642 is configured to receive model predictions when either the prediction is below a pre-determined confidence threshold (e.g., evaluated at 638) and when the prediction triggers one or more exceptions (e.g., evaluated at 646 and 652).

The manual review queue 642 can feed the flagged model predictions to a human-in-the-loop review, which can be implemented as the manual review and processing stage 644 shown in FIG. 6A. For instance, the manual review and processing stage 644 can be implemented as follows. Low-confidence scored inferences are held for review based on the automatic identification and hold of the low-confidence predictions for human review, as performed by the confidence threshold evaluation 638 described above. The manual review and processing stage 644 may be used to incorporate expert feedback on the input image and other data that was evaluated by the trained ML/AI model in generating the low-confidence prediction. By incorporating expert feedback, the ML/AI model can learn from the corrections provided in the expert feedback and improve inference accuracy. For instance, the expert feedback or other corrections determined during the human-in-the-loop review 644 can be provided to the continuous learning loop 620 as the data artifacts 622, which are integrated into the ML/AI model training database 624 using for the training and validation stage 626 of the ML/AI models.

Additionally, the systems and techniques can hold post-processing rules check inferences for review, based on using the post-processing rules and exception handling process of 646 to identify and hold any inferences that do not meet one or more specific criteria. The post-processing and exception rules checks of 646 can be used to assist in identifying any potential inference errors and to further ensure high-quality predictions flow through the automated processes of the ML/AI operational pipeline 630.

In some aspects, periodic model retraining can be performed for some (or all) of the trained OCR-free ML/AI models associated with either the OCR-free model inference stage 636 and/or stored within the repository of pre-trained ML/AI models 628. For instance, the periodic model retraining can be scheduled at a regular periodic interval, wherein the periodic model retraining incorporates the expert feedback and corrections from the human-in-the-loop reviews performed at 644. The periodic model retraining can be performed using the expert feedback and corrections comprising the data artifacts 622, as described above. The ongoing retraining process of continuous learning loop 620 can be seen to assist in maintaining the accuracy and adaptability over time of the one or more OCR-free ML/AI models described herein.

In some embodiments, the systems and techniques can implement performance monitoring and alerts in associated with the ML/AI model operational pipeline 630. For instance, during the OCR-free model inference stage 636, the ML/AI model operational pipeline 630 can be configured to monitor one or more model performance metrics in real-time, sending alerts or notifications when performance drops below a certain threshold. The proactive monitoring can be seen to enable timely identification and resolution of potential issues affecting the performance of one or more trained ML/AI models deployed to the inference stage 636.

In one illustrative example, the manual review and processing 644 used to implement human-in-the-loop-review for the ML/AI model operational pipeline 630 can be implemented using the data annotation tool interface to receive user inputs indicative of edits to the incorrect model predictions during the inference time (e.g., to receive user inputs indicative of edits or corrections to the incorrect or flagged model predictions in the manual review queue 642 of FIG. 6A). For instance, the annotation tool 506 of FIG. 5 and/or the annotation tool 840 of FIG. 8 can be used to receive the user inputs indicative of inference prediction edits or corrections during the manual review and processing stage 644 of FIG. 6A. For example, the key-value pairs populated into the annotation tool (e.g., populated into one of the annotation review GUI examples 900 of FIG. 9A, 950 of FIG. 9B, etc.) are populated into the tool interface directly from the predicted values of the flagged inference prediction by the underlying ML/AI model. The process for correcting specific values of the populated inference prediction, and exporting the correction as an updated annotation from the annotation tool can be performed as described above with respect to use of the annotation tool during the training process.

In some embodiments, one or more fine-tuning operations may be applied to optimize the performance of the OCR-free ML/AI models described herein, such that the fine-tuned models achieve higher accuracies. For instance, the model training and finetuning stage 520 of FIG. 5 and/or the training and validation stage 626 and/or the continuous learning loop 620 of FIG. 6A may be utilized to fine tune one or more hyperparameters of a trained OCR-free ML/AI model. For example, fine-tuning adjustments can include, but are not limited to, one or more of the following:

Batch Size: Adjusting the batch size can be fine-tuned to improve the model's generalization. In some cases, such as with an OCR-free model using the Donut model, the model size may be relatively large. When a relatively large model size is coupled with high-resolution image training, challenges such GPU memory constraints may arise, which can limit increased batch sizes. To address this challenge, aspects of the present disclosure may implement techniques such as gradient accumulation and gradient checkpointing to allow for larger batch sizes without exhausting GPU memory.

Custom Accuracy Function: A custom accuracy function can be implemented to determine the validation accuracy of predicted tuples or other inference output predictions from the trained ML/AI models (e.g., output predictions from the OCR-free model inference stage 636 of FIG. 6A). In some aspects, the custom accuracy can be employed instead of relying on the Levenshtein edit distance, which calculates the number of character changes required to convert from a string A to a string B, with one change counted as an insert, delete, or replacement of a single character. While the Levenshtein edit distance algorithm measures the number of edits needed to match two strings, the custom accuracy function refines accuracy by performing exact string matches, providing a more precise evaluation of the model's predictions.

Max_length: The max_length parameter estimates the number of tokens to be predicted. If set too low, predictions may be truncated, whereas excessively high values may necessitate padding with pad tokens, resulting in increased memory usage and processing time. To optimize this parameter, a more appropriate or optimal value for the max_length parameter can be estimated based on the longest training samples, ensuring a more efficient and accurate prediction process.

Adaptive Learning Rate Scheduling: The learning rate can be adapted during the training process, allowing the model to converge more efficiently. Learning rate warm-up, cyclic learning rate, and learning rate decay can be used to optimize the training process, leading to better model performance.

Early Stopping and Model Selection: Early stopping techniques can be implemented during model training and/or fine-tuning to better monitor the model's performance during training and halt the process when the performance on a validation set starts to degrade. The early stopping and model selection approach can be seen to assist in preventing overfitting, saving computational resources, etc.

Returning to the ML/AI model training pipeline 500 of FIG. 5, in some aspects it is contemplated that a dataset versioning engine 517 can be used to implement automatic dataset versioning. For instance, automatic dataset versioning 517 can be used to track modifications and additions to the training datasets stored in cloud bucket/drive 515 and/or the datasets repository 525, both of FIG. 5. Changes to metadata or the inclusion of new data typically would require updates to the dataset repository 525. However, without a proper versioning scheme, it may become difficult to trace the change log. To address this issue, a script can be used (e.g., by the dataset versioning engine 517) to automatically tag a dataset whenever changes are pushed to the dataset repository 517. This versioning system implemented by the dataset versioning engine 517 can be used to enable the efficient tracking of dataset updates and helps maintain a clear record of alterations.

Figure 11A:
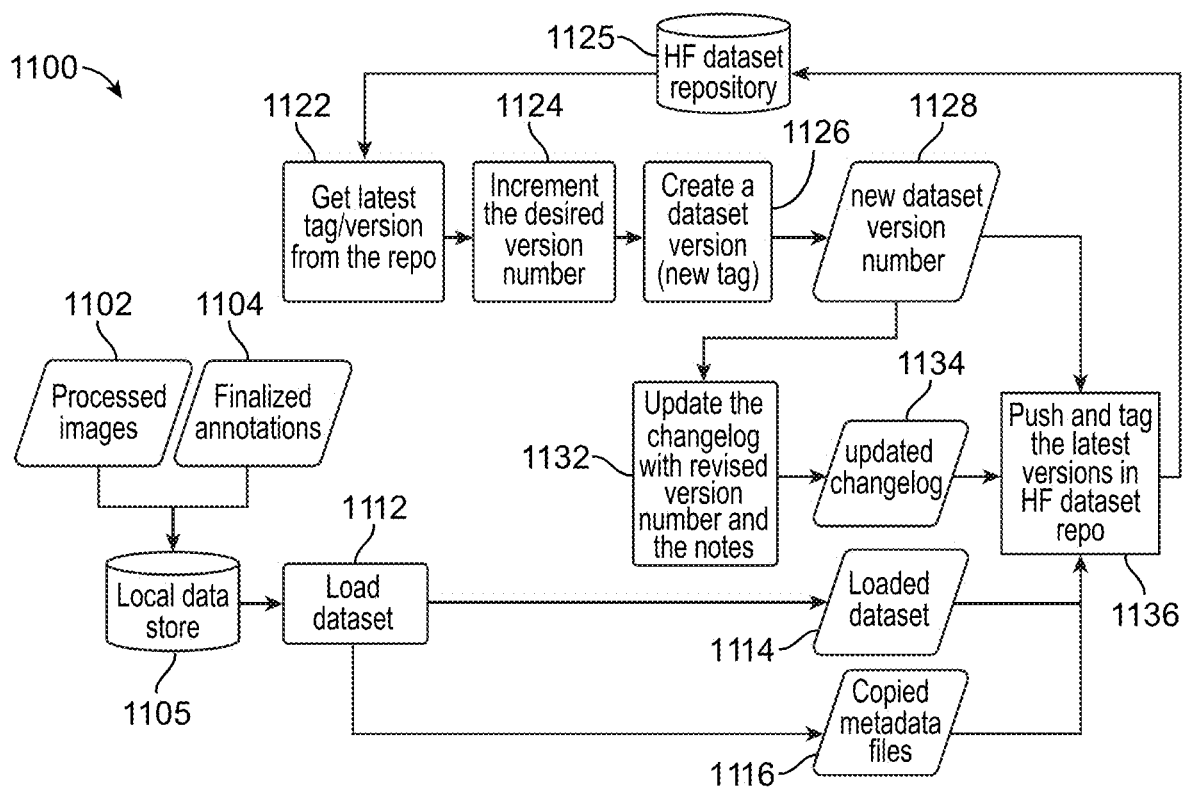
FIG. 11A is a diagram illustrating an example dataset versioning workflow for trained ML/AI models, in accordance with some examples.

In one illustrative example, the automatic dataset versioning 517 of FIG. 5 can be implemented according to the example dataset versioning workflow 1100 shown in FIG. 11A, which is a diagram illustrating an example dataset versioning workflow for trained ML/AI models, in accordance with some examples. For instance, the dataset versioning workflow 1100 of FIG. 11A may be the same as or similar to the model versioning and performance logging 527 of FIG. 5; the dataset versioning 517 of FIG. 5; a dataset versioning associated with the training and validation of models 626 of FIG. 6A; the ML/AI model versioning process 682 of FIG. 6B; etc. In some aspects, a local datastore 1105 can include a plurality of processed images 1102 and finalized annotations 1104 corresponding to the processed images 1102.

A dataset load operation 1112 is performed to load/read some, or all, of a respective dataset from the local datastore 1105. Based on the dataset load operation 1112, a loaded dataset 1114 is stored in memory, as well as copied metadata files 1116 corresponding to the loaded dataset information 1114.

At block 1136, the loaded dataset information 1114 and copied metadata files 1116 are pushed and tagged as the latest versions into the dataset repository 1125 (which may be the same as or similar to the dataset repository 525 of FIG. 5). At block 1122, the process 1100 can include obtaining the latest tag/version for a dataset from the dataset repository 1125. At block 1124, the desired version number is incremented. At block 1126, a corresponding dataset version is created for the new tag (e.g., incremented tag from 1124). The new dataset version number 1128 is pushed and tagged as the latest version into the dataset repository 1125, using the same push and tag operation 1136 described above. At block 1132, the process 1100 can update a changelog information with revision version number information and one or more notes, corresponding to the revised version number 1128. The updated changelog information 1134 can additionally be provided to the push and tag operation 1136, and is pushed and tagged into the dataset repository 1125 along with the new dataset version number 1128.

In some embodiments, model versioning can additionally be implemented by the systems and techniques described herein. For instance, the ML/AI model versioning stage 682 of the ML/AI model training pipeline 670 of FIG. 6B can used to perform a model versioning process, such as the example model versioning shown in FIG. 11B. In some aspects, an automated model versioning process can be used to manage different trained versions of the ML/AI models described herein. For example, as hyperparameters are tuned or the underlying dataset is changed (e.g., as described above), multiple ML/AI model versions are trained. Tracking these changes can be desirable for later tasks such as baselining and benchmarking model performance. Accordingly, the systems and techniques can implement a model versioning scheme tied to the dataset versioning scheme (e.g., the dataset versioning 517 of FIG. 5, the dataset versioning of FIG. 11A, etc.). In one illustrative example, a model versioning script can be used to automatically update a corresponding model change log information and increment the desired model version as a git tag when executed. In some aspects, the model versioning approach can be used to ensure seamless tracking of model iterations and to provides a clear history of performance improvements and changes over time.

Figure 11B:
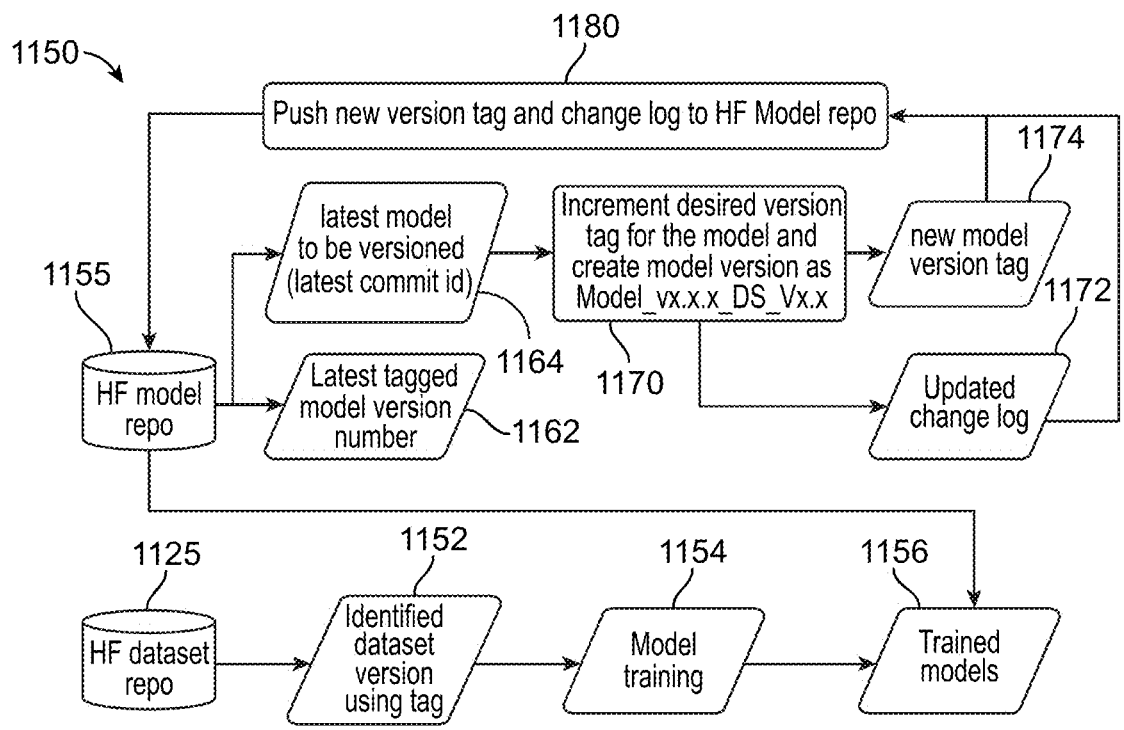
FIG. 11B is a diagram illustrating an example of a detailed dataset versioning workflow for trained ML/AI models, in accordance with some examples.

In particular, FIG. 11B is a diagram illustrating an example of a model versioning workflow 1150 for trained ML/AI models, in accordance with some examples. A dataset repository 1125 in FIG. 11B can be the same as the dataset repository 1125 of FIG. 11A. At block 1152, the dataset version can be identified based on tag information (e.g., corresponding to the dataset version number such as the dataset version number 1128 in FIG. 11A). At block 1154, model training is performed according to, for example, one or more of the model training pipelines and workflows described previously above with respect to any one of FIGS. 5, 6A, 6B, etc. The resulting trained ML/AI models 1156 of FIG. 11B can be the same as or similar to any one of the trained ML/AI models described previously above, such as the OCR-free ML/AI models 530, 628, 698, etc. The trained ML/AI models 1156 can be stored in a model repository 1155, which may be the same as or similar to the model repository 535 of FIG. 5, the model database 628 of FIG. 6A, the model database 682 of FIG. 6B, etc.

Each respective trained ML/AI model within the model repository 1155 can be associated with a corresponding latest tagged model version number 1162. At block 1164, the process can determine the latest model to be versioned, for instanced based on identifying a latest commit ID, etc. A desired version tag for the model of the block 1164 identification can be incremented, and corresponding model version information can be created at 1170 to correspond to the incremented version tag. The new model version tag 1174 and an updated changelog 1172 for the model version change may be pushed, at block 1180, as a new version tag and updated changelog for the model within the model repository 1155. In some embodiments, the changelog 1172 for model versioning (and/or the changelog 1134 for dataset versioning) can be automatically generated as a comprehensive changelog that details the modifications made to the dataset or model during each version update. For instance, an automatically created changelog 1172, 1134, etc., can include information on added data samples, removed samples, adjusted metadata, hyperparameter changes, and/or model architecture updates, etc. A well-maintained changelog can aid in tracking the development process and understanding the impact of specific changes on model performance. In some examples, the systems and techniques can be used to different versions of the dataset and model to evaluate the impact of changes on model performance, data quality, or other relevant metrics. Model version comparison (and analysis thereof) can be used to assist in identifying which version updates have resulted in significant improvements or setbacks and guide future development efforts, etc.

In some embodiments, the systems and techniques can perform model evaluation and benchmarking of trained ML/AI model performance over time. For instance, the ML/AI model training pipeline 670 of FIG. 6B can perform the ML/AI model versioning for baselining and/or benchmarking 682. In some examples, the benchmarking engine 682 can be configured to evaluate and benchmark ML/AI model performance in processing perio charts (or another task/context for which the ML/AI model is trained). For instance, one or more custom functions can be used to assess the percentage accuracy of model predictions at different levels of granularity, such as at a number level and a tooth level, while considering the confidence level for each prediction. In some embodiments, a comprehensive data file in CSV format can be used to capture the comparison between predicted values and actual values for each image provided as input to a trained OCR-free ML/AI model, along with the associated confidence levels, enabling detailed analysis of model performance and facilitating identification of areas for improvement.

In some embodiments, the benchmarking engine 682 can be used to determine the percentage throughput of input document images/corresponding inference predictions that are held for manual review (e.g., held in the manual review queue 642 for manual review 644 in FIG. 6A, etc.) at various image confidence thresholds of the ML/AI model, allowing for the estimation of manual effort required for the review and correction process, as well as providing an estimate of the potential error residue within inferred images. In some cases, a set of statistical metrics can be used to analyze the training data distribution based on factors, parameters, or dimensions which may include, but are not limited to: template type, sources, and other relevant factors, offering insights into the ML/AI model's performance and potential biases, etc.

The systems and techniques may additionally be used to obtain a collection of statistical metrics on inference errors identified in the predictions generated by the OCR-free ML/AI models at the inference stage 636 of FIG. 6 (e.g., inference errors identified from the human-in-the-loop manual review 644), for instance categorized by template type, field type, field location, and/or various other relevant factors, etc., thereby providing a comprehensive understanding of the particular OCR-free model's limitations and areas for improvement. In another example, the systems and techniques can determine one or more correlation metrics that assess the relationship between the ML/AI model's confidence levels associated with its output inference predictions, and the number of inference errors identified in the review 644 of those same output inference predictions of the model, thereby enabling further evaluation of the model's performance and reliability.

In some examples, the systems and techniques (e.g., the benchmarking engine 682 of FIG. 6B) can be used to generate one or more visual representations (e.g., such as charts, graphs, visualizations, etc.) corresponding to various ones of the aforementioned metrics, facilitating objective evaluation of the ML/AI model's performance and enabling comparison with previous model versions to track progress and improvements. In some embodiments, the benchmarking engine 682 can be used for identifying and analyzing trends in model performance across various subcategories, such as different types of templates, image quality, and/or various other factors that may influence the ML/AI model's accuracy and effectiveness, enabling targeted improvements and optimizations. In another example, the benchmarking engine 682 can be used to implement or otherwise may include a framework for comparing an ML/AI model's performance with that of alternative models or techniques, providing a benchmark for assessing the relative effectiveness of different approaches in processing for different image artifacts, document images, etc.

In some examples, the benchmarking engine 682 of FIG. 6B and/or the continuous learning loop 620 of FIG. 6A can be used to implement continuous monitoring and evaluation of an ML/AI model's performance over time, identifying potential performance degradation or areas for improvement and initiating appropriate actions, such as retraining or updating the model, to maintain and enhance the model's effectiveness. Based on the performance monitoring and feedback loop implementation, the systems and techniques may be used to continuously monitor the performance of an ML/AI model on new data and may use the corrected annotations 622 from the manual review process 644 to update the model's training data 624. Notably, the performance monitoring and feedback loop can enable the continuous learning and improvement of an OCR-free ML/AI model over time (e.g., via the continuous learning loop 620, etc.).

As noted previously above, the systems and techniques can implement one or more post-processing rules or checks for predictions generated corresponding to various types, formats, structures, etc., of input image artifacts or other document images being processed by a trained OCR-free ML/AI model. In one illustrative example, the post-processing rules and exception handling process 646 of FIG. 6A can be used to implement post-processing rules that uniquely correspond to a specific type of input image artifact or document image.

Figure 10A:
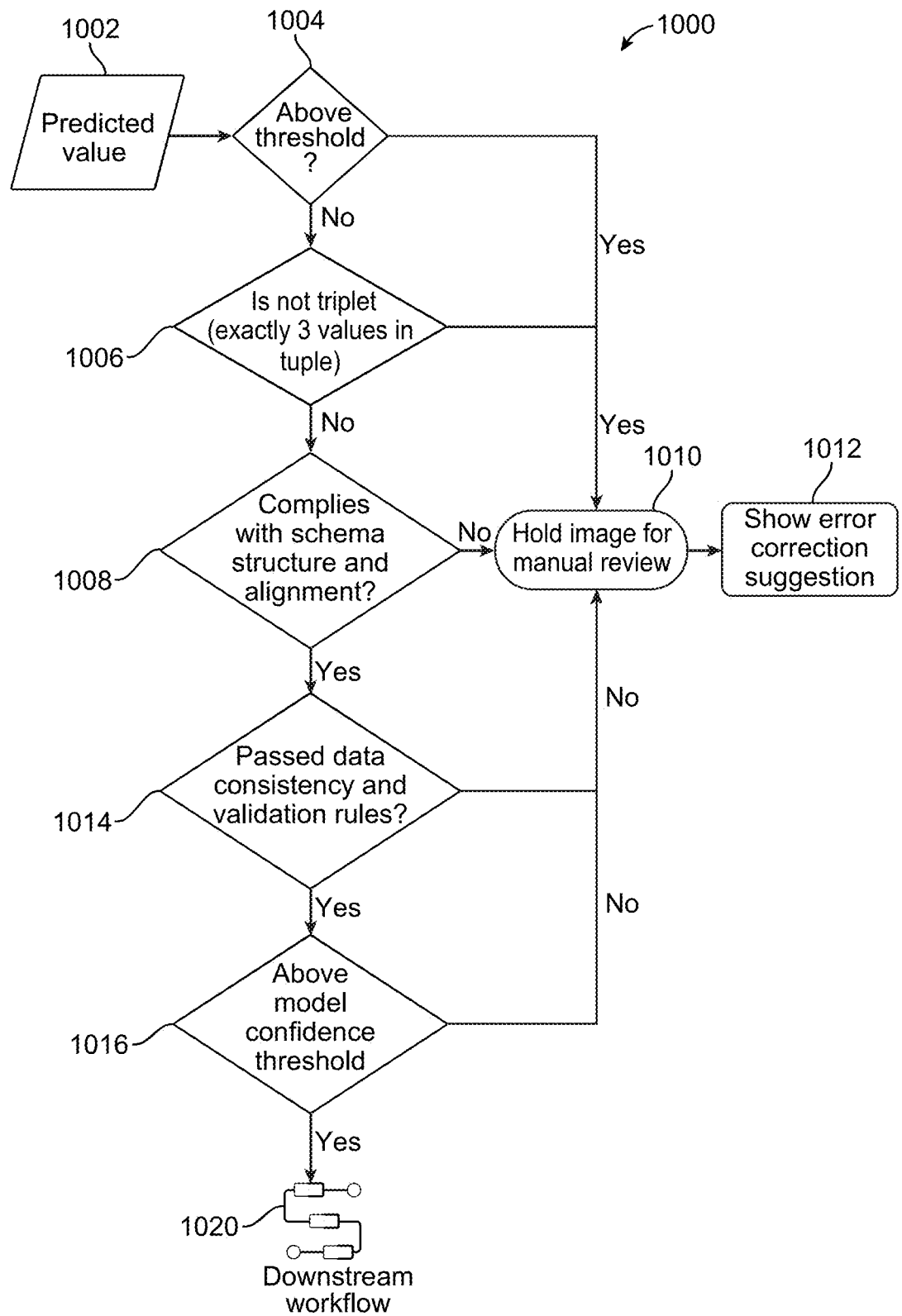
FIG. 10A is a flow diagram illustrating an example of a process corresponding to a post-processing workflow for periodontal chart data, in accordance with some examples.

For instance, the post-processing rules and exception handling process 646 can be used to implement the post-processing workflow 1000 shown in FIG. 10A, which is a flow diagram illustrating an example of a process 1000 corresponding to a post-processing workflow for input data comprising a periodontal chart image artifact or document image. For instance, the perio chart post-processing workflow 1000 of FIG. 10A can be implemented as one of the downstream workflows 604 depicted in FIG. 6A; can be implemented as part of the post-processing rules and exception handling process 646 of FIG. 6A; etc.

As illustrated, the perio chart post-processing workflow 1000 can include receiving a predicted value 1002, which can be an output/inference prediction of a trained OCR-free ML/AI model. For instance, the predicted value 1002 can be the same as or similar to an output prediction from the OCR-free model inference stage 636 of FIG. 6A that is provided as input to the post-processing engine 646, also of FIG. 6A.

At block 1004, the process 1000 can include checking the predicted inference value 1002 against one or more configured thresholds, in a manner the same as or similar to the confidence threshold check 638 described above with respect to FIG. 6A. In some aspects, the configured threshold 1004 can be configured such that a predicted value 1002 above the threshold 1004 is held for manual review 1010, which can be the same as or similar to the manual review and processing 644 of FIG. 6A. The manual review 1010 of FIG. 10A can be used to obtain (e.g., as a user or expert correction, edit, etc.) an indication of an error correction suggestion 1012.

For instance, error correction suggestions can be generated at block 1012 in response to the inference prediction 1002 being flagged for manual review. One or more suggestions for error correction can be created based on information such as the ML/AI model's alternative predictions or common patterns observed in the training data. The error correction prediction or suggestion technique can help streamline the review process and improve the efficiency of human annotators associated with the manual review 1010. At block 1004, if the predicted inference value 1002 is not above the configured threshold, the process can proceed to perform further checks.

For instance, at block 1006, the predicted inference value 1002 can be checked to determine whether it matches an expected format for the particular type of input image artifact (which in this example is a perio chart document/format/structure). For example, the expected key-value format for extracted text values for a perio chart may be a triplet or tuple having exactly three values. In some aspects, value thresholds can be checked to ensure that no values in the predicted key-value pairs exceed a predetermined threshold. If a value exceeds this limit, the inference 1002 is flagged for manual review at 1010. In some aspects, block 1006 can implement a value count constraint, which is checked to verify that each key in the predicted key-value pairs of inference 1002 has exactly three values (triplets). If a key contains more or fewer than three values, the inference prediction 1002 can be held for manual review 1010.

If the predicted value 1002 is a triplet, the process 1000 can proceed to block 1008, which performs a further check to determine whether the predicted inference value 1002 complies with the expected metadata schema structure and alignment. If compliance is not identified, the inference prediction 1002 can be held for manual review 1010. In some examples, the schema validation and schema structure alignment check 1008 can be performed to ensure that the predicted schema structure of inference 1002 aligns with the ground truth schema structure. If any differences are detected, the inference prediction 1002 can be held for manual review 1010.

Otherwise, the process 1000 can proceed to block 1014, which performs a further check against one or more data consistency and validation rules. If the inference prediction 1002 does not pass the check against the data consistency and validation rules, the inference prediction 1002 can be held for manual review 1010. For instance, block 1014 can implement one or more data consistency and validation checks. Implementing checks for data consistency and validation at block 1014 can be used to ensure that extracted values included in the inference prediction 1002 are numerical values and the text data follows the expected format. If any inconsistencies are detected, the inference prediction 1002 can be held for manual review 1010.

Otherwise, the process 1000 can proceed to block 1016, where the predicted value 1002 is checked against a model confidence threshold value, which may be the same as or similar to the model confidence threshold checked at block 638 of FIG. 6A. If the predicted value 1002 is above the model confidence threshold 1016, the process 1000 can proceed by providing the validated predicted value 1002 to a downstream workflow 1020. Otherwise, the predicted value 1002 is held for manual review 1010. In some examples, block 1016 can implement confidence threshold checking based on setting (e.g., configured) a confidence threshold for the ML/AI model's predictions 1002. If the model's confidence in a prediction 1002 falls below the specified threshold of block 1016, the inference 1002 can be flagged and held for manual review 1010. In some aspects, the confidence threshold check 1016 can also be able to generally determine out of distribution data cases such as handwritten text, data/templates that were not previously seen by the model (either in training or inference), etc.

Figure 10B:
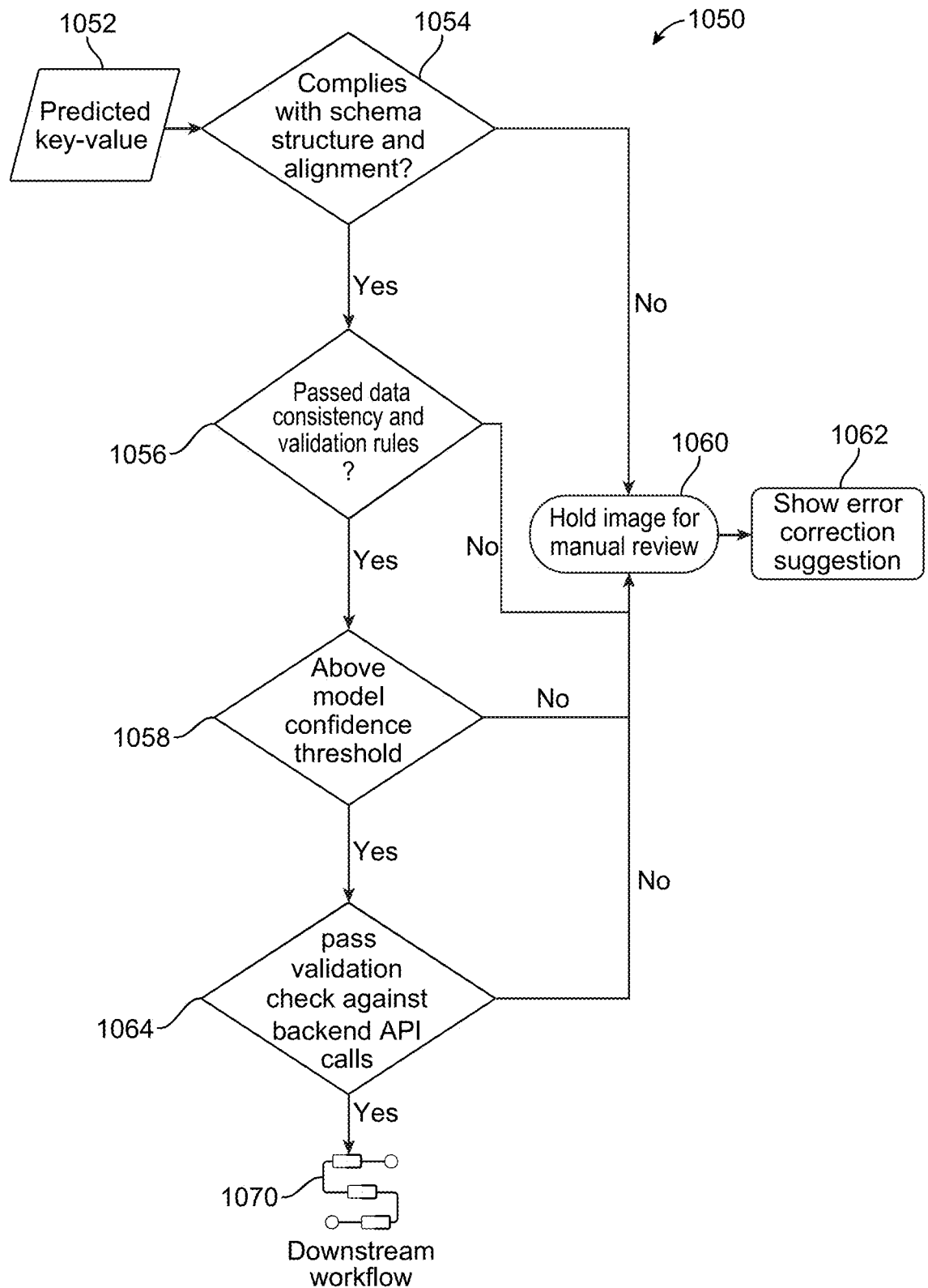
FIG. 10B is a flow diagram illustrating an example of a process corresponding to a post-processing workflow for dental chart data, in accordance with some examples.

In another illustrative example, the post-processing rules and exception handling process 646 of FIG. 6B can be used to implement the post-processing workflow 1050 shown in FIG. 10B, which corresponds to an expected input image document type/format/structure of a claims form or dental chart. In particular, FIG. 10B is a flow diagram illustrating an example of a process 1050 corresponding to an example post-processing workflow for input data comprising a dental chart image artifact or document image. For instance, the dental chart post-processing workflow 1050 of FIG. 10B can be implemented as one of the downstream workflows 604 depicted in FIG. 6A; can be implemented as part of the post-processing rules and exception handling process 646 of FIG. 6A; etc. In some aspects, the dental chart post-processing workflow 1050 of FIG. 10B can be similar to the perio chart post-processing workflow 1000 of FIG. 10A.

FIG. 10B can include one or more components that are the same as or similar to the corresponding components of FIG. 10A. For instance, predicted key-values 1052 may be the same as or similar to the inference prediction 1002 of FIG. 10A, etc.

At block 1054, a first consistency check can be performed for schema structure alignment within the predicted key-values 1052. For instance, the check performed at block 1054 can be used to ensure that the predicted schema structure of inference 1052 exactly aligns with the ground truth schema structure (e.g., the example ADA schema structure listed previously herein). If any differences are detected, flag the inference for manual review, the inference prediction of key-values 1052 can be held for manual review 1060 and/or error correction suggestion 1062.

At block 1054, one or more schema validation checks may additionally, or alternatively, be applied. For instance, each key value in the schema needs to comply with a predetermined string, Boolean, number, etc., format. The predicted values of the inference key-values 1052 are checked against these format constraints and if any inconsistencies are detected, the inference prediction of key-values 1052 can be held for manual review 1060 and/or error correction suggestion 1062. For example, certain fields such as phone number, date, address, etc., may be expected to match a certain pre-determined format which can be checked and validated within the workflow 1050 of FIG. 10B.

At block 1056, one or more data consistency and validation checks can be performed. In some embodiments, the checks for data consistency and validation can be implemented based on actions such as ensuring specific field values are numerical values and are within the specified range/limits, etc. If any inconsistencies are detected, the inference prediction of key-values 1052 can be held for manual review 1060 and/or error correction suggestion 1062.

At block 1058, one or more model confidence threshold can be compared against a confidence level determined for the predicted key-values 1052 of the model output. For instance, the block 1058 confidence threshold checks can be implemented based on setting a confidence threshold for the ML/AI model's predictions 1052. If the model's confidence in a prediction 1052 falls below the specified threshold 1058, the inference prediction of key-values 1052 can be held for manual review 1060 and/or error correction suggestion 1062.

The error correction suggestions 1062 can be implemented the same as or similar to the error correction suggestions 1012 described above with respect to FIG. 10A. When an inference is flagged for manual review, suggestions for error correction can be generated based on the ML/AI model's alternative predictions or common patterns observed in the training data. This can help streamline the review process and improve the efficiency of human annotators associated with manual review 1060.

In some embodiments, the post-processing workflow 1050 can further include performing one or more validation checks against backend API calls 1064. In one illustrative example, the backend API calls 1064 can check the inference prediction 1052 against look-up information, third-party or external information, etc., such as the look-up information datastore 648 of FIG. 6A. In some cases, for some extracted values such as NPI, provider license number, etc., the corresponding extracted value(s) contained within the inference prediction key-values 1052 are passed on to the backend API call 1064 to verify the correctness of these numbers. A fuzzy match logic can be implemented while performing the backend lookup within the API call of block 1064, as may be needed or desired. The fuzzy match can be accepted if the API call 1064 returns a value that is within 0 or 1 edit distance away from the extracted value of the inference prediction key-values 1052 (e.g., based on assumption that the ML/AI model would have made a 1 edit distance error during its prediction 1052 for this particular value).

2. Domain-Adaptation Training of ML/AI Models to Extract Clinical Narrative Information Using Extractive QA Systems and techniques are described for implementing domain-adaptation training of one or more ML/AI models to extract clinical narrative information using extractive question-answering (extractive QA). In some aspects, the extractive QA domain-adaptation training can correspond to and/or can be implemented using the ML/AI data processing engine 310 of FIG. 3 or can otherwise be integrated with the system architecture 300 of FIG. 3. In some examples, the extractive QA domain-adaptation training can be based on the extractive QA domain-adaptation system workflow 1200 of FIG. 12, described in greater detail below.

As was noted previously herein, one or more trained OCR-free ML models can be utilized for extracting structured text data from various types of input images, image artifacts, etc. In some embodiments, one or more additional ML/AI models can be configured for use in extracting text data from certain types of input images. For instance, the one or more trained OCR-free ML models may be utilized for extracting text data from images of claim forms and other types of inputs that utilize a structured, semi-structured, predictable, semi-predictable, etc., format that localizes certain text fields or pieces of information in pre-determined locations on the page. Other types of text data inputs may be relatively (or completely) free-form and/or may be narrative in their structure and composition. For instance, clinical narratives prepared or written by medical professionals and other providers may include relevant information within the context of a written narrative in paragraph and/or sentence form. In one illustrative example, clinical narrative information may comprise medical reports or findings, radiology reports, treatment summaries, diagnosis descriptions or documentation, and various other clinical narratives that may be associated with or included in the submission of an insurance claim, etc.

In some embodiments, specialized ML/AI models can be trained and deployed to perform text and relevant data/information extraction from clinical narratives and image artifacts thereof (e.g., scans, images, photos, etc., of clinical narrative text). In some aspects, one or more natural language processing (NLP) and question-answer (QA) machine learning transformer models can be utilized to improve the efficiency and accuracy of clinical narrative processing and/or one or more downstream tasks reliant upon or utilizing the processing clinical narrative information. For instance, in one illustrative example, the efficiency and accuracy of dental insurance claims processing can be improved based on leveraging NLP and QA transformer models, as will be described in greater depth herein. In some aspects, one or more NLP and/or QA transformer ML models can be configured (e.g., trained and deployed) to systematically extract relevant information from the text data of clinical narratives contained in the image artifacts associated with or submitted in conjunction with a dental insurance claim. For instance, the extracted information from the clinical narratives may be analyzed, correlated, etc., with additional information or documentation submitted in the same insurance claims submission package, such as submitted attachments that may include, but are not limited to, X-ray images or data, perio charts, ADA claim form data, etc.

Figure 12:
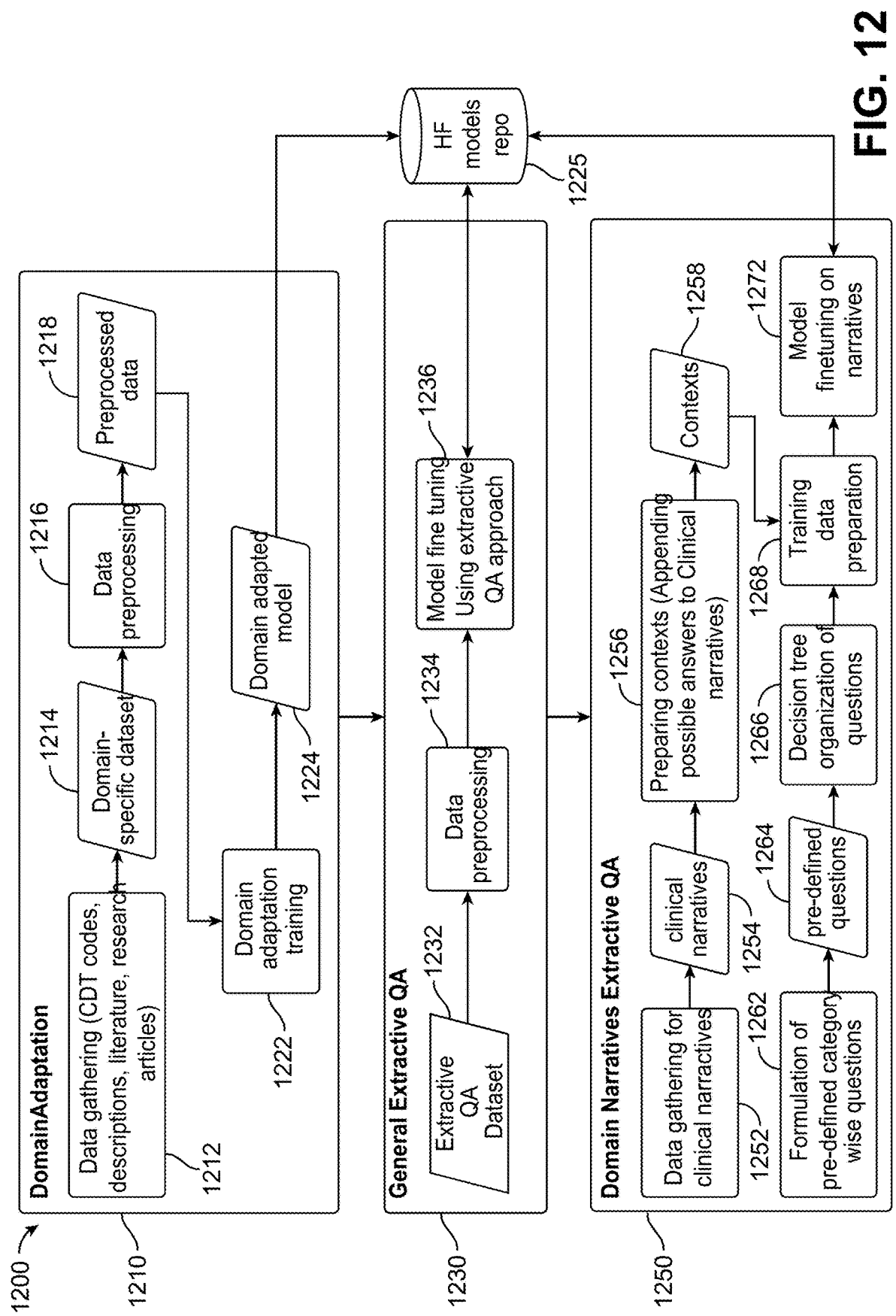
FIG. 12 is a diagram illustrating an example system workflow for domain-adaptation for training an ML/AI model to extract information from clinical narrative textual and/or image-based inputs, based on performing extractive question answering (QA), in accordance with some examples.

FIG. 12 is a diagram illustrating an example system workflow 1200 for domain-adaptation for training an ML/AI model to extract information from clinical narrative textual and/or image-based inputs, based on performing extractive question answering (QA), in accordance with some examples. For purposes of illustration and clarity of example, the following discussion makes reference to an example scenario relating to the processing of dental insurance claims processing, although it is again noted that various other input image artifacts or document image types (and related information domain(s)) may also be utilized without departing from the scope of the present disclosure.

In one illustrative example, the systems and techniques (including those described with respect to FIG. 12) can be used to improve the efficiency and accuracy of dental insurance claims processing (among various other document and data processing tasks) based on leveraging natural language processing (NLP) and question-answer (QA) transformer models to systematically extract relevant information from clinical narratives in dental insurance claims. Subsequently, the extracted clinical narrative information can be used to correlate clinical narratives information with other submitted attachments like X-rays, perio charts, and ADA claim form data during the claim processing.

In general, the process of insurance claims adjudication (e.g., including dental insurance claims adjudication, in the context of the example scenario provided below for illustrative purposes of describing FIG. 12) may require the extraction of relevant information from one or more clinical narratives submitted in combination with or in support of an insurance claim. For instance, clinical narratives may be indicative of relevant information of a claims submission, such as treatment types, severity, patient history, and/or procedure dates, etc. Currently, correlating this information with submitted attachments during the claims processing can be challenging and time-consuming, and moreover, is often a largely manually-driven process due to the degree of variation across different types of clinical narrative content, different writing styles of the providers, etc. The systems and techniques described herein with respect to the extractive QA domain adaptation system 1200 of FIG. 12 can be used to address this problem and more, based at least in part on implementing NLP and QA transformer models, domain adaptation, and fine-tuning techniques to systematically extract objective information from clinical narratives. As will be described further below, a series of configured questions can be organized as a decision tree for driving the extractive QA learning and training of the NLP and/or QA transformer models (e.g., collectively referred to as ML/AI models), thereby resulting in improved efficiency and accuracy in dental insurance claims processing.

In some examples, the system 1200 of FIG. 12 can be applied to various types of machine learning and/or artificial intelligence models. For instance, a pre-trained transformer model for masked language modeling may be utilized for domain adaptation performed by the domain adaptation engine 1210. In some examples, the masked LM transformer model can be selected based on its ability to effectively capture context and semantic relationships within an input text being analyzed, making the masked LM transformer model suitable for understanding domain-specific language and terminology—as is trained/learned during the domain adaptation implemented by domain adaptation engine 1210.

At block 1212, data gathering can be performed to obtain various types, examples, samples, etc., of domain-specific data. For instance, in the context of the example of the dental domain, the data gathering of block 1212 can be used to obtain dental domain-specific data that may include, but is not limited to, current dental terminology (CDT) codes, descriptions, dental literature, research articles, etc. The result of data gathering 1210 is the creation of a domain-specific dataset 1214. The domain-specific dataset 1214 for the dental domain may be generated to cover various different dental procedures, terminologies, and/or concepts, etc., thereby providing comprehensive information for the subsequent domain adaptation process implemented by the domain adaptation engine 1210.

The domain-specific dataset 1214 can be provided to a data pre-processing engine 1216, which applies one or more preprocessing operations and generates as output the pre-processed domain-specific data 1218. For instance, the gathered text of the domain-specific dataset 1214 can be pre-processed to ensure that the ML/AI model (e.g., pre-trained masked LM transformer model selected for domain adaptation training 1222) can efficiently learn from the domain-specific dataset 1214 (or rather, can efficiently learn from the pre-processed domain-specific dataset 1218).

In some embodiments, the one or more preprocessing operations performed by the data preprocessing engine 1216 can include, but are not limited to, one or more of tokenizing the text, removing stop words, normalizing tokens, performing stemming, and/or performing or lemmatization, etc., of some (or all) of the textual data within the domain-specific dataset 1214, as necessary. In one illustrative example, the processed text (e.g., preprocessed data 1218) can be divided into chunks of a configured token size (e.g., chunks of 512 tokens, etc.), configured or selected to fit the particular input requirements of the ML model selected for domain adaptation training 1222.

The domain adaptation training 1222 can be performed using the pre-processed and/or chunked domain-specific dataset 1218. For instance, the input or underlying/pre-trained ML model to the domain adaptation training 1222 can be trained on the pre-processed domain-specific dataset 1218 using a masked language modeling (MLM) objective. In some aspects, the MLM objective involves predicting masked tokens in the input text sample provided to the model during the training, thereby encouraging the model to learn contextual and semantic relationships within the dental domain of the dental domain-specific dataset 1214/1218. In some embodiments, the domain adaptation 1222 can be performed to train the transformer model for several epochs, with the number of epochs determined based on the model's performance as evaluated on a holdout dataset. During the domain adaptation training 1222, the model's accuracy can be evaluated on holdout text (e.g., from the holdout dataset) at each epoch to monitor progress and prevent overfitting during the training.

The result of the domain adaptation training process 1222 is a domain-adapted model 1224. The domain adaptation training 1222 can be terminated or identified as complete based at least in part on the trained model's performance on the holdout dataset reaching a satisfactory level, e.g., based on comparison or evaluation against one or more configured thresholds or performance metrics, etc. The domain adapted model 1224 can be saved and stored in an ML/AI model repository 1225, which may be the same as or similar to one or more of the model repositories described previously above with respect to FIGS. 3-11B.

The domain adapted model 1224 stored in the model repository 1225 has been domain-adapted to the specific terminology and concepts associated with the target information domain of interest/the domain that is selected as the subject of the domain-specific dataset 1214 and the domain adaptation process implemented by the domain adaptation engine 1210 (e.g., the domain adapted model 1224 is adapted and primed for dental domain-specific information extraction, in the context of the example scenario considered herein).

Notably, the domain-adapted model 1224, once stored in the trained ML/AI model repository 1225, can be used for various downstream tasks, including fine-tuning on general QA datasets (e.g., by general extractive QA engine 1230) and further fine-tuning on clinical narrative extractive QA datasets (e.g., by domain narratives extractive QA engine 1250). Accordingly, the input ML model to the process of system 1200 for domain adaptation and fine-tuning, the resulting model 1224 is specifically adapted to understand and process dental domain-specific language and concepts. The domain adaptation can be seen to provide a strong foundation for the subsequent fine-tuning processes of engine 1230 and 1250, resulting in a more accurate and efficient information extraction system for dental insurance claims adjudication.

In one illustrative example, the dental domain-adapted model 1224 can subsequently be provided to a general extractive QA engine 1230, as will be described below. The starting point for general extractive QA training may be the domain-adapted model 1224, which can previously be trained specifically on the dental domain text dataset 1214. The dental domain-adapted model 1224 can be provided to the general extractive QA engine 1230 as a model already having a strong foundation in understanding dental domain language and concepts.

The general extractive QA engine 1230 can utilize an extractive QA dataset 1232. In some examples, the extractive QA dataset 1232 is a general extractive QA dataset. For instance, the extractive QA dataset 1232 may be provided as a general QA dataset, such as the Stanford Question Answering Dataset (SQUAD), SQUADv2, etc. In some embodiments, the SQUADv2 (or other general QA dataset) can be used by the general extractive QA engine 1230 to fine-tune the domain adapted model 1224 on general question answering tasks. For instance, SQUADv2 is a large-scale and general-purpose question-answer dataset that includes over 100,000 question-answer pairs based on paragraphs taken from Wikipedia articles.

The SQUADv2 (or other general QA dataset 1232) can be pre-processed by the engine 1230, for instance using a corresponding QA data preprocessing engine 1234. In some aspects, the general QA dataset 1232 can be processed based on using the preprocessing engine 1234 to apply one or more data pre-processing operations, which can include, but are not limited to, one or more of tokenization operations, formatting operations, etc. The data preprocessing engine 1234 can perform preprocessing to ensure that the general QA dataset 1232 conforms to or is otherwise compatible with the input requirements of the domain adapted model 1224.

The pre-processed general QA dataset 1232 can be provided from the data preprocessing engine 1234 to the model fine tuning engine 1236, which implements model fine-tuning using an extractive QA approach and the general QA dataset 1232. In particular, the model fine tuning engine 1236 can obtain the domain-adapted model 1224 from the model repository 1225, and perform a first fine-tuning stage for the domain-adapted model 1224 based on using the pre-processed general QA dataset 1232.

For instance, the fine tuning engine 1236 can perform extractive QA-based training or fine-tuning for the domain-adapted model 1224, based on training the domain-adapted model 1224 to identify and extract the correct answer spans for a question-answer pair within the general QA dataset 1232 from the given context for the question-answer pair (e.g., each question-answer pair within the general QA dataset 1232 is further associated with corresponding textual context information from which the question is derived and wherein the correct answer may be found or discerned). The extractive QA approach implemented by the fine-tuning engine 1236 for the general QA dataset 1232 allows the domain-adapted model 1224 to learn how to process general question-answer pairs and further improve its understanding of language and context.

The general extractive QA engine 1230 can be configured to perform model evaluation and selection during the fine-tuning process. For instance, during the fine-tuning process, the model's performance can be evaluated on a validation dataset, separate from the training dataset. Various model evaluation metrics, such as F1 score and exact match score, etc., can be used to determine the model's performance in answering questions. In some embodiments, the general extractive QA fine-tuning process is performed for multiple epochs, with model performance evaluated at each epoch to monitor progress and prevent overfitting.

Based on a determination (e.g., by the general extractive QA engine 1230, or the fine-tuning engine 1236 thereof) that the model's performance on the validation dataset is satisfactory, the fine-tuned and domain-adapted model is saved in the model repository 1225. Notably, the resulting model is both domain-adapted for the domain-specific information provided in the domain-specific dataset 1214 (e.g., dental text) and is also fine-tuned to be capable of answering general questions (e.g., based on the general QA dataset 1232), thereby providing a solid foundation for a final fine-tuning step that trains the model to be capable of answering domain-specific questions from an input text comprising a clinical narrative. It is contemplated that the domain-adapted and general QA fine-tuned model (e.g., the output from general extractive QA engine 1230) has a strong understanding of both general language and domain-specific language, making it suitable for the specific task of extracting information from dental insurance claims adjudication narratives. Accordingly, the systems and techniques described herein can be used to enable the domain-adapted model 1224 to be further fine-tuned to perform question answering tasks using a general QA dataset 1232. The first fine-tuning stage 1230 (e.g., general extractive QA fine tuning) further improves the model's ability to understand and process both general and dental domain-specific language, providing a robust foundation for the final fine-tuning step on clinical narratives.

A domain narratives extractive QA engine 1250 can be used to fine tune the domain-adapted and general QA fine-tuned model that is generated at the output of the previous fine-tuning stage 1230 (e.g., described above).

Data gathering for clinical narratives can be performed at block 1252, to obtain a corpus of relevant clinical narratives 1254 within the same domain (e.g., dental domain/dental text) as the domain-specific dataset 1214). For instance, data gathering 1252 can be used to obtain clinical narratives information 1254 comprising a large text corpus that includes various clinical narratives gathered from dental insurance claims.

The clinical narratives 1254 are subsequently categorized into different categories or classifications, for instance based on the type of dental procedures (e.g., such as crown procedures, orthodontics, root canals, scaling, root planning, etc., that are reflected or indicated within the textual content of each respective clinical narrative included in the gathered plurality of clinical narratives 1254. In some aspects, the categorization can be seen to assist in creating a structured dataset that covers a wide range of dental procedures, thereby providing a more comprehensive training set for the QA model.

For instance, in one illustrative example the different categories or classifications of the clinical narratives 1254 may be referred to as "contexts" of the clinical narratives 1254. In some aspects, a context determination engine 1256 can be used to categorize the clinical narratives 1254 into different categories or classifications (e.g., the different possible contexts). In one illustrative example, the context determination engine 1256 generates as output a plurality of contexts 1258 corresponding to respective ones of the clinical narratives 1254. For instance, the context determination engine 1256 can determine one or more contexts for each clinical narrative included in the plurality of gathered clinical narratives 1254. The determined one or more contexts can be appended to the corresponding clinical narrative 1254 for (or from) which the one or more contexts were determined. Notably, the contexts 1258 appended by the context determination engine 1256 can be understood to comprise possible answers to the questions that may be asked based on the particular clinical narrative text 1254.

The fine-tuning of the QA model (e.g., fine-tuned model output by the general extractive QA tuning stage 1230) at the domain narratives extractive QA tuning stage 1250 can be further based on the formulation of pre-defined (e.g., configured) category-wise questions 1262, which can be utilized to fine-tune the model to perform question answering on the category-wise questions 1262. For instance, the category-wise questions 1262 can include a plurality of questions that are formulated or written from the perspective of claim reviewers, and that are configured to methodically extract information from the clinical narratives 1254. In some embodiments, the category-wise questions 1262 can include a plurality of questions corresponding to each respective category of a plurality of identified categories. For instance, the different categories may correspond to the different contexts 1258 (e.g., the different categories of the category-wise questions 1262 may be the same as or similar to the different contexts or procedures or types of information represented by the contexts 1258/represented within the clinical narratives 1254).

In the example of the dental domain, the pre-defined category wise questions can be formulated or otherwise generated at block 1262, to output a set of pre-defined category-wise questions 1264. For example, the category-wise questions 1264 can be generated using prompt engineering implemented at block 1262. In some embodiments, the category-wise questions 1264 may be generated using automated prompt engineering (e.g., a prompt engineering engine, etc.), using manual or expert prompt engineering (e.g., human prompt engineering inputs, etc.), or using a combination of the two. For instance, the prompt engineering supporting the creation of the set of category-wise questions 1264 can be implemented in order to craft effective queries or prompts to guide the behavior of the fine-tuned QA model output by the extractive QA stage 1230 during the domain narratives extractive QA tuning stage 1250. The prompt engineering associated with creating the category-wise questions 1264 can be used to optimize input strings (e.g., the category-wise questions) to achieve desired outputs from the trained model (e.g., the model-generated question answers), including a specific type of answer, a particular tone, etc. Prompt engineering can be associated with adjustments to specificity behavior, instruction following behavior, priming behavior, token economy or token limits of the model, etc. The prompt engineering for the category-wise questions 1264 can be performed to improve the reliability and utility of the output of the fine-tuned model from domain narrative finetuning stage 1250, without modification to the model itself. The category-wise questions 1264 can cover key aspects of the information within the clinical narratives 1254, such as tooth information, decay severity, and various other context-specific questions. For instance, an illustrative example listing is provided below of sample questions that may correspond to a 'crown' category or context (although this example is provided for purposes of illustration, and is not intended to be exhaustive or limiting):

What is the affected tooth number?
Is the existing crown causing any symptoms?
Are there any open margins on the existing crown?
Is there recurrent decay present?
When was the existing crown initially placed?
Is the tooth currently causing any symptoms?
Is the tooth damaged due to caries or fracture?
Is a crown restoration necessary to restore the tooth?
Was an initial filling placed on the tooth?
Is the filling broken?
Was the tooth extracted?
What is the date on which this procedure was performed?
What is the decay severity?
What is the filling type?
How did injury occur?

Notably, the pre-defined category-wise questions 1264 may be written to have an expected answer structure wherein the answer is a yes or a no (e.g., is there recurrent delay present; are there caries present; etc.). More generally, the pre-defined category-wise questions 1264 may be written such that the expected answer structure selects an answer from a set of one or more configured answer possibilities. For instance, the question 'what is the affected tooth number' will have a corresponding answer that comprises a particular tooth number selected from the finite set of possible tooth number identifications; the question 'how did injury occur' can be selected from a finite set of possible injury locations (e.g., workplace injury, non-workplace injury) and/or from a finite set of possible injury means (e.g., contact injury, non-contact injury), etc.

In one illustrative example, the pre-defined category-wise questions 1264 may be organized into a hierarchical structure that corresponds to a logical progression between questions, i.e., wherein a certain answer to a first question logically leads to the asking of a related second question, a different answer to the first question logically leads to the asking of a different, third question, etc. In some embodiments, the hierarchical structure can be a decision tree organization 1266 of the pre-defined category-wise questions 1264. In particular, the decision tree organization 1266 can be used to enable subsequent contextual questions from the pre-defined category-wise questions 1264 to be located along the branches of the decision tree 1266, starting with general questions in the upper level parent nodes and going to more specific questions in the lower level child nodes of the decision tree 1266.

Notably, the decision tree structure 1266 allows the QA fine-tuned ML/AI model(s) provided to the domain narratives extractive QA stage 1250 to efficiently navigate through the questions 1262 based on the information extracted from the clinical narratives 125. Additionally, the decision tree organization 1266 helps the model to sequentially extract relevant information while minimizing the need for redundant questions, thereby rendering the clinical narratives fine-tuning process 1250 more efficient.

At block 1268, the domain narratives extractive QA fine-tuning stage 1268 can perform training data preparation, based on using the pre-defined category-wise questions 1264 and actual answers obtainable from the clinical narratives (e.g., the same as, similar to, and/or otherwise based on the contexts information 1258 determined previously from the input clinical narratives 1254). In some embodiments, the training data preparation 1268 can include generating a plurality of training data samples. Each training data sample consists of a clinical narrative (context), a question, and the corresponding answer (extracted from the clinical narrative). In particular, contexts 1258 can be appended to the training data samples 1268 with possible answer options that the model should output (e.g., [Y] [N] for yes/no questions; etc.). The use of the contexts 1258/appended corresponding answer extracted from the underlying clinical narrative 1254 for the particular training data sample 1268 can assist in the input ML model to the domain narratives QA fine tuning stage 1250 learning to map the correct answer to the corresponding question. In some aspects, the training data preparation 1268 can be configured to split the generated dataset into training and validation sets, ensuring that the model can be evaluated on unseen data during the fine-tuning process 1250.

Provided below is a first illustrative example of a training data sample that comprises a context information 1258 (derived from a clinical narrative 1254), a question (from the pre-defined questions 1264), and the expected answer:

Context: [Y] [N]

My patient needs a crown and build-up on Tooth #4. The current restorations are a large no/allow and a separate OL/allow. These restorations are twenty years old at least-placed while a young teenager. The restoration on tooth #30 does not look good either. Decay is present on mesial with an open margin and also under the BO aspect of this larger MOB. After the removal of the old restorations on both #3 and #32, there will not be enough sound tooth structure remaining to place any other type of treatment other than full coverage crowns. Please approve treatment submitted.

Question:
Is a crown restoration necessary to restore the tooth?
Answer:
Y

Provided below is a second illustrative example of a training data sample that comprises a context information 1258 (derived from a clinical narrative 1254), a question (from the pre-defined questions 1264), and the expected answer:

Context: [caries] [fracture]

My patient needs a crown and build-up on Tooth #4. The current restorations are a large no/allow and a separate OL/allow. These restorations are twenty years old at least-placed while a young teenager. The restoration on tooth #30 does not look good either. Decay is present on mesial with an open margin and also under the BO aspect of this larger MOB. After the removal of the old restorations on both #3 and #32, there will not be enough sound tooth structure remaining to place any other type of treatment other than full coverage crowns. Please approve treatment submitted Question:
Is the tooth damaged due to caries or fracture?
Answer:
caries The prepared training data 1268 can be used to perform model finetuning on narratives 1272. In particular, this second model finetuning at block 1272 can be applied to the domain-adapted and general QA fine-tuned model from stages 1230 and 1210, obtained from the storage in the model repository 1225 after being trained as described above with respect to the earlier fine-tuning stages 1230 and 1210. The clinical narrative QA fine-tuning of stage 1250 can follow an extractive QA approach, which involves training the model to identify and extract the correct answer spans from the given context.

The fine-tuning process 1272 can be performed for multiple epochs, with model performance evaluated on the validation set of the training data 1268 at each epoch to monitor progress and prevent overfitting. By following this approach, the QA model may be specifically fine-tuned to extract information from clinical narratives in the dental insurance claims adjudication context (e.g., such as the clinical narratives 1254). The clinical narrative fine-tuning 1272 allows the model to provide accurate and relevant information to claim reviewers, streamlining the claims review process and improving decision-making efficiency for downstream processes.

3. Automated Provider Credentialing Using ML/AI Models

Systems and techniques are described for implementing the automated provider credentialing in a provider network (e.g., such as the provider 370 of FIG. 3, the provider 470 of FIG. 4, etc. In some aspects, automated provider credentialing using one or more ML/AI models can be implemented in the context of the ML/AI claims engine 1330 of FIG. 13, and/or the back office automated digital workflow 1332 of FIG. 13. In some examples, the automated provider credentialing can be implemented in the context of the provider management service 1338 of FIG. 13 and/or the provider network management service 1339 of FIG. 13. As will be described below, FIG. 13 is a diagram illustrating an example sub-view 1300 of the system 300 architecture of FIG. 3, corresponding to an implementation of automatic provider credentialing using one or more ML/AI models, in accordance with some examples.

The ML/AI claims engine 1330 can be the same as or similar to the ML/AI claims engine 330 of FIG. 3 and/or the ML/AI claims engine 430 of FIG. 4, etc. The back office automated digital workflow 1332 of FIG. 13 can be the same as or similar to the back office automated digital workflow 332 of FIG. 3; the back office automated digital workflow 432 of FIG. 4; etc. The provider management service 1338 of FIG. 13 can be the same as or similar to the provider management service 338 of FIG. 3. The provider network management service 1339 of FIG. 13 can be the same as or similar to the provider network management service 339 of FIG. 3.

Figure 14:
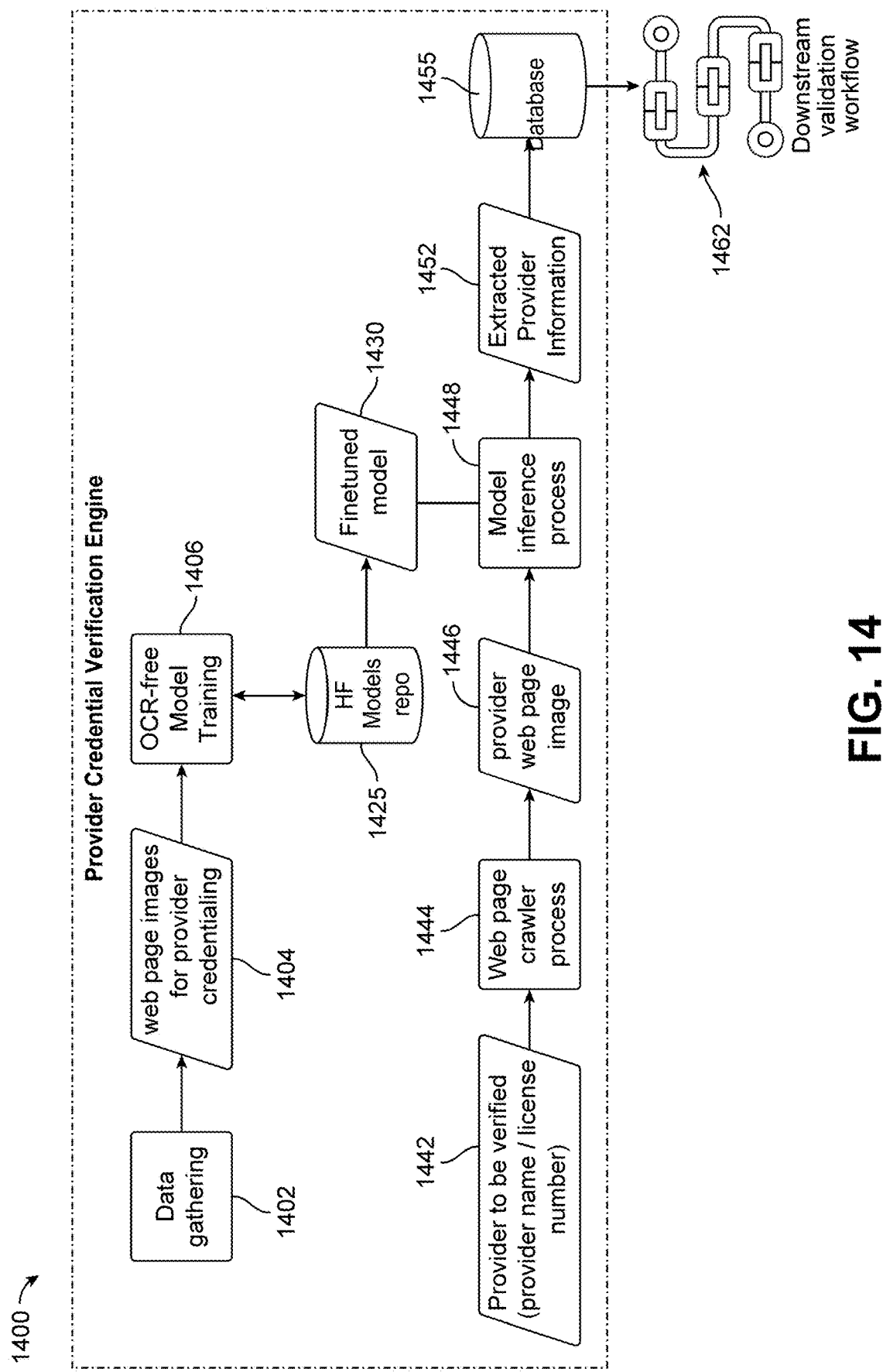
FIG. 14 is a diagram illustrating an example of a provider credential verification engine that can be used to performed automated web-based verification, in accordance with some examples.

In some embodiments, automated provider credentialing can be implemented using a provider credential verification engine 1400 illustrated in FIG. 14, which is a diagram illustrating an example of a provider credential verification engine 1400 that can be used to performed automated web-based verification, in accordance with some examples. The provider credential verification engine can be implemented in or by one or more of the ML/AI claims engine 1330, back office automated digital workflow 1332, provider management service 1338, and/or provider network management service 1339 of FIG. 13. In some embodiments, the provider credential verification engine 1400 of FIG. 4 can be implemented as an additional (e.g., separate) service associated with the back office automated digital workflow 1332 of FIG. 13. As will be described below, the provider credential verification engine 1400 can be used to efficiently verify and evaluate dental providers' eligibility for participation in insurance networks using correspondingly trained ML and/or AI models.

For instance, the current provider credentialing process in dental insurance networks is manual, time-consuming, error-prone, and inefficient. This manual process involves several steps to verify the eligibility of providers for participation in insurance networks. Aspects of the present disclosure and/or the provider credential verification engine 1400 can address this problem and more, for instance by replacing the manual process with an automated approach that streamlines verification, evaluation, and continuous monitoring and updating of dental providers' profiles for participation in dental insurance networks.

In one illustrative example, a one-time process can be performed to fine-tune an OCR-free ML/AI model to perform data extraction of provider or provider-related information from various publicly available sources, webpages, databases, etc. In some aspects, the OCR-free ML/AI model for fine-tuning may be the same as or similar to an OCR-free ML/AI backbone model utilized in and described previously with respect to one or more of FIGS. 3-12. In some embodiments, the OCR-free model fine-tuned by the provider credential verification engine 1400 can be an OCR-free ML/AI model configured to extract information from screenshots or other digital images, for instance pix2struct (although various other model choices and/or OCR-free model implementations may also be utilized without departing from the scope of the present disclosure). For instance, in one illustrative example the OCR-free model training 1406 is performed for an OCR-free model such as pix2struct, although it is again noted that various other OCR-free models may also be utilized. In general, an OCR-free model can be obtained as a machine learning model that does not require or perform OCR to extract textual information from an input image (e.g., where OCR is the conventional process of converting images of text into machine-readable text). OCR-free models are often trained on large datasets of images and text, which enables the OCR-free models to learn the identification and extraction of text directly from document images. OCR-free models can provide advantages over the conventional OCR-based systems and techniques, including increased accuracy, increased inference speed, and improved versatility (e.g., as OCR-free models can be used to extract text from a variety of images, including scanned documents, handwritten notes, and even images of text where portions of the text is obscured or damaged, etc.). In the illustrative example wherein the OCR-free model provided to the OCR-free model training 1406 and/or stored to the model repository 1425 after training is a pix2struct model (e.g., in the illustrative example where the finetuned OCR-free model 1430 is based on pix2struct and/or a pix2struct backbone, etc.), the pix2struct model may be obtained as a pre-trained, OCR-free image-to-text machine learning model configured for visual language understanding (e.g., visual document understanding (VDU), etc.). The pix2struct model can be trained on a massive dataset of masked screenshots of web pages, and may be used to generate text descriptions of images, to translate images into text, and/or to answer questions about images. The pix2struct is an example of an OCR-free model.

As illustrated in FIG. 14, at block 1402 data gathering can be performed to obtain web page images 1404 for provider credentialing. In some aspects, a web crawler service can be used to automatically search and scrape specific websites, databases, etc. for provider and/or provider credentialing information. For instance, an input to the data gathering process 1402 may be received as a particular provider's name and/or license number, which can be used by the web crawler service to capture relevant web page screenshots 1404 for credentialing that particular provider identified in the input.

The web crawler can gather images from web pages across all licensing and credentialing states for providers within the domain, and is used to create a training dataset that may be used to fine-tune the OCR-free model (e.g., pix2struct, etc.) during the OCR-free model training process 1406. In some embodiments, the web page images 1404 may be organized into a key-value pair scheme for annotation of the collected data and for representation of values to be extracted using the fine-tuned OCR-free model (e.g., pix2struct model, etc.) that is provided to the OCR-free model training 1406. Various data sources may be fed into the OCR-free model training process 1406 (e.g., by virtue of being captured by the web crawler service used in data gathering stage 1402 to obtain the web page images or screenshots 1404 indicative of credentialing information). For instance, the types of data sources fed into the OCR-free model training 1406 can include, but are not limited to, one or more of data from state licensing boards, Drug Enforcement Agency (DEA) data, National Public Procurement System (NPPS) data), National Provider Data Bank (NPDB) data and provider reports, Office of Inspector General (OIG) database information, one or more self-reported provider documents, etc.

In some aspects, the OCR-free model training 1406 can be performed to fine-tune an OCR-free model on the web page images obtained for provider credentialing 1404. The resulting fine-tuned model 1430 can be stored in model repository 1425, which may be cloud-based and may be the same as or similar to any one or more of the model repositories described previously herein with respect to any one of FIGS. 3-13.

The fine-tuned OCR-free model 1430 can be used in the model inference processing stage 1448 of the provider credential verification engine 1400. For instance, an input to the inference processing stage 1448 can being with obtaining information indicative of the provider to be verified 1442. The provider to be verified 1442 can be indicated by identifying information such as provider name, provider license number, etc. In some embodiments, the provider information to be verified 1442 can be received based on an API call or other triggering input requesting that automated provider verification be performed, using the information supplied by the request/triggering input to the provider credential verification engine 1400.

At block 1444, a web page crawler process uses the provider identification information 1442 to obtain screenshots of web pages and/or publicly available databases that contain (or may contain) information that corresponds to or is associated with the provider identity 1442 received as input. In some cases, the web page crawler process 1444 captures one or more images (e.g., screenshots) of provider web page images 1446 that contain textual information corresponding to credentialing information of the provider identity 1442. The one or more captured provider web page images 1446 can be provided as input to the model inference process 1448 performed using the fine-tuned model 1430 from model repository 1425.

The output of the model inference processing stage 1448 is extracted provider information 1452 that corresponds to the provider identity 1442 that was received for verification, wherein the extracted provider information 1452 is extracted from the provider web page images (screenshots) 1446 by the finetuned OCR-free model 1430. In one illustrative example, the extracted provider information 1452 obtained during inference can be stored in a database 1455 and used for one or more downstream validation workflows 1462 of the systems and techniques described herein.

In particular, it is contemplated that the extracted provider information 1452 can include, but is not limited to, one or more of public website data and/or document images uploaded by the provider or other entity (e.g., wherein the document images may be unavailable publicly, or have limited public availability, etc.). In some embodiments, the provider credential verification engine 1400 of FIG. 14 is used to extracted provider information 452 that comprises web-based publicly available information, such as: provider name, provider address, provider phone number, provider website, provider specialties, provider insurances, etc.

In one illustrative example, the public website data extracted provider information 1452 can be stored in the database 1455 and later combined to perform provider credential verification based on additional extracted provider information obtained from one or more document verification processes. For instance, the public website data-based extracted provider information 1452 can be combined with document information obtained or extracted using a document verification engine 1500 of FIG. 15.

Figure 15:
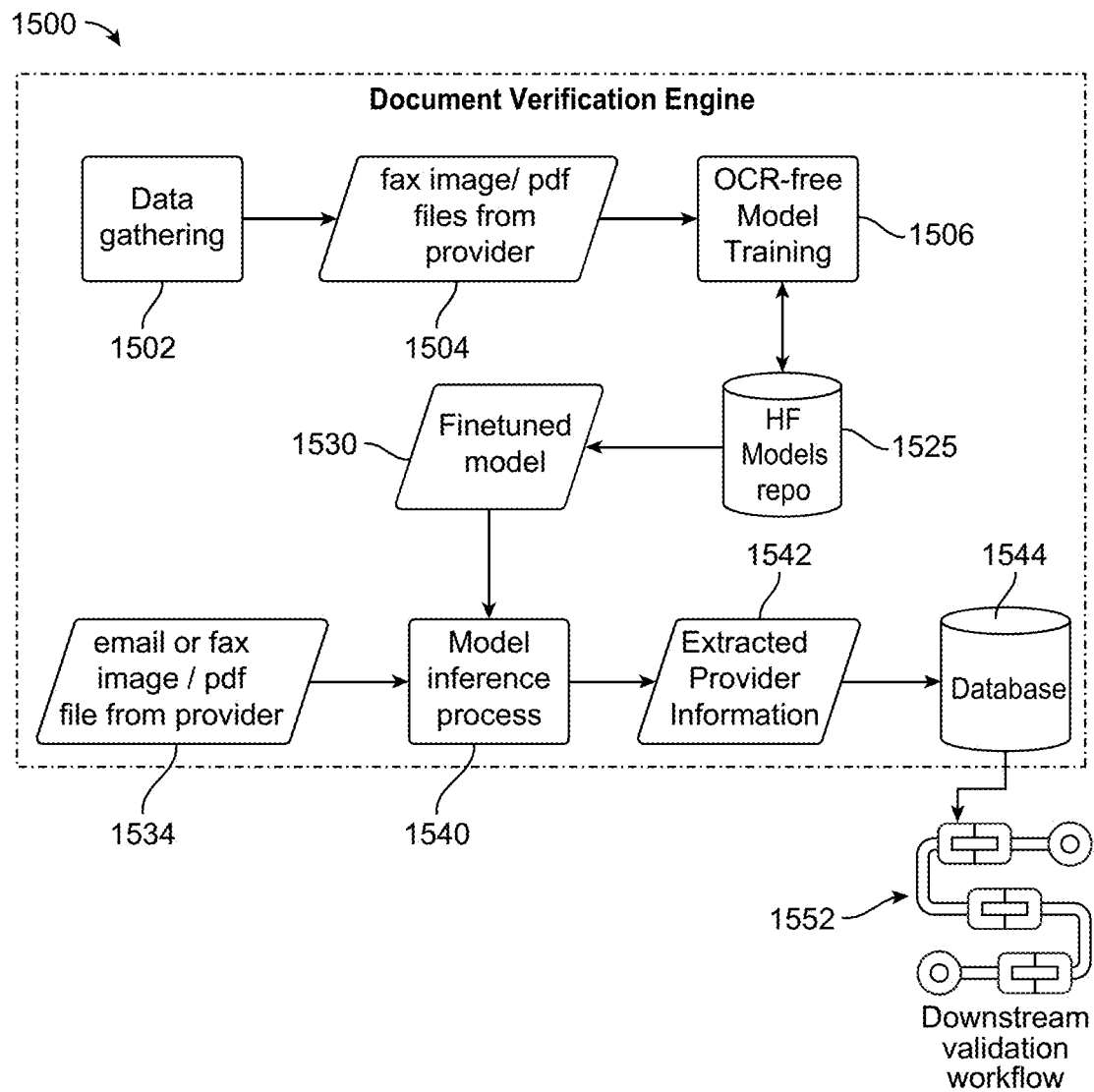
FIG. 15 is a diagram illustrating an example of a document verification engine that can be used to perform automated document verification, in accordance with some examples.

The document verification engine 1500 of FIG. 15 can perform data gathering 1502 similar to data gathering 1402 of FIG. 14. The data gathering 1502 of document verification engine 1500 can be performed to obtain provider credentialing documents 1504 for performing OCR-free model training 1506. In some embodiments, the OCR-free model finetuned and used by the document verification engine 1500 can be the same as or similar to the OCR-free model finetuned and used by the provider credential verification engine 1400. For instance, both the web-based extraction performed in FIG. 14 and the document-based extraction performed in FIG. 15 can be based on fine-tuning a pix2struct OCR-free model and using the trained model (e.g., performing inference with the trained pix2struct OCR-free model) to generate extracted provider information from the corresponding web page screenshot or document image provided to the inference stage.

In another example, the document-based extract performed in FIG. 15 can be based on fine-tuning a Donut-based OCR-free model (e.g., different from the pix2struct-based model used in FIG. 14) to generate extracted provider information from the document images provided to the inference stage.

In one illustrative example, the training data 1504 for OCR-free model training 1506 of document verification engine 1500 can include provider credentialing data collected from images of paper, fax, email copies, etc., of a provider's credentialing application received in a mailroom for manual input and processing. The collected data can be organized into a key-value pair scheme for annotation of the gathered data and representation of the values to be extracted using the fine-tuned Donut-based OCR-free model 1530. The model repository 1525 can store the finetuned model 1530, and may be the same as or similar to the model repository 1425 of FIG. 14.

In some aspects, the model inference process 1448 for web-based verification of FIG. 14 can be used to implement an initial stage of a provider credentialing process. For instance, once the provider credentialing process clears the initial step, the provider can be required to submit requested documents corresponding to their provider credentials, typically via email or fax. During the actual credentialing process, the fine-tuned models described above (e.g., fine-tuned OCR-free model 1430 of FIG. 14 and/or finetuned OCR-free model 1530 of FIG. 15) are used to extract the relevant information for provider credential verification.

In particular, the requested documents from the provider can be received as the email or fax document images or files 1534 from the provider, and provided as input(s) to an OCR-free model inference process 1540 using the finetuned model 1530 of the document verification engine 1500. During the inference 1540, the finetuned model 1530 can analyze the email or fax image/file 1534 and generated extracted provider credentialing information 1542. The extracted provider information 1542 can be written to a database 1544 and used for one or more downstream validation workflows 1552. In some embodiments, the database 1544 can be the same as or similar to the database 1455 and/or the downstream validation workflow 1552 can be the same as or similar to the downstream validation workflow 1462. In some aspects, the document-based extracted provider information 1542 can include one or more of a provider license number, a provider DEA number, a provider malpractice insurance information, a provider criminal background check information, a provider education and training information, etc.

The automatic provider credential verification and validation described herein can be performed based on using the extracted provider information (e.g., extracted provider information 1452 determined from the web-page image extraction of engine 1400 of FIG. 14 and the extracted provider information 1542 determined from the document image extraction of engine 1500 of FIG. 15) to create a comprehensive provider profile information. The provider profile may be associated with one or more of the downstream validation workflows 1462 or 1552 (e.g., which may be the same as one another). The provider credential profile can be used to verify provider credentials, evaluate provider qualifications, and/or determine provider eligibility for participation in the insurance network, etc., each of which may be validation tasks included in or performed by the downstream validation workflow 1462/1552. In some aspects, one or more (or both) of the web-based credential verification process of FIG. 14 and/or the document-based credential verification process of FIG. 15 may be implemented using continuous monitoring and updating, wherein continuous monitoring and updating of the provider profile is performed as new information emerges or becomes available. The continuous monitoring and updating can be seen to ensure an accurate and up-to-date credentialing process that assists in allowing a dental insurance company or other user of the systems described herein to make informed decisions regarding various providers within their network.

Figure 16:
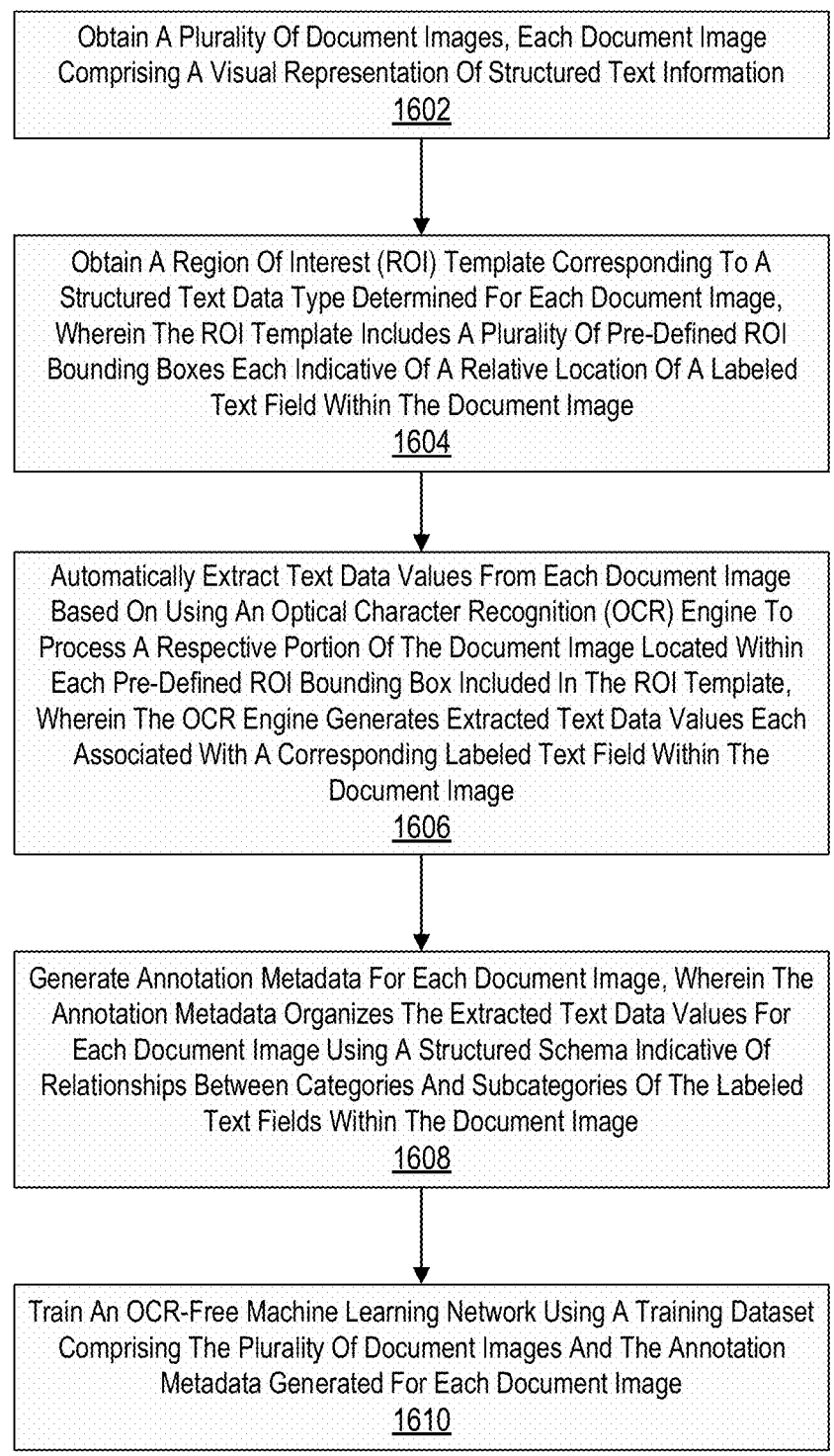
FIG. 16 is a flow diagram illustrating an example of a process for training an OCR-free machine learning network, in accordance with some examples.

FIG. 16 is a flowchart illustrating an example of a process 1600 for performing data processing operations. For instance, the process 1600 can correspond to a process for training an OCR-free machine learning network. Although the example process 1600 depicts a particular sequence of operations, the sequence may be altered without departing from the scope of the present disclosure. For example, some of the operations depicted may be performed in parallel or in a different sequence that does not materially affect the function of the process 1600. In other examples, different components of an example device or system that implements the process 1600 may perform functions at substantially the same time or in a specific sequence.

At block 1602, the process 1600 includes obtaining a plurality of document images, each document image comprising a visual representation of structured text information. For example, the plurality of document images can be included in the document image database 302 of FIG. 3, the document images 355 of FIG. 3, the document images 455 of FIG. 4, the data associated with data collection 502 of FIG. 5, the client database snapshot 612 of FIG. 6A, the historical data for AI training 614 of FIG. 6A, the client database snapshot 672 of FIG. 6B, the redacted data for model training 676 of FIG. 6B, the processed output data 732 of FIG. 7, etc.

In some examples, the plurality of document images are obtained from a plurality of different sources, each source associated with a same information domain or same lexicon of domain-specific terminology. In some embodiments, the information domain is a medical insurance domain. For instance, the medical insurance domain can comprise one or more of a dental insurance domain, a vision insurance domain, a hearing domain, or a healthcare domain. In some cases, a structured text data type determined for each document image can be selected from one or more of an invoice or receipt, periodontal chart, a dental claim form, an American Dental Association (ADA) dental claim form, or a vision claim form. In some aspects, each image of the plurality of document images corresponds to one or more of a text document, structured text, or textual information. In some cases, the plurality of document images comprises a plurality of images each corresponding to a medical document, medical form, insurance claim document, or insurance claim form.

In some aspects, a first subset of the document images corresponds to industry-wide or standardized insurance claim forms, and a second subset of the document images corresponds to client-specific insurance claim forms. For instance, the client-specific insurance forms can be obtained from one or more of the client database snapshot 672 of FIG. 6B and/or the client database snapshot 612 of FIG. 6A, etc. In some embodiments, a pre-trained OCR-free machine learning network (e.g., a Donut model) is passed through a learn to read phase performed using the first subset of document images to yield a baseline OCR-free machine learning network. The baseline OCR-free machine learning network is passed through a client-specific finetuning phase subsequent to the learn to read phase, wherein the client-specific finetuning phase is based on using the second subset of document images to yield a client-adapted trained OCR-free machine learning network. In some cases, the learn to read phase and the client-specific finetuning phase can be implemented in the model training 520 of FIG. 5 and/or the ML/AI model training pipeline 500 of FIG. 5. In some cases, a first subset of the plurality of document images are obtained from external sources within the same information domain, and a second subset of the plurality of document images are obtained from client-specific databases.

In one illustrative example, the process 1600 further includes augmenting the plurality of document images to further include a set of synthesized document images automatically generated based on changing one or more visual parameters of the structured text information represented in a document image or changing one or more text characters of the structured text information, wherein the one or more visual parameters include a font or handwriting style of the structured text information, or a font size of the structured text information. For instance, augmenting the plurality of document images can be included in the data split and augmentation engine 516 and/or the data synthesizing 514 of FIG. 5. In some cases, augmenting the plurality of document images can be performed by the preprocessing engine 700 of FIG. 7.

In some aspects, the process 1600 further includes performing one or more pre-processing operations to anonymize or mask Protected Health Information (PHI) within the structured text information of one or more document images of the plurality of document images. The PHI within the structured text information can be anonymized or masked using one or more pre-processing machine learning models trained to de-identify PHI, and wherein the one or more pre-processing machine learning models are separate from the OCR-free machine learning network. For instance, PHI can be anonymized by the data de-identification process 674 of FIG. 6B to obtain the redacted data 676 for model training process 678 of FIG. 6B.

At block 1604, the process 1600 includes obtaining a region of interest (ROI) template corresponding to a structured text data type determined for each document image, wherein the ROI template includes a plurality of pre-defined ROI bounding boxes each indicative of a relative location of a labeled text field within the respective document image. In some aspects, the ROI template can correspond to the templates 842 and/or annotations 844 of FIG. 8. The ROI templates can be generated based on or by the annotation engine 800 of FIG. 8. For instance, the ROI template can be the same as or similar to the bounding boxes information template 822 of FIG. 8. The ROI template can correspond to a document image such as the processed or pre-processed images 805 of FIG. 8.

In some aspects, the ROI template is included in a plurality of different ROI templates, each ROI template corresponding to a different document type or different organization of structural information within an image artifact. In some examples, each ROI template is indicative of configured ROI bounding box information uniquely corresponding to an identified type of structured text document represented in a document image included in the plurality of document images. In some cases, each ROI template is indicative of configured ROI bounding box information uniquely corresponding to an identified type of insurance claim form structured text document represented in a document image included in the plurality of document images.

At block 1606, the process 1600 includes automatically extracting text data values from each document image based on using an Optical Character Recognition (OCR) engine to process a respective portion of the document image located within each pre-defined ROI bounding box included in the ROI template, wherein the OCR engine generates extracted text data values each associated with a corresponding labeled text field within the respective document image.

For instance, the OCR engine can be included in or implemented by the annotation engine 800 of FIG. 8. For instance, the OCR engine can be associated with the OCR script 826 used by the annotation engine 800 of FIG. 8 to generate the filled annotations from OCR values 828 (also shown in FIG. 8). In some embodiments, the OCR engine generates the extracted text data values 828 of FIG. 8 each associated with a corresponding labeled text field (indicated by template 822) within the respective document image 805 (all shown in FIG. 8).

At block 1608, the process 1600 includes generating annotation metadata for each document image, wherein the annotation metadata organizes the extracted text data values for each document image using a structured schema indicative of relationships between categories and subcategories of the labeled text fields within the respective document image. For instance, the annotation metadata can be generated by the annotation engine 800 of FIG. 8. The annotation metadata may be the same as or similar to the finalized annotations 845 of FIG. 8. In some cases, the annotation metadata organizes the extracted text data values using a structured scheme that is the same as or similar to a structured schema associated with one of the document images of FIGS. 9A, 9B, etc., as described previously above. In some examples, the structured schema can be the same as or similar to the structured schema checked at block 1008 of FIG. 10A and/or the structured schema checked at block 1054 of FIG. 10B. In some aspects, the structured schema is indicative of at least one of hierarchical relationships or spatial relationships between categories and subcategories of the labeled text fields within the respective document image.

In some cases, generating the annotation metadata for each document image is based on providing each document image to an annotation engine that includes an annotation graphical user interface (GUI) for receiving one or more user inputs indicative of annotation information. For instance, the annotation GUI can be associated with the annotation engine 800 of FIG. 8 and/or the annotation tool 840 of FIG. 8. In some embodiments, the annotation GUI can be the same as or similar to one or more of the annotation GUI shown in FIG. 9A and/or the annotation GUI shown in FIG. 9B.

In some aspects, the annotation engine includes a respective annotation GUI for each different document type of a plurality of document types represented in the plurality of document images, and each respective annotation GUI corresponds to one or more ROI templates of a plurality of available ROI templates. In some examples, the respective annotation GUI is configured to receive one or more user inputs indicative of a fitting adjustment of an ROI template relative to a document image included in the plurality of document images, wherein the fitting adjustment aligns the pre-defined ROI bounding boxes of the ROI template with the labeled text field locations within the document image. In some aspects, the respective annotation GUI is further configured to apply the fitting-adjusted ROI template to the document image to capture corresponding ROI positions for text extraction within the labeled text field locations of the document image, determine one or more matching document images included in the plurality of document images, the one or more matching document images identified as having a same document type, and apply the fitting-adjusted ROI template to each of the one or more matching document images to capture corresponding ROI positions for the matching document image.

In some examples, automatically extracting the text data values using the OCR engine (e.g., OCR script 826 of FIG. 8) includes using the OCR engine to perform OCR of the respective portion of image data included in the document image and within the plurality of fitting adjustment-aligned ROI bounding boxes; providing the extracted text data values for each of the ROI bounding boxes for display on a respective annotation GUI for the document type of the document image; receiving one or more user inputs to the respective annotation GUI, the one or more user inputs indicative of a correction or identified error within the OCR engine extracted text data values; and generating error-corrected extracted text data values by updating the OCR engine extracted text data values based on the user inputs indicative of the corrections or identified errors.

In some aspects, the error-corrected extracted text data values are generated without receiving an additional user input comprising a manual entry of a replacement key-value pair for the identified error. In some cases, the respective annotation GUI is further configured to receive information associated with an incorrect prediction during inference time of the trained OCR-free machine learning network, the information including the input document image and incorrect prediction generated during inference time, display, using the respective annotation GUI, the input document image and corresponding extracted text data values incorrectly predicted during the inference time, and generate an active learning training data pair comprising the input document image and corresponding error-corrected text data values based on receiving one or more user inputs to the respective annotation GUI indicative of the error-corrected text data values.

In some examples, the process 1600 further includes receiving, from the trained OCR-free machine learning network, information indicative of a selection of most informative document image samples included in an unlabeled dataset of document image samples. In some examples, the selection of the most informative document image samples corresponds to document image samples for which the trained OCR-free machine learning network generates a predicted output of structured text data having a lowest confidence value. In some examples, the process 1600 further includes fine-tuning one or more parameters of the trained OCR-free machine learning network based on a dataset comprising a plurality of the active learning training data pairs.

At block 1610, the process 1600 includes training an OCR-free machine learning network using a training dataset comprising the plurality of document images and the annotation metadata generated for each document image. For example, training the OCR-free machine learning network yields a trained OCR-free machine learning network. In some cases, the trained OCR-free machine learning network receives an input document image and generates an output of structured text data extracted from the input document image and automatically formats the output of the structured text data using the structured schema corresponding to a type of the input document image.

In some cases, the trained OCR-free machine learning network automatically uses the corresponding structured schema for the type of the input document image without receiving an additional input indicative of the type of the input document image or indicative of the corresponding structured schema. In some cases, wherein the trained OCR-free machine learning network implements an OCR-free machine learning model that generates the output of the structured text data without performing OCR.

In some examples, the OCR-free machine learning model is a document understanding transformer (Donut) machine learning model. In some cases, the OCR-free machine learning model is implemented based on a transformer architecture and includes a vision encoder transformer sub-network and a text decoder transformer sub-network.

In some aspects, the vision encoder transformer sub-network receives an input document image representing textual information and generates a plurality of image features corresponding to the input document image, and the text decoder transformer sub-network uses the plurality of image features to generate a predicted structured text data corresponding to visual textual information of the input document image, and wherein the text decoder transformer sub-network predicts key-value pairs corresponding to the predicted structured text data. In some aspects, predicting the key-value pairs corresponding to the predicted structured text data comprises structuring the predicted structured text data using one of the annotation metadata structured schemas seen during training.

In some examples, the process 1600 further includes performing inference using the trained OCR-free machine learning network to analyze one or more production document images, wherein performing inference includes generating a predicted inference output indicative of text within the document image, and processing the predicted inference output for each production document image using a metadata validation engine, wherein the metadata validation engine is configured to cross-reference one or more fields within the predicted inference output with original artifacts associated with the respective production document image.

In some aspects, the metadata validation engine cross-references the one or more fields within the predicted inference output with the original artifacts comprising expected format information of text values of the one or more fields. In some cases, the original artifacts include one or more of: a threshold value or upper and lower thresholds of a range associated with a numerical text value field; an expected data structure associated with a text value field; or a required schema structure or a required alignment for the structured schema corresponding to the respective document image type. In some cases, the process 1600 further includes generating the predicted inference output to include automatically applied corrections for text data values or fields that were rejected by the cross-referencing of the metadata validation engine.

Figure 17:
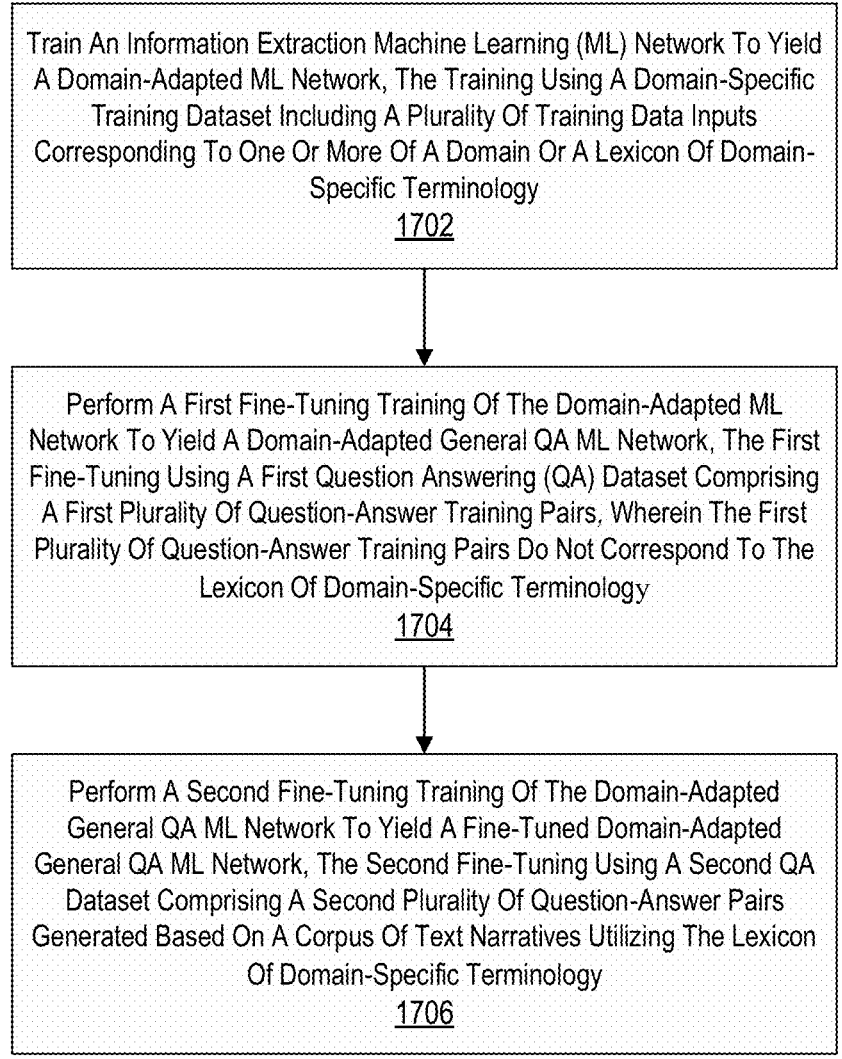
FIG. 17 is a flow diagram illustrating an example of a process for domain-adaptation for training a machine learning network based on extractive question answering (QA), in accordance with some examples.

FIG. 17 is a flowchart illustrating an example of a process 1700 for performing data processing operations. For instance, the process 1700 can correspond to a process for domain-adaptation for training a machine learning network based on extractive question answering (QA). Although the example process 1700 depicts a particular sequence of operations, the sequence may be altered without departing from the scope of the present disclosure. For example, some of the operations depicted may be performed in parallel or in a different sequence that does not materially affect the function of the process 1700. In other examples, different components of an example device or system that implements the process 1700 may perform functions at substantially the same time or in a specific sequence.

At block 1702, the process 1700 includes training an information extraction machine learning (ML) network to yield a domain-adapted ML network, the training using a domain-specific training dataset including a plurality of training data inputs corresponding to one or more of a domain or a lexicon of domain-specific terminology. For instance, the domain-adapted ML network can be the same as or similar to the finetuned ML model output to the model repository 1225 from the domain narratives extractive QA finetuning stage 1250 shown in FIG. 12. In some embodiments, the domain-adapted ML network can be implemented based on NLP and QA transformer models. For instance, the domain-adapted ML network can be based on a masked language transformer model, etc.

In some examples, the information extraction ML network is a pre-trained masked language transformer model, and the steps of block 1702 correspond to the domain adaptation stage 1210 shown in FIG. 12. The domain-adapted ML network can be the same as or similar to the domain adapted model 1224 generated by the domain adaptation training 1222 of the domain adaptation stage 1210 of FIG. 12.

In some embodiments, the domain-specific training dataset is the same as the domain-specific dataset 1214 of FIG. 12. The domain or lexicon of domain-specific terminology can be obtained based on the data gathering 1212 and data preprocessing 1216 of domain adaptation stage 1210 of FIG. 12.

In some cases, the domain is a medical or clinical domain, and the lexicon of the domain-specific terminology is a lexicon of medical or clinical terminology. In some embodiments, the domain is a dental domain or a vision domain, and the lexicon of domain-specific terminology is a lexicon of dental terminology or a lexicon of vision terminology. In some embodiments, the corpus of text narratives is a corpus of clinical narratives corresponding to dental insurance claim documents, and may be included in the data gathering 121 of FIG. 12 and/or can be included in the clinical narratives 1254 of FIG. 12.

In some examples, the process 1700 further includes obtaining a plurality of dental insurance claim documents and classifying each dental insurance claim document into at least one classification of a plurality of classifications represented within the plurality of dental insurance claim documents. In some cases, the process 1700 further includes generating a subset of question-answer pairs for each respective classification of the plurality of classifications, wherein each subset of question-answer pairs is generated using a corresponding subset of the plurality of dental insurance claim documents having the respective classification. For instance, the classifications can be the same as or similar to the contexts 1258 of FIG. 12. Generating the question-answer pairs can be the same as or similar to the formulation of the category-wise questions 1262 and 1264 of FIG. 12. In some cases, the plurality of classifications correspond to types of dental procedures represented in one or more of the corpus of clinical narratives or the dental insurance claim documents.

In some embodiments, training the information extraction ML network using the domain-specific training dataset comprises performing domain adaptation over one or more of the domain or the lexicon of domain-specific terminology. In some cases, training the information extraction ML network comprises performing domain adaptation for information extraction using the lexicon of domain-specific terminology. In some examples, the process 1700 further includes obtaining a plurality of text data documents (e.g., during data gathering 1212 of FIG. 12), wherein each respective text data document includes text information utilizing at least a portion of the lexicon of domain-specific terminology, and generating the plurality of training data inputs based on applying one or more data pre-processing operations to the plurality of text data documents. For instance, the one or more data pre-processing operations can be the same as or similar to the data preprocessing operations 1216 of FIG. 12. In some cases, performing the one or more data pre-processing operations includes: tokenizing the respective text information of each text data document to generate corresponding tokenized text data; and dividing the corresponding tokenized text data into one or more token chunks, wherein a number of tokens in each token chunk is determined based on one or more input parameters of the information extraction ML network. In some aspects, the information extraction ML network is a transformer model. In some cases, the information extraction ML network implements a masked language model.

At block 1704, the process 1700 includes performing a first fine-tuning training of the domain-adapted ML network to yield a domain-adapted general QA ML network, the first fine-tuning using a first question answering (QA) dataset comprising a first plurality of question-answer training pairs, wherein the first plurality of question-answer training pairs do not correspond to the lexicon of the domain-specific terminology.

For example, the steps of block 1704 can be implemented in the general extractive QA training stage 1230 of FIG. 12. The domain adapted ML network can again be the same as or similar to the domain adapted model 1224 of FIG. 12. The domain-adapted general QA ML network can be generated as output of the model fine tuning using the extract QA approach 1236, as shown in FIG. 12. The first QA dataset can be the same as or similar to the extractive QA dataset 1232 of FIG. 12. In some cases, the first QA dataset is a general QA dataset comprising a plurality of general question-answer training pairs, wherein the plurality of general question-answer training pairs do not correspond to the lexicon of domain-specific terminology.

At block 1706, the process 1700 includes performing a second fine-tuning training of the domain-adapted general QA ML network to yield a fine-tuned domain-adapted general QA ML network, the second fine-tuning using a second QA dataset comprising a second plurality of question-answer pairs generated based on a corpus of text narratives utilizing the lexicon of the domain-specific terminology.

For example, the operations of block 1706 can be the same as or similar to those implemented by the domain narratives extractive QA stage 1250 of FIG. 12. The fine-tuned domain-adapted general QA ML network can be output from the model finetuning on narratives stage 1272 of FIG. 12. In some cases, the corpus of text narratives can be the same as or similar to the clinical narratives 1254 of FIG. 12. In some embodiments, the corpus of text narratives (e.g., clinical narratives 154) can be generated based on obtaining a plurality of dental insurance claim documents and classifying each dental insurance claim document into at least one classification of a plurality of classifications represented within the plurality of dental insurance claim documents. A subset of question-answer pairs can be generated for each respective classification of the plurality of classifications, wherein each subset of question-answer pairs is generated using a corresponding subset of the plurality of dental insurance claim documents having the respective classification. The question-answer pairs can be based on the pre-defined questions 1264 and/or decision tree 1266 of FIG. 12. In some cases, the plurality of classifications correspond to types of dental procedures represented in one or more of the corpus of clinical narratives or the dental insurance claim documents. In some aspects, the plurality of classifications comprises a plurality of dental procedure classifications indicative of a type of dental procedure represented in a dental insurance claim document.

In some examples, each subset of question-answer pairs generated for each respective dental procedure classification is organized using a hierarchical structure based on relationships between individual questions included in the subset of question-answer pairs. In some cases, the hierarchical structure is a decision tree (e.g., decision tree organization 1266 of FIG. 12). For instance, higher levels of the decision tree include question-answer pairs of the subset that correspond to general questions, and lower levels of the decision tree include question-answer pairs of the subset that correspond to subsequent or contextual questions, wherein each subsequent or contextual question is a child node of the decision tree and is associated with a parent node corresponding to a general question.

In some cases, each respective question-answer pair of the second plurality of question-answer pairs of the second QA dataset comprises a pre-determined training question, the pre-determined training question included in at least one classification of a plurality of classifications of the corpus of text narratives, and a training answer representing an answer to the pre-determined training question, wherein the training answer is extracted from a text narrative included in the corpus of text narratives. In some cases, a pre-determined training question is associated with a plurality of different training answers each representing an answer to the pre-determined training question, and each respective one of the plurality of different training answers is extracted or obtainable from a different one of the text narratives included in the corpus of text narratives.

In some aspects, each training answer comprises a portion of text information extracted from the text narrative. In some cases, each training answer is identifiable from a portion of text information extracted from the text narrative.

In some embodiments, each question-answer pair of the second plurality of question-answer pairs comprises a text narrative of the corpus of text narratives, wherein the text narrative comprises a context of the question-answer pair, a question corresponding to the text narrative, wherein the question is answerable based on the text narrative context, and a corresponding answer for the question, wherein the corresponding answer is extracted from the text of the text narrative context.

In some cases, the context of the question-answer pair further includes a set of allowable answer options for the question corresponding to the text narrative. In some cases, the set of allowable answer options includes a first answer option indicative of an affirmative answer and a second answer option indicative of a negative answer. In some cases, the set of allowable answer options includes a plurality of answer options each indicative of a respective phrase or information, wherein at least a portion of the set of allowable answer options are not indicative of an affirmative or negative answer.

In some cases, the second QA dataset is a domain-specific QA dataset comprising a plurality of domain-specific question-answer training pairs, and wherein the plurality of domain-specific question-answer training pairs correspond to the lexicon of domain-specific terminology.

In some cases, the second QA dataset includes at least: a first subset of question-answer pairs corresponding to a first classification of a plurality of classifications determined for the corpus of text narratives, and a second subset of question-answer pairs corresponding to a second classification of the plurality of classifications determined for the corpus of text narratives. In some cases, the second QA dataset includes a respective subset of question-answer pairs corresponding to each classification of the plurality of classifications determined for the corpus of text narratives. In some cases, the second QA dataset organizes the respective subsets of question-answer pairs using a hierarchical structure based on the plurality of classifications.

In some examples, the second plurality of question-answer pairs includes one or more of: a first subset of question-answer pairs generated using dental insurance claim documents associated with a crown procedures classification; a second subset of question-answer pairs generated using dental insurance claim documents associated with an orthodontics procedure classification; a third subset of question-answer pairs generated using dental insurance claim documents associated with a root canals procedure classification; or a fourth subset of question-answer pairs generated using dental insurance claim documents associated with a scaling and root planning procedure classification.

In some examples, the processes described herein (e.g., process 1600, process 1700, and/or any other process described herein) may be performed by a computing device or apparatus or a component or system (e.g., a chipset, one or more processors (e.g., CPU, GPU, NPU, DSP, etc.), ML system such as a neural network model, etc.) of the computing device or apparatus. In some examples, the process 1600, the process 1700, and/or any other process described herein can be performed by a computing device or system having the computing device architecture 1800 of FIG. 18. The computing device, apparatus, or system can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein, including the process 1600, the process 1700, and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 1600 and the process 1700 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1600, the process 1700, and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 18:
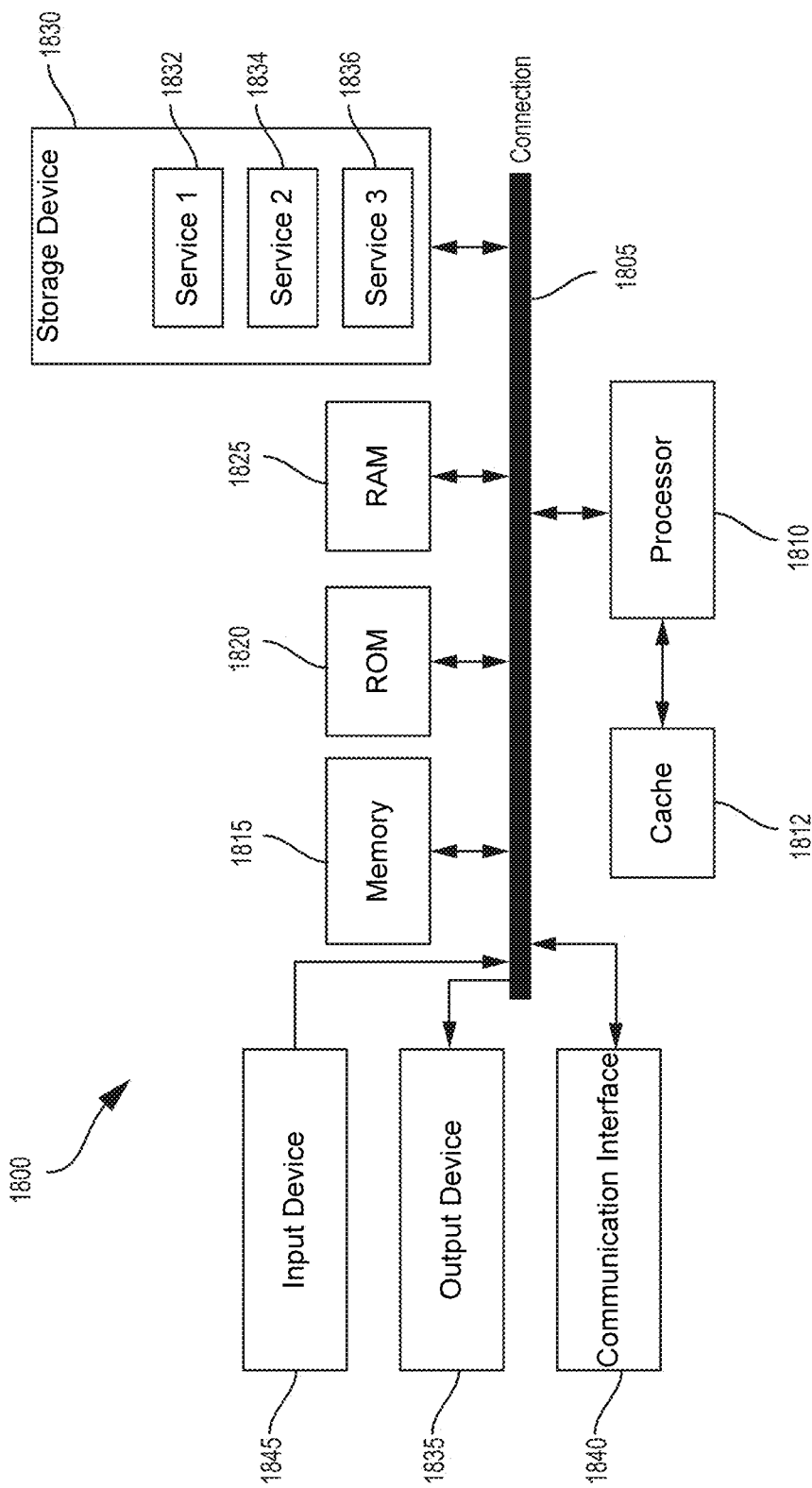
FIG. 18 is a diagram illustrating an example system architecture for implementing certain aspects described herein.

FIG. 18 illustrates an example computing device architecture 1800 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. The components of computing device architecture 1800 are shown in electrical communication with each other using connection 1805, such as a bus. The example computing device architecture 1800 includes a processing unit (CPU or processor) 1810 and computing device connection 1805 that couples various computing device components including computing device memory 1815, such as read only memory (ROM) 1820 and random-access memory (RAM) 1825, to processor 1810.

Computing device architecture 1800 can include a cache of high-speed memory connected directly with, in close proximity to, or integrated as part of processor 1810. Computing device architecture 1800 can copy data from memory 1815 and/or the storage device 1830 to cache 1812 for quick access by processor 1810. In this way, the cache can provide a performance boost that avoids processor 1810 delays while waiting for data. These and other engines can control or be configured to control processor 1810 to perform various actions. Other computing device memory 1815 may be available for use as well. Memory 1815 can include multiple different types of memory with different performance characteristics. Processor 1810 can include any general-purpose processor and a hardware or software service, such as service 1 1832, service 2 1834, and service 3 1836 stored in storage device 1830, configured to control processor 1810 as well as a special-purpose processor where software instructions are incorporated into the processor design. Processor 1810 may be a self-contained system, containing multiple cores or processors, a bus, memory controller, cache, etc. A multi-core processor may be symmetric or asymmetric.

To enable user interaction with the computing device architecture 1800, input device 1845 can represent any number of input mechanisms, such as a microphone for speech, a touch-sensitive screen for gesture or graphical input, keyboard, mouse, motion input, speech and so forth. Output device 1835 can also be one or more of a number of output mechanisms known to those of skill in the art, such as a display, projector, television, speaker device, etc. In some instances, multimodal computing devices can enable a user to provide multiple types of input to communicate with computing device architecture 1800. Communication interface 1840 can generally govern and manage the user input and computing device output. There is no restriction on operating on any particular hardware arrangement and therefore the basic features here may easily be substituted for improved hardware or firmware arrangements as they are developed.

Storage device 1830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1825, read only memory (ROM) 1820, and hybrids thereof. Storage device 1830 can include services 1832, 1834, 1836 for controlling processor 1810. Other hardware or software modules or engines are contemplated. Storage device 1830 can be connected to the computing device connection 1805. In some aspects, a hardware module that performs a particular function can include the software component stored in a computer-readable medium in connection with the necessary hardware components, such as processor 1810, connection 1805, output device 1835, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. A method for training an Optical Character Recognition-free (OCR-free) machine learning network, the method comprising: obtaining a plurality of document images, each document image comprising a visual representation of structured text information; obtaining a region of interest (ROI) template corresponding to a structured text data type determined for each document image, wherein the ROI template includes a plurality of pre-defined ROI bounding boxes each indicative of a relative location of a labeled text field within the respective document image; automatically extracting text data values from each document image based on using an Optical Character Recognition (OCR) engine to process a respective portion of the document image located within each pre-defined ROI bounding box included in the ROI template, wherein the OCR engine generates extracted text data values each associated with a corresponding labeled text field within the respective document image; generating annotation metadata for each document image, wherein the annotation metadata organizes the extracted text data values for each document image using a structured schema indicative of relationships between categories and subcategories of the labeled text fields within the respective document image; and training an OCR-free machine learning network using a training dataset comprising the plurality of document images and the annotation metadata generated for each document image.

Aspect 2. The method of Aspect 1, wherein the structured schema is indicative of at least one of hierarchical relationships or spatial relationships between categories and subcategories of the labeled text fields within the respective document image.

Aspect 3. The method of Aspect 1, wherein training the OCR-free machine learning network yields a trained OCR-free machine learning network, and wherein the trained OCR-free machine learning network: receives an input document image and generates an output of structured text data extracted from the input document image; and automatically formats the output of the structured text data using the structured schema corresponding to a type of the input document image.

Aspect 4. The method of Aspect 3, wherein the trained OCR-free machine learning network automatically uses the corresponding structured schema for the type of the input document image without receiving an additional input indicative of the type of the input document image or indicative of the corresponding structured schema.

Aspect 5. The method of Aspect 1, wherein the trained OCR-free machine learning network implements an OCR-free machine learning model that generates the output of the structured text data without performing OCR.

Aspect 6. The method of Aspect 5, wherein the OCR-free machine learning model is a document understanding transformer (Donut) machine learning model.

Aspect 7. The method of Aspect 5, wherein the OCR-free machine learning model is implemented based on a transformer architecture and includes a vision encoder transformer sub-network and a text decoder transformer sub-network.

Aspect 8. The method of Aspect 7, wherein: the vision encoder transformer sub-network receives an input document image representing textual information and generates a plurality of image features corresponding to the input document image; and the text decoder transformer sub-network uses the plurality of image features to generate a predicted structured text data corresponding to visual textual information of the input document image, and wherein the text decoder transformer sub-network predicts key-value pairs corresponding to the predicted structured text data.

Aspect 9. The method of Aspect 8, wherein: predicting the key-value pairs corresponding to the predicted structured text data comprises structuring the predicted structured text data using one of the annotation metadata structured schemas seen during training.

Aspect 10. The method of Aspect 1, wherein the plurality of document images are obtained from a plurality of different sources, each source associated with a same information domain or same lexicon of domain-specific terminology.

Aspect 11. The method of Aspect 10, wherein the information domain is a medical insurance domain.

Aspect 12. The method of Aspect 11, wherein: the medical insurance domain comprises one or more of a dental insurance domain, a vision insurance domain, a hearing domain, or a healthcare domain; and the structured text data type determined for each document image are selected from one or more of an invoice or receipt, periodontal chart, a dental claim form, an American Dental Association (ADA) dental claim form, or a vision claim form.

Aspect 13. The method of Aspect 11, wherein: a first subset of the document images corresponds to industry-wide or standardized insurance claim forms; and a second subset of the document images corresponds to client-specific insurance claim forms.

Aspect 14. The method of Aspect 13, wherein: a pre-trained OCR-free machine learning network is passed through a learn to read phase performed using the first subset of document images to yield a baseline OCR-free machine learning network; and the baseline OCR-free machine learning network is passed through a client-specific finetuning phase subsequent to the learn to read phase, wherein the client-specific finetuning phase is based on using the second subset of document images to yield a client-adapted trained OCR-free machine learning network.

Aspect 15. The method of Aspect 10, wherein a first subset of the plurality of document images are obtained from external sources within the same information domain, and wherein a second subset of the plurality of document images are obtained from client-specific databases.

Aspect 16. The method of Aspect 10, further comprising: augmenting the plurality of document images to further include a set of synthesized document images automatically generated based on changing one or more visual parameters of the structured text information represented in a document image or changing one or more text characters of the structured text information; wherein the one or more visual parameters include a font or handwriting style of the structured text information, or a font size of the structured text information.

Aspect 17. The method of Aspect 1, further comprising: performing one or more pre-processing operations to anonymize or mask Protected Health Information (PHI) within the structured text information of one or more document images of the plurality of document images.

Aspect 18. The method of Aspect 17, wherein the PHI within the structured text information is anonymized or masked using one or more pre-processing machine learning models trained to de-identify PHI, and wherein the one or more pre-processing machine learning models are separate from the OCR-free machine learning network.

Aspect 19. The method of Aspect 1, wherein the ROI template is included in a plurality of different ROI templates, each ROI template corresponding to a different document type or different organization of structural information within an image artifact.

Aspect 20. The method of Aspect 19, wherein each ROI template is indicative of configured ROI bounding box information uniquely corresponding to an identified type of structured text document represented in a document image included in the plurality of document images.

Aspect 21. The method of Aspect 19, wherein each ROI template is indicative of configured ROI bounding box information uniquely corresponding to an identified type of insurance claim form structured text document represented in a document image included in the plurality of document images . . . .

Aspect 22. The method of Aspect 1, further comprising: performing inference using the trained OCR-free machine learning network to analyze one or more production document images, wherein performing inference includes generating a predicted inference output indicative of text within the document image; and processing the predicted inference output for each production document image using a metadata validation engine, wherein the metadata validation engine is configured to cross-reference one or more fields within the predicted inference output with original artifacts associated with the respective production document image.

Aspect 23. The method of Aspect 22, wherein the metadata validation engine cross-references the one or more fields within the predicted inference output with the original artifacts comprising expected format information of text values of the one or more fields.

Aspect 24. The method of Aspect 23, wherein the original artifacts include one or more of: a threshold value or upper and lower thresholds of a range associated with a numerical text value field; an expected data structure associated with a text value field; or a required schema structure or a required alignment for the structured schema corresponding to the respective document image type.

Aspect 25. The method of Aspect 22, further comprising: generating the predicted inference output to include automatically applied corrections for text data values or fields that were rejected by the cross-referencing of the metadata validation engine.

Aspect 26. The method of Aspect 1, wherein generating the annotation metadata for each document image is based on providing each document image to an annotation engine that includes an annotation graphical user interface (GUI) for receiving one or more user inputs indicative of annotation information.

Aspect 27. The method of Aspect 26, wherein: the annotation engine includes a respective annotation GUI for each different document type of a plurality of document types represented in the plurality of document images; and each respective annotation GUI corresponds to one or more ROI templates of a plurality of available ROI templates.

Aspect 28. The method of Aspect 27, wherein the respective annotation GUI is configured to: receive one or more user inputs indicative of a fitting adjustment of an ROI template relative to a document image included in the plurality of document images, wherein the fitting adjustment aligns the pre-defined ROI bounding boxes of the ROI template with the labeled text field locations within the document image.

Aspect 29. The method of Aspect 28, wherein the respective annotation GUI is further configured to: apply the fitting-adjusted ROI template to the document image to capture corresponding ROI positions for text extraction within the labeled text field locations of the document image; determine one or more matching document images included in the plurality of document images, the one or more matching document images identified as having a same document type; and apply the fitting-adjusted ROI template to each of the one or more matching document images to capture corresponding ROI positions for the matching document image.

Aspect 30. The method of Aspect 29, wherein automatically extracting the text data values using the OCR engine includes: using the OCR engine to perform OCR of the respective portion of image data included in the document image and within the plurality of fitting adjustment-aligned ROI bounding boxes; providing the extracted text data values for each of the ROI bounding boxes for display on the respective annotation GUI for the document type of the document image; receiving one or more user inputs to the respective annotation GUI, the one or more user inputs indicative of a correction or identified error within the OCR engine extracted text data values; and generating error-corrected extracted text data values by updating the OCR engine extracted text data values based on the user inputs indicative of the corrections or identified errors.

Aspect 31. The method of Aspect 30, wherein the error-corrected extracted text data values are generated without receiving an additional user input comprising a manual entry of a replacement key-value pair for the identified error.

Aspect 32. The method of Aspect 30, wherein the respective annotation GUI is further configured to: receive information associated with an incorrect prediction during inference time of the trained OCR-free machine learning network, the information including the input document image and incorrect prediction generated during inference time; display, using the respective annotation GUI, the input document image and corresponding extracted text data values incorrectly predicted during the inference time; and generate an active learning training data pair comprising the input document image and corresponding error-corrected text data values based on receiving one or more user inputs to the respective annotation GUI indicative of the error-corrected text data values.

Aspect 33. The method of Aspect 32, further comprising: receiving, from the trained OCR-free machine learning network, information indicative of a selection of most informative document image samples included in an unlabeled dataset of document image samples.

Aspect 34. The method of Aspect 33, wherein the selection of the most informative document image samples corresponds to document image samples for which the trained OCR-free machine learning network generates a predicted output of structured text data having a lowest confidence value.

Aspect 35. The method of Aspect 33, further comprising: fine-tuning one or more parameters of the trained OCR-free machine learning network based on a dataset comprising a plurality of the active learning training data pairs.

Aspect 36. The method of Aspect 1, wherein each image of the plurality of images corresponds to one or more of a text document, structured text, or textual information.

Aspect 37. The method of Aspect 1, wherein the plurality of images comprises a plurality of images each corresponding to a medical document, medical form, insurance claim document, or insurance claim form.

What is claimed is:

1. A method for training an Optical Character Recognition-free (OCR-free) machine learning network, the method comprising:
   obtaining a plurality of document images, each document image comprising at least structured text information;
   obtaining a template corresponding to a structured text data type determined for each document image, wherein the template includes a plurality of pre-defined bounding boxes each indicative of a relative location of a labeled text field within the respective document image;
   extracting text data values from each document image to process a respective portion of the document image located within each pre-defined bounding box included in the template;
   generating annotation metadata for each document image, wherein the annotation metadata organizes the extracted text data values for each document image using a structured schema, wherein the structured schema is indicative of at least one of hierarchical relationships or spatial relationships between categories and subcategories of the labeled text fields within the respective document image; and
   training an OCR-free machine learning network using a training dataset comprising the plurality of document images and the annotation metadata generated for each document image.

2. The method of claim 1, wherein training the OCR-free machine learning network yields a trained OCR-free machine learning network, and wherein the trained OCR-free machine learning network:
   receives an input document image and generates an output of structured text data extracted from the input document image; and
   automatically formats the output of the structured text data using the structured schema corresponding to a type of the input document image.

3. The method of claim 2, wherein the trained OCR-free machine learning network automatically uses the corresponding structured schema for the type of the input document image without receiving an additional input indicative of the type of the input document image or indicative of the corresponding structured schema.

4. The method of claim 1, wherein the trained OCR-free machine learning network implements an OCR-free machine learning model that generates the output of the structured text data without performing OCR.

5. The method of claim 4, wherein the OCR-free machine learning model is a document understanding transformer (Donut) machine learning model implemented based on a transformer architecture and includes a vision encoder transformer sub-network and a text decoder transformer sub-network.

6. The method of claim 5, wherein:
   the vision encoder transformer sub-network receives an input document image representing textual information and generates a plurality of image features corresponding to the input document image; and
   the text decoder transformer sub-network uses the plurality of image features to generate a predicted structured text data corresponding to visual textual information of the input document image, and wherein the text decoder transformer sub-network predicts key-value pairs corresponding to the predicted structured text data.

7. The method of claim 6, wherein:
   predicting the key-value pairs corresponding to the predicted structured text data comprises structuring the predicted structured text data using one of the annotation metadata structured schemas seen during training.

8. The method of claim 1, wherein the plurality of document images are obtained from a plurality of different sources, each source associated with a same information domain or same lexicon of domain-specific terminology.

9. The method of claim 8, wherein the information domain is a medical insurance domain, wherein:
   the medical insurance domain comprises one or more of a dental insurance domain, a vision insurance domain, a hearing domain, or a healthcare domain; and
   the structured text data type determined for each document image are selected from one or more of an invoice or receipt, periodontal chart, a dental claim form, an American Dental Association (ADA) dental claim form, or a vision claim form.

10. The method of claim 9, wherein:
   a first subset of the document images corresponds to industry-wide or standardized insurance claim forms; and
   a second subset of the document images corresponds to client-specific insurance claim forms.

11. The method of claim 10, wherein:
a pre-trained OCR-free machine learning network is passed through a learn to read phase performed using the first subset of document images to yield a baseline OCR-free machine learning network; and
the baseline OCR-free machine learning network is passed through a client-specific finetuning phase subsequent to the learn to read phase, wherein the client-specific finetuning phase is based on using the second subset of document images to yield a client-adapted trained OCR-free machine learning network.

12. The method of claim 8, wherein a first subset of the plurality of document images are obtained from external sources within the same information domain, and wherein a second subset of the plurality of document images are obtained from client-specific databases.

13. The method of claim 8, further comprising:
augmenting the plurality of document images to further include a set of synthesized document images automatically generated based on changing one or more visual parameters of the structured text information represented in a document image or changing one or more text characters of the structured text information;
wherein the one or more visual parameters include a font or handwriting style of the structured text information, or a font size of the structured text information.

14. The method of claim 1, further comprising:
performing one or more pre-processing operations to anonymize or mask Protected Health Information (PHI) within the structured text information of one or more document images of the plurality of document images.

15. The method of claim 14, wherein the PHI within the structured text information is anonymized or masked using one or more pre-processing machine learning models trained to de-identify PHI, and wherein the one or more pre-processing machine learning models are separate from the OCR-free machine learning network.

16. The method of claim 1, wherein the template is included in a plurality of different templates, each template corresponding to a different document type or different organization of structural information within an image artifact.

17. The method of claim 16, wherein each template is indicative of configured bounding box information uniquely corresponding to an identified type of structured text document represented in a document image included in the plurality of document images.

18. The method of claim 16, wherein each template is indicative of configured bounding box information uniquely corresponding to an identified type of insurance claim form structured text document represented in a document image included in the plurality of document images.

19. The method of claim 1, further comprising:
performing inference using the trained OCR-free machine learning network to analyze one or more production document images, wherein performing inference includes generating a predicted inference output indicative of text within the document image; and
processing the predicted inference output for each production document image using a metadata validation engine,
wherein the metadata validation engine is configured to cross-reference one or more fields within the predicted inference output with original artifacts associated with the respective production document image.

20. The method of claim 19, wherein the metadata validation engine cross-references the one or more fields within the predicted inference output with the original artifacts comprising expected format information of text values of the one or more fields.

21. The method of claim 20, wherein the original artifacts include one or more of:
a threshold value or upper and lower thresholds of a range associated with a numerical text value field;
an expected data structure associated with a text value field; or
a required schema structure or a required alignment for the structured schema corresponding to the respective document image type.

22. The method of claim 19, further comprising:
generating the predicted inference output to include automatically applied corrections for text data values or fields that were rejected by cross-referencing of the metadata validation engine.

23. The method of claim 1, wherein generating the annotation metadata for each document image is based on providing each document image to an annotation engine that includes an annotation graphical user interface (GUI) for receiving one or more user inputs indicative of annotation information.

24. The method of claim 23, wherein:
the annotation engine includes a respective annotation GUI for each different document type of a plurality of document types represented in the plurality of document images; and
each respective annotation GUI corresponds to one or more templates of a plurality of available templates.

25. The method of claim 24, wherein the respective annotation GUI is configured to:
receive one or more user inputs indicative of a fitting adjustment of a template relative to a document image included in the plurality of document images, wherein the fitting adjustment aligns the pre-defined bounding boxes of the template with the labeled text field locations within the document image.

26. The method of claim 25, wherein the respective annotation GUI is further configured to:
apply the fitting-adjusted template to the document image to capture corresponding positions for text extraction within the labeled text field locations of the document image;
determine one or more matching document images included in the plurality of document images, the one or more matching document images identified as having a same document type; and
apply the fitting-adjusted template to each of the one or more matching document images to capture corresponding positions for the matching document image.

27. The method of claim 26, wherein extracting the text data values includes:
using an OCR engine to perform OCR of the respective portion of image data included in the document image and within the fitting adjustment-aligned bounding boxes;
providing the extracted text data values for each of the bounding boxes for display on the respective annotation GUI for the document type of the document image;
receiving one or more user inputs to the respective annotation GUI, the one or more user inputs indicative of a correction or identified error within the OCR engine extracted text data values; and generating error-corrected extracted text data values by updating the OCR engine extracted text data values based on the user inputs indicative of the corrections or identified errors.

28. The method of claim 27, wherein the respective annotation GUI is further configured to:
- receive information associated with an incorrect prediction during inference time of the trained OCR-free machine learning network, the information including the input document image and incorrect prediction generated during inference time;
- display, using the respective annotation GUI, the input document image and corresponding extracted text data values incorrectly predicted during the inference time; and
- generate an active learning training data pair comprising the input document image and corresponding error-corrected text data values based on receiving one or more user inputs to the respective annotation GUI indicative of the error-corrected text data values.

29. The method of claim 28, further comprising:
- receiving, from the trained OCR-free machine learning network, information indicative of a selection of most informative document image samples included in an unlabeled dataset of document image samples,
- wherein the selection of the most informative document image samples corresponds to document image samples for which the trained OCR-free machine learning network generates a predicted output of structured text data having a lowest confidence value; and
- fine-tuning one or more parameters of the trained OCR-free machine learning network based on a dataset comprising a plurality of the active learning training data pairs.

* * * * *